United States Patent
Xiong

(10) Patent No.: US 12,328,746 B2
(45) Date of Patent: Jun. 10, 2025

(54) COMMUNICATION METHOD AND APPARATUS FOR MULTICAST BROADCAST SERVICE, MEDIUM, AND ELECTRONIC DEVICE

(71) Applicant: TENCENT TECHNOLOGY (SHENZHEN) COMPANY LIMITED, Shenzhen (CN)

(72) Inventor: Chunshan Xiong, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 476 days.

(21) Appl. No.: 17/895,613

(22) Filed: Aug. 25, 2022

(65) Prior Publication Data
US 2022/0417907 A1  Dec. 29, 2022

Related U.S. Application Data

(63) Continuation of application No. PCT/CN2021/099938, filed on Jun. 15, 2021.

(30) Foreign Application Priority Data

Jul. 17, 2020 (CN) .......................... 202010694101.9

(51) Int. Cl.
  *H04W 72/00* (2023.01)
  *H04W 72/30* (2023.01)
(52) U.S. Cl.
  CPC .................................. *H04W 72/30* (2023.01)
(58) Field of Classification Search
  None
  See application file for complete search history.

(56) References Cited

U.S. PATENT DOCUMENTS

| 7,953,006 B2 * | 5/2011 | Pandey | H04W 4/06 370/230.1 |
| 2008/0212583 A1 * | 9/2008 | Rey | H04L 12/189 370/390 |

(Continued)

FOREIGN PATENT DOCUMENTS

| CN | 110167190 A | 8/2019 |
| CN | 111866755 A | 10/2020 |

(Continued)

OTHER PUBLICATIONS

Juniper Networks et al. "Alignment on the use of terminologies for delivery methods", SA WG2 Meeting #S2-139e, S2-2004162, Jun. 12, 2020.

(Continued)

*Primary Examiner* — Brandon M Renner
(74) *Attorney, Agent, or Firm* — ANOVA LAW GROUP, PLLC

(57) ABSTRACT

A communication method includes: selecting an $i^{th}$ level user plane node corresponding to an $i^{th}$ level control plane node, i=1, . . . , N, N being a positive integer; transmitting a user plane MBS session establishment request to an $i^{th}$ level user plane node, and receiving a user plane MBS session establishment response fed back by the $i^{th}$ level user plane node; and transmitting an MBS session start request to a son control plane node of the $i^{th}$ level control plane node, so that the son control plane node allocates son user plane nodes to the $i^{th}$ level user plane node, the MBS session start request including identification information of the $i^{th}$ level user plane node and a first MBS Internet Protocol (IP) multicast transmission address and a first common-tunnel endpoint identifier (C-TEID) that are allocated by the $i^{th}$ level user plane node.

20 Claims, 19 Drawing Sheets

(56) References Cited

U.S. PATENT DOCUMENTS

| | | | |
|---|---|---|---|
| 2008/0293428 A1* | 11/2008 | Rey | H04L 47/805 455/435.2 |
| 2010/0110961 A1* | 5/2010 | Chao | H04W 76/40 370/312 |
| 2010/0265867 A1* | 10/2010 | Becker | H04W 72/30 370/312 |
| 2020/0077161 A1* | 3/2020 | Lohmar | H04L 65/762 |
| 2020/0092923 A1 | 3/2020 | Abraham et al. | |
| 2021/0014152 A1* | 1/2021 | Li | H04L 12/185 |
| 2023/0300572 A1* | 9/2023 | Ling | H04W 4/06 370/312 |

FOREIGN PATENT DOCUMENTS

| | | |
|---|---|---|
| CN | 111866756 A | 10/2020 |
| CN | 111866757 A | 10/2020 |
| CN | 111866758 A | 10/2020 |
| WO | 2008044971 A1 | 4/2008 |
| WO | 2019080690 A1 | 5/2019 |
| WO | 2019192445 A1 | 10/2019 |
| WO | 2020002374 A1 | 1/2020 |

OTHER PUBLICATIONS

The European Patent Office (EPO) The Extended European Search Report for 21843089.0 Oct. 8, 2023 139 Pages.

"3rd Generation Partnership Project; Technical Specification Group Services and System Aspects; Multimedia BroadcasVMulticast Service(MBMS); Architecture and functional description (Release 16)", No. V16.1.0 Sep. 2, 2019 (Sep. 2, 2019).

"3rd Generation Partnership Project; Technical Specification Group Services and System Aspects; Study on architectural enhancements for 5G multicast-broadcast services (Release 17)", No. V0.4.0 Jun. 22, 2020 (Jun. 22, 2020), pp. 1-157.

Juniper Networks, BBC, Alignment on the use of terminologies for delivery methods, 3GPP TSG SA WG2 #139e S2-2004162, Internet<URL:https://www.3gpp.org/ftp/tsg_sa/WG2_Arch/TSGS2_139e_Electronic/Docs/S2-2004162.zip>, May 22, 2020.

The Japan Patent Office (JPO) Notification of Reasons for Refusal for Application No. 2022-554218 and Translation Oct. 3, 2023 9 Pages.

Tencent, KI #1, New Sol: MBS Multicast UE Context Activation and MBS Session Management without using UE IP address, 3GPP TSG SA WG2 #139e S2-2004496, Internet<URL:https://www.3gpp.org/ftp/tsg_sa/WG2_Arch/TSGS2_139e_Electronic/Docs/S2-2004496.zip>, Jun. 12, 2020.

Ericsson, KI#6, New Solution: Support Local MBS Service, 3GPP TSG SA WG2 #139e S2-2004501, Internet<URL:https://www.3gpp.org/ftp/tsg_sa/WG2_Arch/TSGS2_139e_Electronic/Docs/S2-2004501.zip>, Jun. 15, 2020.

* cited by examiner

Class A address:

Class B address:

Class C address:

Class D address:

Class E address:

IGMPv1 protocol header format

| 0      3 | 7 | 15 | 31 |
|---|---|---|---|
| Version (4 bits) | Type (4 bits) | Unused (8 bits) | Checksum (16 bits) |
| Group address (32 bits) ||||

IGMPv2 protocol header format

| 0 | 7 | 15 | 31 |
|---|---|---|---|
| Type (8 bits) | Maximum response time (8 bits) | Checksum (16 bits) ||
| Group address (32 bits) ||||

IGMPv3 membership report message format

| 0 | 7 | 15 | 31 |
|---|---|---|---|
| Type=0x22 | Reserved field | Checksum ||
| Reserved field || Group record number (M) ||
| Group record [1] ||||
| Group record [2] ||||
| ⋮ ||||
| Group record [M] ||||

FIG. 7

… (1) COMMUNICATION METHOD AND APPARATUS FOR MULTICAST BROADCAST SERVICE, MEDIUM, AND ELECTRONIC DEVICE

RELATED APPLICATION(S)

This application is a continuation application of PCT Patent Application No. PCT/CN2021/099938 filed on Jun. 15, 2021, which claims priority to Chinese Patent Application No. 202010694101.9, entitled "COMMUNICATION METHOD AND APPARATUS FOR MULTICAST BROADCAST SERVICE, MEDIUM, AND ELECTRONIC DEVICE" and filed with the China National Intellectual Property Administration on Jul. 17, 2020, all of which are incorporated herein by reference in entirety.

FIELD OF THE TECHNOLOGY

The present disclosure relates to the field of computer and communication technologies, and in particular, to a communication method and apparatus for a multicast broadcast service, a medium, and an electronic device.

BACKGROUND

In 5G multicast broadcast service (MBS) systems, the control plane is separated from the user plane, that is, the control plane node and the user plane node are no longer the same network node. Problems may arise during the establishment of a user plane MBS session transmission tree.

SUMMARY

Embodiments of the present disclosure provide a communication method and apparatus for a multicast broadcast service, a medium, and an electronic device, for at least establishing a user plane MBS session transmission tree under a communication system architecture in which a control plane is separated from a user plane to a certain extent and also improving transmission efficiency of MBS data.

In one aspect, the present disclosure provides a communication method for a multicast broadcast service, the method including: selecting an $i^{th}$ level user plane node corresponding to an $i^{th}$ level control plane node, the $i^{th}$ level control plane node being any level control plane node other than a last level control plane node in an MBS session transmission tree, i=1, ..., N, N being a positive integer; transmitting a user plane MBS session establishment request to the $i^{th}$ level user plane node, and receiving a user plane MBS session establishment response fed back by the $i^{th}$ level user plane node; and transmitting an MBS session start request to a son control plane node of the $i^{th}$ level control plane node, so that the son control plane node allocates son user plane nodes to the $i^{th}$ level user plane node, the MBS session start request including identification information of the $i^{th}$ level user plane node and a first MBS Internet Protocol (IP) multicast transmission address allocated by the $i^{th}$ level user plane node and a first common-tunnel endpoint identifier (C-TEID) used for transmitting MBS data through multicast, and the first MBS IP multicast transmission address being used for instructing the son user plane node to join a multicast transmission group corresponding to the first MBS IP multicast transmission address to receive MBS data transmitted by the $i^{th}$ level user plane node through multicast.

In another aspect, the present disclosure provides a communication method for a multicast broadcast service, the including. receiving a user plane MBS session establishment request transmitted by an $i^{th}$ level control plane node in an MBS session transmission tree, the $i^{th}$ level control plane node being any level control plane node other than a last level control plane node in the MB S session transmission tree, i=1, ..., N, N being a positive integer, the user plane MBS session establishment request including MBS Internet Protocol (IP) multicast distribution information, the MBS IP multicast distribution information being from a father control plane node of the $i^{th}$ level control plane node, and the MBS IP multicast distribution information including a second MBS IP multicast transmission address and a second C-TEID that are provided by the father control plane node of the $i^{th}$ level control plane node; feeding back a user plane MBS session establishment response to the $i^{th}$ level control plane node, the user plane MBS session establishment response including a first MBS IP multicast transmission address and a first C-TEID that are allocated by the $i^{th}$ level user plane node, and the first MBS IP multicast transmission address being used for instructing a son user plane node of the $i^{th}$ level user plane node to join a multicast transmission group corresponding to the first MBS IP multicast transmission address to receive MBS data transmitted by the $i^{th}$ level user plane node through multicast; and joining a multicast transmission group corresponding to the second MBS IP multicast transmission address when or in response to determining that the $i^{th}$ level user plane node supports receiving MBS data of the father user plane node of the $i^{th}$ level user plane node through multicast, to receive the MBS service data transmitted by the father user plane node of the $i^{th}$ level user plane node through multicast.

In yet another aspect, the present disclosure provides a communication apparatus for a multicast broadcast service, the apparatus including: a memory storing computer program instructions; and a processor coupled to the memory and configured to execute the computer program instructions and perform: selecting an $i^{th}$ level user plane node corresponding to an $i^{th}$ level control plane node, the $i^{th}$ level control plane node being any level control plane node other than a last level control plane node in a multicast broadcast service (MBS) session transmission tree, i=1, ..., N, N being a positive integer; transmitting a user plane MBS session establishment request to the $i^{th}$ level user plane node, and receiving a user plane MBS session establishment response fed back by the $i^{th}$ level user plane node; and transmitting an MBS session start request to a son control plane node of the $i^{th}$ level control plane node, so that the son control plane node allocates son user plane nodes to the $i^{th}$ level user plane node, the MBS session start request including identification information of the $i^{th}$ level user plane node and a first MBS Internet Protocol (IP) multicast transmission address allocated by the $i^{th}$ level user plane node and a first common-tunnel endpoint identifier (C-TEID) used for transmitting MBS data through multicast, and the first MBS IP multicast transmission address being used for instructing the son user plane node to join a multicast transmission group corresponding to the first MBS IP multicast transmission address to receive MBS data transmitted by the $i^{th}$ level user plane node through multicast.

In yet another aspect, the present disclosure provides a non-transitory computer-readable storage medium storing computer program instructions executable by at least one processor to perform: selecting an $i^{th}$ level user plane node corresponding to an $i^{th}$ level control plane node, the $i^{th}$ level control plane node being any level control plane node other than a last level control plane node in a multicast broadcast service (MBS) session transmission tree, i=1, ..., N, N being a positive integer; transmitting a user plane MBS session establishment request to the $i^{th}$ level user plane node, and receiving a user plane MBS session establishment response fed back by the $i^{th}$ level user plane node; and transmitting an MBS session start request to a son control plane node of the $i^{th}$ level control plane node, so that the son control plane node allocates son user plane nodes to the $i^{th}$ level user plane node, the MBS session start request including identification information of the $i^{th}$ level user plane node and a first MBS Internet Protocol (IP) multicast transmission address allocated by the $i^{th}$ level user plane node and a first common-tunnel endpoint identifier (C-TEID) used for transmitting MBS data through multicast, and the first MBS IP multicast transmission address being used for instructing the son user plane node to join a multicast transmission group corresponding to the first MBS IP multicast transmission address to receive MBS data transmitted by the $i^{th}$ level user plane node through multicast.

One aspect of the embodiments of the present disclosure provides an electronic device, including: one or more processors; and a storage apparatus, configured to store one or more programs, when executed by the one or more processors, causing the one or more processors to implement the communication method for a multicast broadcast service according to the embodiments.

According to an aspect of an embodiment of the present disclosure, a computer program product or a computer program is provided, the computer program product or the computer program including computer instructions, the computer instructions being stored in a computer-readable storage medium. A processor of a computing device reads the computer instructions from the computer-readable storage medium and executes the computer instructions to cause the computing device to perform the communication method for a multicast broadcast service provided in the embodiments.

In the technical solutions provided in some embodiments of the present disclosure, an $i^{th}$ level control plane node first selects an $i^{th}$ level user plane node; and then transmits a user plane MBS session establishment request to an $i^{th}$ level user plane node, and receives a user plane MBS session establishment response fed back by the $i^{th}$ level user plane node. Afterward, the $i^{th}$ level control plane node transmits an MBS session start request to a son control plane node of the $i^{th}$ level control plane node, the MBS session start request including identification information of the $i^{th}$ level user plane node and a first MBS IP multicast transmission address and a first C-TEID that are allocated by the $i^{th}$ level user plane node. After receiving the MBS session start request, the son control plane node of the $i^{th}$ level control plane node allocates a son user plane node to the $i^{th}$ level user plane node, and the son user plane node of the $i^{th}$ level user plane node may join a multicast transmission group corresponding to the first MBS IP multicast transmission address to receive MBS data transmitted by the $i^{th}$ level user plane node through multicast. It can be learned that in the technical solutions of the embodiments of the present disclosure, under a communication system architecture in which the control plane is separated from the user plane, a user plane MBS session transmission tree is established, and because the son user plane node may join the multicast transmission group corresponding to the first MBS IP multicast transmission address allocated by the father user plane node to receive the MBS data transmitted by the father user plane node through multicast, the transmission efficiency of the MBS data can be improved.

The general descriptions and the following descriptions are merely for illustration and explanation purposes and are not intended to limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

FIG. 7 is a schematic diagram of a protocol header format of IGMPv1, a protocol header format of IGMPv2, and a format of a membership report message in IGMPv3;

DETAILED DESCRIPTION

Figure 1:
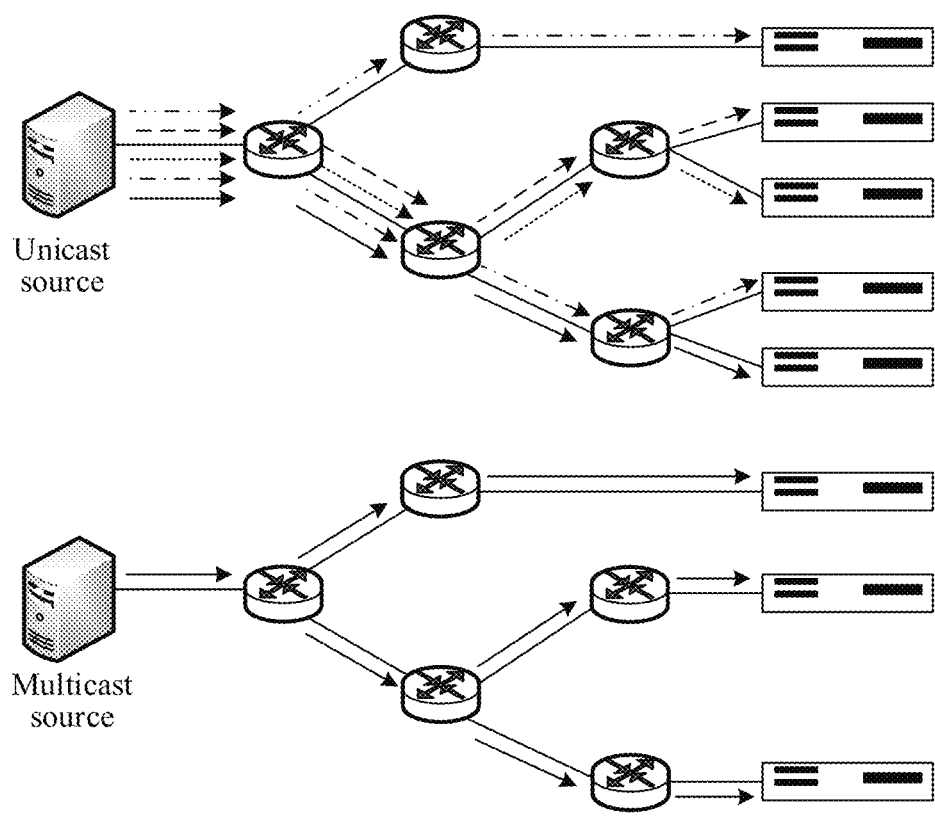
FIG. 1 is a schematic flowchart showing data transmission in a unicast communication system and a multicast communication system.

The exemplary implementations are now described comprehensively with reference to the accompanying drawings. However, the examples of implementations may be implemented in multiple forms, and it is limited to the examples of implementations described herein. Conversely, the implementations are provided to make the present disclosure more comprehensive and complete, and comprehensively convey the idea of the examples of the implementations to a person skilled in the art.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

In addition, the described features, structures, or characteristics may be combined in one or more embodiments in any appropriate manner. In the following descriptions, a lot of specific details are provided through the embodiments of the present disclosure. However, a person skilled in the art is to be aware that, the technical solutions in the present disclosure may be implemented without one or more of the particular details, or another method, unit, apparatus, or step may be used. In other scenarios, well-known methods, apparatuses, implementations, or operations are not shown or described in detail, to avoid obscuring the aspects of the present disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions and do not necessarily include all of the content and operations/steps, nor are the flowcharts necessarily performed in the order described. For example, some operations/steps may be further divided, while some operations/steps may be combined or partially combined. Therefore, an actual execution order may change.

The term "plurality of" mentioned herein means two or more. The term "and/or" describes an association relationship for describing associated objects and represents that three relationships may exist. For example, A and/or B may represent the following three scenarios: Only A exists, both A and B exist, and only B exists. The character "/" generally indicates an "or" relationship between the associated objects.

2G (2nd generation mobile communications), 3G (3rd generation mobile communications), and 4G (4th generation mobile communications) wireless communication systems support multimedia broadcast multicast services (MBMS), which includes broadcast and multicast services. However, only the 2G and 3G systems support the multicast service, the 4G system does not support the multicast service in standards, and all the 2G, 3G, and 4G systems support the broadcast service.

In addition to the broadcast and multicast services, communication between network nodes also includes unicast. "Unicast" is one-to-one communication, and is advantageous in that a transmitter may transmit different content to different recipients. However, if the transmitter is to transmit the same content to a plurality of recipients, the transmitter is to transmit a plurality of copies of the same data to the plurality of recipients in an end-to-end manner, which is inefficient. In certain embodiment(s), as shown in FIG. 1, when a unicast source transmits data to a plurality of recipients in a unicast mode, the unicast source is to transmit a plurality of copies of the same data in an end-to-end manner (where different line types in FIG. 1 represent different data flows).

"Multicast" means that a transmitter transmits the same content to a plurality of recipients. Multicast is especially suitable for online video conferencing and online video-on-demand. This is because that if the unicast mode is used, there will be as many transmissions as there are recipients, which may be inefficient, If the broadcast mode that does not distinguish targets but transmits data to all the targets is adopted, although the data may be transmitted at a time, the purpose of distinguishing specific data recipients cannot be achieved. As can be seen, using the multicast mode not only can realize the transmission of the same data to a plurality of recipients at a time, but also can achieve the purpose of transmitting data to only a specific object. In certain embodiment(s), as shown in FIG. 1, a multicast source may transmit the same data to a plurality of recipients at a time.

"Broadcasting" also transmits the same content to a plurality of recipients, but does not allow for selection of recipients during transmission. Therefore, the data may not be transmitted to some devices, resulting in a waste of network resources. In addition, some recipients may not be "interested" in the broadcast content, so after receiving the broadcast content, these recipients have to discard the received data packets, which also results in a waste of terminal resources.

The fundamental difference between the broadcast service and the multicast service lies in that all user equipments (UEs) in a system may participate in the broadcast service without subscription, but cannot participate in the multicast service without subscription and authentication. There are many types of multicast services and broadcast services. For a multicast service, a UE joins a multicast group of a corresponding service based on an IP multicast address. A broadcast service corresponding to a broadcast group has a specific service area.

Figure 2:
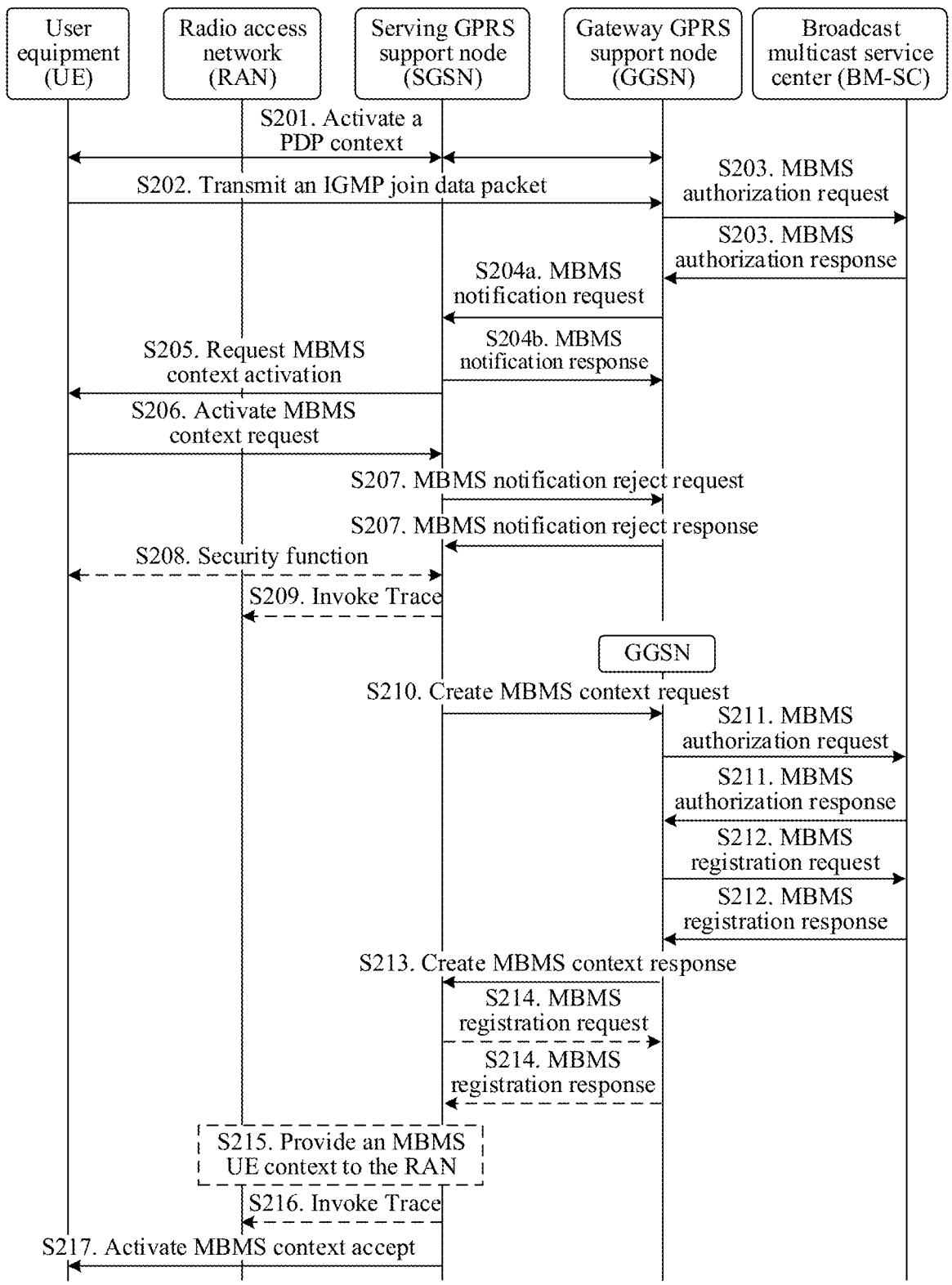
FIG. 2 is a schematic diagram of a multicast context activation process of MBMS.

An MBMS multicast context activation process is defined in clause 8.2 in 3rd Generation Partnership Project (3GPP) TS 23.246, which, as shown in FIG. 2, includes the following steps:

Step S201. A UE selects an access point name (APN) to establish a packet data protocol (PDP) context, and then an Internet protocol (IP) address is allocated to the UE. For the convenience of subsequent description, the APN selected by the UE in this step is identified by APN0.

Step S202. The UE selects an IP multicast address (where the IP multicast address is used for identifying a multicast service), and then transmits an IGMP join data packet to a gateway GPRS support node (GGSN) to indicate that the UE wants to join this multicast group.

Step S203. The GGSN transmits an MBMS authorization request to a broadcast multicast service center (BM-SC), and receives an MBMS authorization response fed back by the BM-SC. The BM-SC verifies whether the UE may join the multicast group according to subscription data of the UE, and if determining that the UE may join the multicast group, the BM-SC adds an APN to be used by the UE to join the multicast group to the MBMS authorization response (where the APN is identified by APN1), and then transmits the APN1 to be used by the UE to the UE in steps S204a, S204b, and S205.

Step S206. The UE initiates a new MBMS session according to the APN1 provided by the BM-SC, that is, transmits an activate MBMS context request, the activate MBMS context request including the IP multicast address, the APN1, and an MBMS capability of the UE. The MBMS capability may be, for example, a quality of service (QoS) capability.

Step S207. A serving GPRS support node (SGSN) checks whether the UE has subscribed to the APN1. If the check fails, the SGSN transmits an MBMS notification reject request to the GGSN, and the GGSN transmits an MBMS notification reject response to the SGSN. The subscription data of the UE is stored in a home subscriber server (HSS), and an interaction process between the SGSN and the HSS is not shown in FIG. 2. In addition, for specific processes of step S208 and step S209 in FIG. 2, refer to the activate MBMS context process defined in clause 8.2 in TS 23.246.

Step S210. If the check on the UE by the SGSN succeeds, the SGSN selects another GGSN (that is, a GGSN supporting the multicast service) according to the APN1, and transmits a create MBMS context request message to the GGSN, the message including an ID of the UE, a UE location ID, the IP multicast address, the APN1, and access information (for example, 2G or 3G) of the UE.

The ID of the UE may be an international mobile subscriber identity (IMSI) or a mobile station international integrated service digital network number (MSISDN). The UE location ID may be a radio access technology (RAT) ID, a common gateway interface (CGI), a service area identity (SAI), or the like.

Step S211. The GGSN transmits an MBMS authorization request to the BM-SC, and the BM-SC authorizes the UE according to subscription information of the UE and feeds back an MBMS authorization response to the GGSN.

Step S212. If access of the UE is authorized and there is no context of the UE indicated by the IP multicast address on the GGSN, that is, the UE is the first to access the multicast service identified by the IP multicast address on the GGSN, the UE registers with the upstream node BM-SC to indicate that multicast service data to be transmitted to the IP multicast address is to be transmitted to this GGSN. (Note: Different GGSNs may be selected for different UEs, so when the BM-SC transmits multicast data downward, the same multicast data is to be transmitted to these GGSNs at the same time).

Step S213. The GGSN creates an MBMS UE context of the UE corresponding to the IP multicast address, and then transmits a create MBMS context response to the SGSN to indicate that the MBMS context is successfully created.

Step S214. Similar to S212, if there is no context of the UE indicated by the IP multicast address on the SGSN, that is, the UE is the first to access the multicast service identified by the IP multicast address on the SGSN, the UE registers with the upstream node GGSN to indicate that multicast service data to be transmitted to the IP multicast address is to be transmitted to this SGSN. (Note: Different SGSNs may be selected for different UEs, so when the GGSN sends multicast data downstream, the same multicast data is to be sent to these SGSNs at the same time).

For specific processes of steps S215 to S217 in FIG. 2, refer to the activate MBMS context process defined in clause 8.2 in TS 23.246.

It can be learned from the process shown in FIG. 2 that a UE in 2G or 3G first establishes a PDP context by using an APN0, and an IP address is allocated to the UE, and then the UE transmits an IGMP join data packet indicating that the UE joins a multicast group to a network with this IP address; the GGSN is to intercept this IGMP join data packet, and then transmit a signaling (that is, ab MBMS authorization request) to a BM-SC; the BM-SC allocates an APN1 to the UE; then the UE transmits a activate MBMS context request message with this APN1, thus activating an MBMS context.

Figure 3:
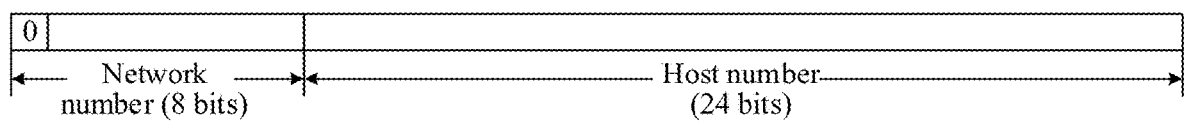
FIG. 3 is a schematic diagram showing classes of an IPv4 network addresses.
Figure 3:
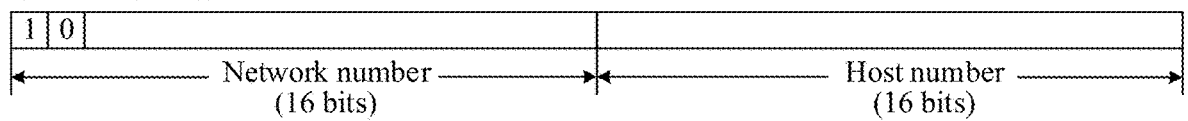
Figure 3:
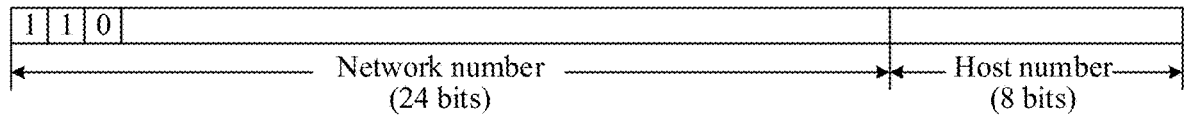
Figure 3:
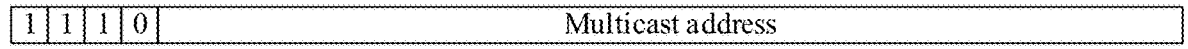
Figure 3:
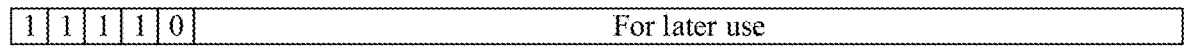

The IP multicast address may be an IPv4 multicast address or an IPv6 multicast address. As shown in FIG. 3, the IPv4 network address is classified as a class A address, a class B address, a class C address, a class D address, and a class E address. In the class A address, the first byte (8 bits) is network number, and the other three bytes (24 bits) are host number. The range of the class A address is: 0.0.0.0 to 127.255.255.255. In the class B address, the first byte and the second byte are network number, and the other two bytes are host number. The range of the class B address is: 128.0.0.0 to 191.255.255.255. In the class C address, the first three bytes are network number, and the fourth byte is host number. The range of the class C address is: 192.0.0.0 to 223.255.255.255. The class D address is a multicast address. The first four bits of the class D address are "1110". The range of the class D address is: 224.0.0.0 to 239.255.255.255. The class E address is a reserved address. The first five bits of the class E address are "11110". The range of the class E address is: 240.0.0.0 to 247.255.255.255.

Figures 4, 5:
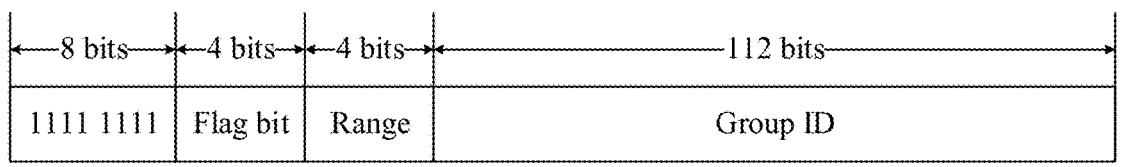
FIG. 4 is a schematic structural diagram of an IPv4 multicast address.
FIG. 5 is a schematic structural diagram of an IPv6 multicast address.

As shown in FIG. 4, the IPv4 multicast address may have three structures, which are respectively applicable to a well-known multicast address, a globally-scope multicast address, and a local-scoped multicast address.

A structure of an IPv6 multicast address is as shown in FIG. 5, where the first byte (8 bits) indicates that the address is a multicast address, the next four bits are a flag field, and the next four bits are a scope field, and the last 112 bits are a group ID.

The first bit of a flag field is 0, which is reserved for future use. The second bit of the flag field indicates whether the multicast address is embedded with a rendezvous point (RP). The RP is a distribution point for a specified multicast stream in a multicast network. For example, when the second bit value is 0, it indicates that no rendezvous point is embedded and when the second bit value is 1, it indicates that a rendezvous point is embedded. The third bit of the flag field indicates whether prefix information is embedded in the multicast address. For example, when the third bit value is 0, it indicates that no prefix information is embedded, and when the third bit value is 1, it indicates that prefix information is embedded. The last bit of the flag field indicates whether the multicast address is a permanently assigned multicast address or a transient multicast address. For example, when the last bit value is 0, it indicates that the multicast address is the permanently assigned multicast address and when the last bit value is 1, it indicates that the multicast address is the transient multicast address.

The function of the scope field is to limit the scope of the multicast address. The values and descriptions of the scope field are as shown in Table 1:

TABLE 1

| Value | Description |
| --- | --- |
| 0 | Reserved |
| 1 | Interface-local scope, called a node-local scope |
| 2 | Link-local scope |
| 3 | Reserve |
| 4 | Admin-local scope |
| 5 | Site-local scope |
| 6 and 7 | Not allocated |
| 8 | Organization-local scope |
| 9, A, B, C, and D | Not allocated |
| E | Global scope |
| F | Reserve |

In multicast communication, the multicast address can be used as only a destination IP address (that is, the destination IP address in an IP header), and the multicast address cannot be used as a source IP address. In multicast services of MBMS (2G, 3G) and MBS (5G), multicast data packets are all transmitted down by the network side to UEs, that is, the multicast data packets are all downlink (DL) data packets, and the UEs cannot transmit data to the network side through corresponding multicast addresses. That is, the UE cannot use the multicast address as the destination IP address to transmit an uplink IP packet, that is, there is no uplink (UL) multicast data.

Figure 6:
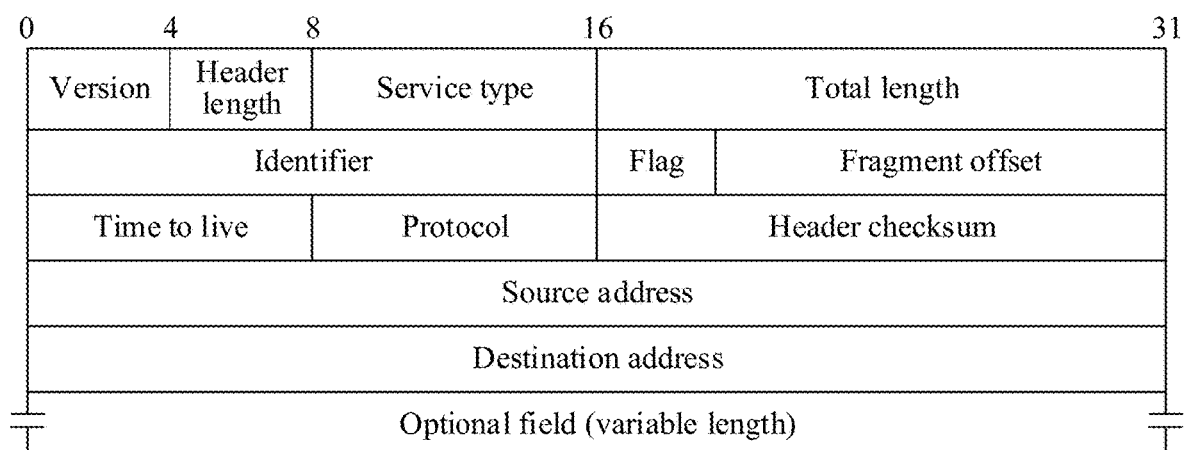
FIG. 6 is a schematic structural diagram of an IPv4 header.

An IP packet transmitted in a network is formed by two parts: an IP header and data. As shown in FIG. 6, a structure of an IPv4 header includes: a "version" field, a "header length" field, a "service type" field, a "total length" field, an "identifier" field, a "flag" field, a "fragment offset" field, a "time to live" field, a "protocol" field, a "header checksum" field, a "source address" field, a "destination address" field, and an "optional field".

The "version" field occupies 4 bits and refers to the version of the IP protocol, for example, a version number is 4 (i.e., IPv4). The "header length" field occupies 4 bits. The "service type" field occupies 8 bits and is used to obtain a better service. The "total length" field occupies 16 bits and refers to a length of a sum of the header and data. The "identifier" field occupies 16 bits and is a counter configured to generate an identifier of a datagram. The "flag" field occupies 3 bits. The least significant bit of the "flag" field is more fragment (MF). If MF=1, it indicates that there are "more fragments" later. If MF=0, it indicates that it is the last fragment. The middle bit of the "flag" field is don't fragment (DF), and fragmentation is allowed only when DF=0. The "fragment offset" field occupies 12 bits, and refers to the relative position of a certain fragment obtained by fragmenting a relatively long packet in the original packet. The "time to live" field is time to live (TTL), which occupies 8 bits. The TTL field is a field initially set by the transmitter. The "protocol" field occupies 8 bits and is used for indicating which protocol the data carried in this datagram uses, where a value of "1" indicates an Internet control message protocol (ICMP); a value of "2" indicates an IGMP; a value of "6" indicates a transmission control protocol (TCP); a value of "17" indicates a user datagram protocol (UDP); a value of "50" indicates an encapsulating security payload (ESP) protocol; and a value of "51" indicates an authentication header (AH) protocol. The "header checksum" field occupies 16 bits, where only the header of the datagram is checked, and the data part is not checked. The "source address" field and the "destination address" field each occupy 4 bytes, and are used for recording a source address and a destination address respectively.

For the IGMP protocol mentioned above, there are three protocol versions, namely, IGMPv1, IGMPv2, and IGMPv3, and corresponding standards are RFC1054, RFC2236, and RFC3376 respectively. A protocol header format of IGMPv1 and a protocol header format of IGMPv2 are shown in FIG. 7. A protocol header of IGMPv1 includes a 4-bit IGMP version field, a 4-bit IGMP packet type field (where a field value of 1 indicates a host membership query type; and a value of 2 indicates a host membership report type), an 8-bit unused field (where this field is filled with 0 when being transmitted and is ignored when being received), a 16-bit IGMP checksum field (when transmitting a packet, the check word is calculated and inserted into this field; when a packet is received, this field is checked before the packet is processed), and a 32-bit multicast address field.

A protocol header of IGMPv2 includes an 8-bit packet type field, an 8-bit maximum response time field, a 16-bit IGMP checksum field, and a 32-bit multicast address field.

The packet type field in the protocol header of IGMPv2 indicates the following types: 0x11=Membership Query, indicating an IGMP membership query message; 0x12=Version 1 Membership Report, indicating a membership report message of IGMPv1; and 0x16=Version 2 Membership Report, indicating a membership report message of IGMPv2; and 0x17=Leave Group, indicating a leave message. In IGMPv2, the old 4-bit version field and the old 4-bit type field are combined into a new 8-bit type field. The type codes of the membership query message (version 1 and version 2) and the membership report message of version 1 are set to 0x11 and 0x12 respectively to maintain backward compatibility with the IGMP version 1 and version 2 packet formats.

The maximum response time field in the protocol header of IGMPv2 is used for indicating a maximum time (in units of 1/10 second) before a response report is transmitted, and has a default value of 10 seconds. Similar to IGMPv1, when a packet is transmitted, a checksum is calculated and filled in a checksum field in the protocol header of IGMPv2. When a packet is received, a checksum is checked before the packet is processed, to determine whether an error occurs during transmission of the IGMP message.

Still referring to FIG. 7, a format of a membership report message in IGMPv3 includes a type field (because it is a membership report message, type=0x22), a reserved field, a checksum field, a group record number field, and a group record field. The IGMP join data packet shown in FIG. 2 is implemented by an IGMP membership report message. For IGMPv3, the destination IP address in the IP packet of the IGMP join message is not the IP multicast address to be joined, but the IP multicast address to be joined is included in the parameters of the message.

Figure 8:
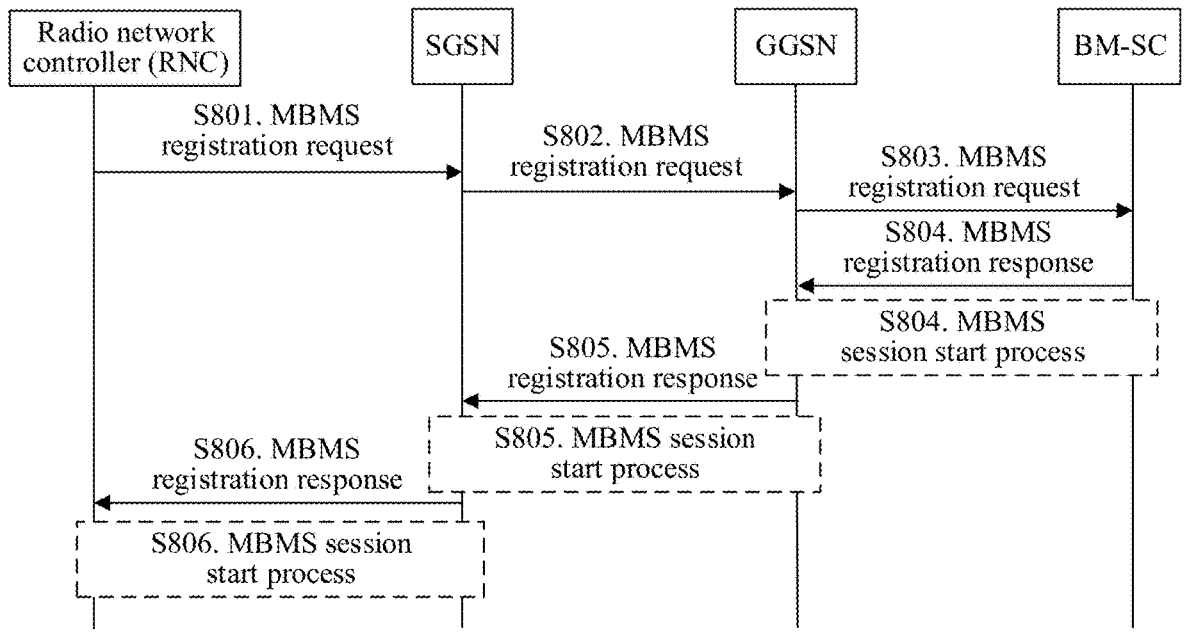
FIG. 8 is a schematic diagram of an MBMS registration process of an MBMS multicast service.

An MBMS registration process applicable to an MBMS multicast service is defined in clause 8.4 in the standard TS 23.246. In certain embodiment(s), as shown in FIG. 8, the following steps are included: step S801. A radio network controller (RNC) transmits an MBMS registration request to an SGSN. Step S802. The SGSN transmits the MBMS registration request to a GGSN. Step S803. The GGSN transmits the MBMS registration request to a BM-SC. Step S804. The BM-SC feeds back an MBMS registration response to the GGSN and performs an MBMS session start process. Step S805. The GGSN feeds back the MBMS registration response to the SGSN and performs the MBMS session start process. Step S806. The SGSN feeds back the MBMS registration response to the RNC and performs the MBMS session start process. It can be learned that a main function of the MBMS registration process is to form a signaling tree for controlling a bearer setup (an MBMS bearer context) from top to bottom. Because in the 2G or 3G standard, a control plane is not separated from a user plane, the formation of a transmission tree of an MBMS bearer control plane on the control plane is equivalent to the subsequent establishment of an MBMS bearer transmission tree from top to bottom (the MBMS bearer transmission tree is established in the MBMS session start process). In addition, because 4G does not support a multicast service, there is no MBMS registration process in the 4G standard.

Figure 9:
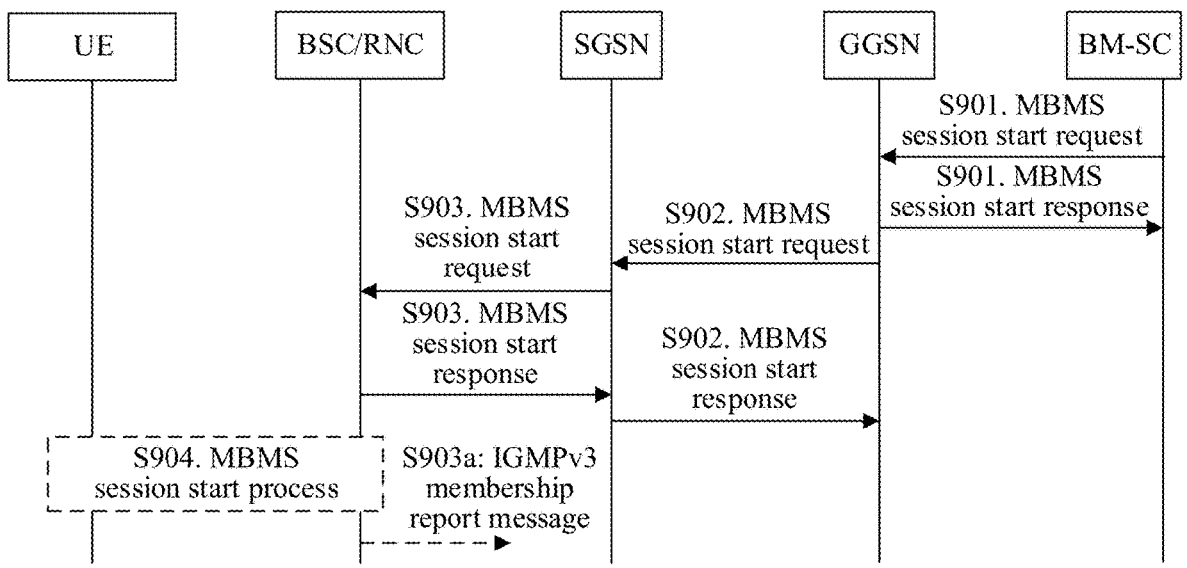
FIG. 9 is a schematic diagram of an MBMS session start process.

The MBMS session start process is defined in clause 8.3 in the standard TS23.246. In certain embodiment(s), as shown in FIG. 9, the following steps are included: step S901. A BM-SC transmits an MBMS session start request to a GGSN, and the GGSN feeds back an MBMS session start response to the BM-SC. Step S902. The GGSN transmits an MBMS session start request to an SGSN, and then the SGSN feeds back an MBMS session start response to the GGSN. Step S903. The SGSN transmits an MBMS session start request to a base station controller (BSC)/RNC, and then the BSC/RNC feeds back an MBMS session start response to the SGSN. Step S904. A UE performs an MBMS session start process with the RSC/RNC. Step S903a. The BSC/RNC transmits an IGMPv3 membership report message.

For the MBMS multicast service, both the MBMS registration process and the MBS session start process are per IP multicast (each IP multicast) process for establishing the signaling tree of the MBMS bearer context of the control plane from top to bottom and the MBMS bearer transmission tree from top to bottom for this IP multicast rather than per UE per IP multicast. For the MBMS broadcast service, there is no MBMS registration process, and the MBS session start process is a per IP broadcast process for establishing the signaling tree of the MBMS bearer context of the control plane for top to bottom and the MBMS bearer transmission tree from top to bottom for this IP broadcast rather than per UE per IP broadcast.

However, for the MBMS multicast service, in order to better the registration process, the UE may perform a part of the MBMS registration process when performing the MBMS UE context activation process, for example, step S212 and step S214 shown in FIG. 2, but this is only performed when the first UE in the SGSN and the GGSN activates the IP multicast service. When a second UE activates this IP multicast on the same SGSN and GGSN, step S212 and step S214 shown in FIG. 2 are no longer performed.

For the MBMS multicast service and broadcast services, an important function is to form a user plane transmission tree of the multicast service and the broadcast service, to prevent the formation of a user plane transmission ring (that is, there are a plurality of different transmission paths for reaching a node), and also prevent the occurrence of MBMS broken branches (that is, there is no downstream node in a node).

In the 2G and 3G systems, a plurality of SGSNs may form a pool. Although the GGSN does not define the pool in the standard, there is a GGSN pool to provide high reliability of the system during actual deployment. In this way, when different UEs access the same BSC/RNC and activate the same MBMS IP multicast, the UEs may be selected by the BSC/RNC to different SGSNs in the same SGSN pool. However, because APNs used by the UEs are the same, different SGSNs in the same SGSN pool will be selected to different GGSNs, but the SGSNs may be connected to the same GGSN. The standard of 3GPP stipulates that the RNC is allowed to use the SGSN pool when using an Iu interface. For MBMS, the GGSN is to be directly connected to the RNC by using a GPRS tunneling protocol-user plane (GTP-U), and the user plane is not allowed to pass through the SGSN. In this way, even if different users on the same RNC select different SGSNs by using a same APN and IP multicast, but user planes thereof are the same finally, and a plurality of different user planes do not exist.

However, a plurality of SGSNs transmit MBMS session start request messages to the BSC. For this scenario, that the MBMS session start request messages of other SGSNs are rejected by using the BSC/RNC to implement only one user plane is defined in the standard TS 23.236. In certain embodiment(s), when a plurality of GGSNs transmit MBMS session start request messages to one SGSN, the SGSN can select only one GGSN to establish a bearer plane, to prevent occurrence of the MBMS transmission ring.

When the BSC/RNS rejects a bearer setup of one SGSN, it may cause the SGSN to have no downstream node. In certain embodiment(s), the SGSN can only delete itself from downstream nodes of the GGSN through a deregistration technology (for details, reference may be made to clause 8.6.0 in the standard TS 23.236), to avoid a problem that the GGSN transmits MBMS multicast data to the SGSN, but the SGSN cannot transmit the MBMS multicast data downward, thereby avoiding an MBMS transmission broken branch. In certain embodiment(s), when the SGSN rejects a bearer setup of a GGSN, it may cause the GGSN to have no downstream node. In certain embodiment(s), the GGSN can only delete itself from downstream nodes of the BM-SC by using the deregistration technology, to prevent the BM-SC from transmitting MBMS multicast data to the GGSN, thereby avoiding the MBMS transmission broken branch.

That is, for the MBMS multicast service, except the final transmission point UE, any node has a downstream node. If one node has no downstream node, the node is to leave the transmission tree (which corresponds to a deregistration process). For example, when all MBMS UEs under a base station move to another base station, the base station is to perform a deregistration operation on the SGSN. When all MBMS connection base stations under one SGSN perform the deregistration operations, the SGSN is to perform the deregistration operation on the GGSN. When all MBMS connection SGSNs under one GGSN perform the deregistration operations, the GGSN is to perform the deregistration operation on the BM-SC.

In addition, because a transmission path of MBMS services (which includes a broadcast service and a multicast service) is a tree-like structure, one or more son nodes is below each father node, and a bearer between the father node and the son node may be a GTP tunnel between the father and the son. However, when there are a relatively large quantity of son nodes, the father node is to transmit same IP multicast data to a plurality of son nodes simultaneously, and the efficiency may be low in a GTP tunnel transmission manner. To improve the transmission efficiency between the father node and the son node on a network side, the father node may allocate a local IP multicast address (the address is not a multicast address in the MBMS multicast service). The IP multicast address in the transmission layer is used for efficiently transmitting the MBMS service data between the son node (for example, the base station) and the father node (for example, the MBMS GW or the GGSN). In certain embodiment(s), the father node only is to transmit out the MBMS service data by using the multicast address of the transmission layer, and all the son node may receive the MBMS service data, to greatly reduce a data processing volume of the father node.

By using the multicast-based bearer transmission bettering technology, the father node is to allocate a local IP multicast transmission layer address, and after receiving the IP multicast transmission layer address allocated by the father node, the son node is to join a multicast group of the transmission layer through an IGMP join process. Because some son nodes do not support multicast, some son nodes receive the MBMS service data in a transmission layer multicast manner, some other son nodes use a peer-to-peer GTP tunnel manner. In certain embodiment(s), the son node allocates an IP address and a TEID of the GTP-U. In certain embodiment(s), if the father node finds that a quantity of son nodes is relatively small, the father node may also decide not to adopt multicast transmission.

Because in the MBMS system, the control plane is not separated from the user plane, that is, the network node includes functions of both the control plane and the user plane, when a network node does not support a multicast transmission technology, the network node directly replies an IP address and a TEID of a GTP-U, the father node may learn that the node does not support multicast transmission. However, in a 5G MBS system, a control plane is separated from a user plane, that is, a control plane node and a user plane node are not a same network node. In certain embodiment(s), establishing an MBS session transmission tree will face a plurality of problems.

Figure 10:
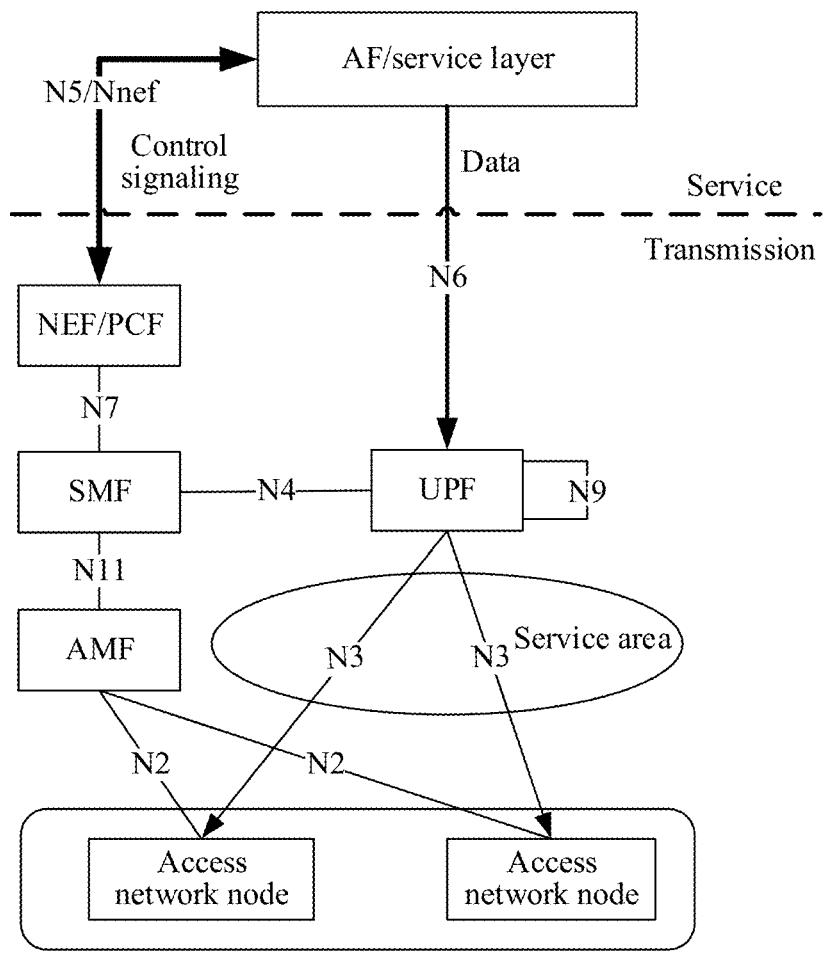
FIG. 10 is a schematic diagram of an MBS system architecture.
Figure 11:
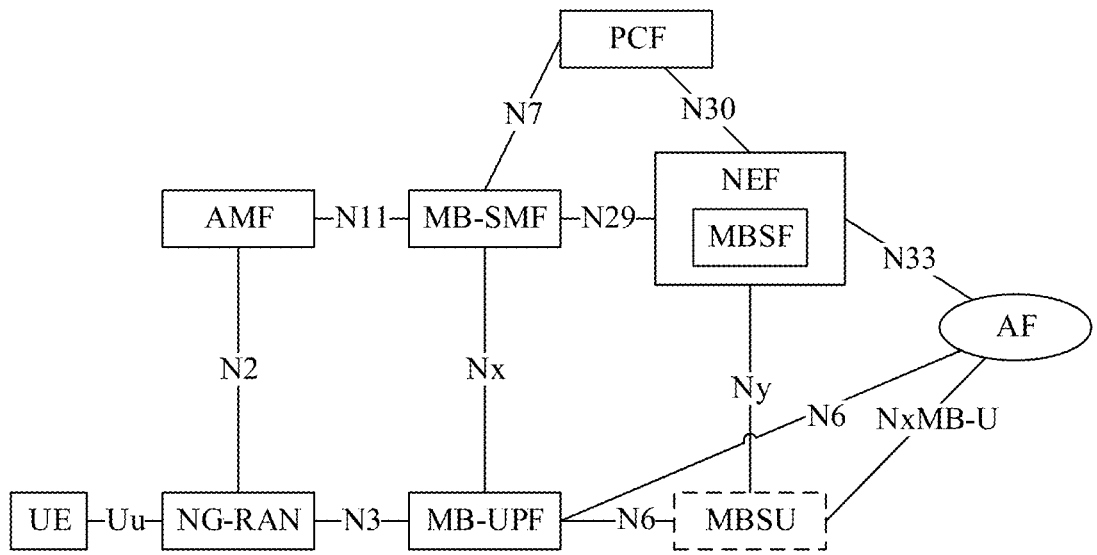
FIG. 11 is a schematic diagram of an MBS system architecture.

In addition, two system architectures shown in FIG. 10 and FIG. 11 are defined in the latest 5G MBS research reports. The system architecture shown in FIG. 10 is obtained by adding functions to an existing 5G architecture, that is, supporting 5G MBS services by enhancing the functions and interfaces of the 5G architecture without modifying the existing 5G architecture. The advantage of this architecture is that it can support 5G MBS through software upgrade. The system architecture shown in FIG. 11 is a brand-new architecture, which is obtained by adding some new network function nodes while keeping the existing 5G architecture unchanged. This architecture can minimize the impact on the existing 5G architecture, but some network function nodes may still be enhanced, such as a next generation radio access network (NG-RAN), an access and mobility management function (AMF), a unified data management (UDM), a user data repository (UDR), a network exposure function (NEF), and a PCF.

In FIG. 10, SMF represents session management function; UPF represents a user plane function; and AF represents application function. In FIG. 11, MB-UPF represents multicast/broadcast-UPF; MB-SMF represents multicast/broadcast-SMF; MBSU represents multicast/broadcast service user plane; and MBSF represents multicast/broadcast service User Plane.

Related technical content of a user plane MBS session transmission tree of a 5G MBS system is described in the following embodiments. Descriptions are as follows.

Figure 12:
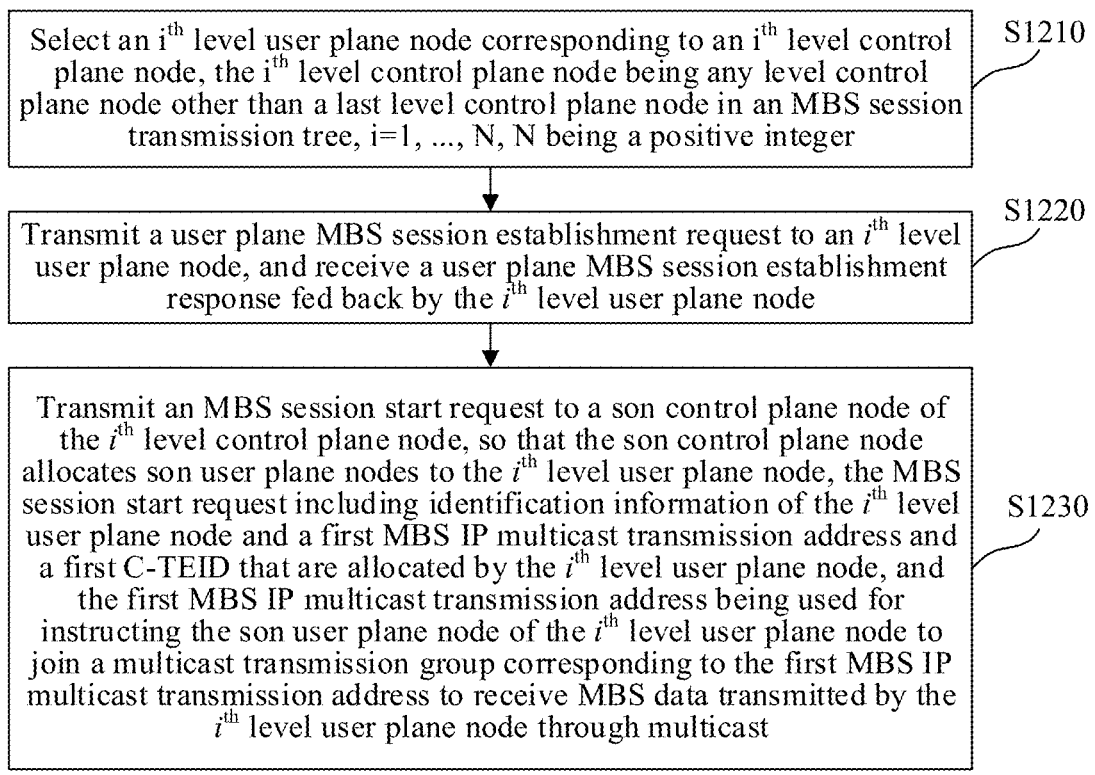
FIG. 12 is a schematic flowchart of a communication method for a multicast broadcast service according to certain embodiment(s) of the present disclosure.

FIG. 12 is a flowchart of a communication method for a multicast broadcast service according to an embodiment of the present disclosure. The communication method for a multicast broadcast service may be performed by an $i^{th}$ level control plane node such as the SMF in FIG. 10 or the MB-SMF in FIG. 11. The communication method for a multicast broadcast service includes at least step S1210 to step S1230. Descriptions are as follows.

Step S1210. Select an $i^{th}$ level user plane node corresponding to an $i^{th}$ level control plane node, the $i^{th}$ level control plane node being any level control plane node other than a last level control plane node in an MBS session transmission tree, i=1, ..., N, N being a positive integer.

In an embodiment of the present disclosure, when or in response to determining that the $i^{th}$ level control plane node is not a first level control plane node in the MBS session transmission tree, at least one $i^{th}$ level user plane node may be selected according to information about a son control plane node of the $i^{th}$ level control plane node. The information about the son control plane node includes at least one of a location of the son control plane node and a quantity of the son control plane nodes. For an MBS multicast service, the information of the son control plane node of the $i^{th}$ level control plane node is formed by MBS UE contexts. For an MBS broadcast service, the information about the son control plane node of the $i^{th}$ level control plane node is provided by the father control plane node of the $i^{th}$ level control plane node or obtained according to a network configuration.

In an embodiment of the present disclosure, when or in response to determining that the $i^{th}$ level control plane node is a first level control plane node in the MBS session transmission tree, at least one first level user plane node may be selected according to a network configuration.

In an embodiment of the present disclosure, control plane nodes in the MBS session transmission tree other than the first level control plane node have at least one father control plane node. That is, in this embodiment of the present disclosure, in the MBS session transmission tree, one control plane node can have one or more father control plane nodes. However, in the MBS session transmission tree, one user plane node can have only one father user plane node.

Step S1220. Transmit a user plane MBS session establishment request to an $i^{th}$ level user plane node, and receive a user plane MBS session establishment response fed back by the $i^{th}$ level user plane node.

In an embodiment of the present disclosure, when or in response to determining that at least two $i^{th}$ level user plane nodes corresponding to the $i^{th}$ level control plane node are selected, the user plane MBS session establishment request is respectively transmitted to each $i^{th}$ level user plane node corresponding to the $i^{th}$ level control plane node; and the user plane MBS session establishment response respectively fed back by each $i^{th}$ level user plane node corresponding to the $i^{th}$ level control plane node is received.

In an embodiment of the present disclosure, when or in response to determining that the $i^{th}$ level control plane node is not a first level control plane node in the MBS session transmission tree and the $i^{th}$ level user plane node supports receiving MBS data of a father user plane node of the $i^{th}$ level user plane node through multicast, the user plane MBS session establishment request transmitted to the $i^{th}$ level user plane node includes MBS IP multicast distribution information, the MBS IP multicast distribution information includes a second MBS IP multicast transmission address and a second C-TEID that are allocated by the parent user plane node of the $i^{th}$ level user plane node, and the second MBS IP multicast transmission address is used for instructing the $i^{th}$ level user plane node to join a multicast transmission group corresponding to the second MBS IP multicast transmission address to receive the MBS data transmitted by the father user plane node of the $i^{th}$ level user plane node through multicast.

In an embodiment of the present disclosure, the MBS IP multicast distribution information included in the user plane MBS session establishment request transmitted to the $i^{th}$ level user plane node is from an MBS session start request transmitted by a father control plane node of the $i^{th}$ level control plane node.

In an embodiment of the present disclosure, when or in response to determining that the ith level user plane node supports receiving the MBS data of the father user plane node of the ith level user plane node through peer to peer rather than through multicast, the user plane MBS session establishment request includes information for requesting to allocate an F-TEID to the ith level user plane node, the user plane MBS session establishment response includes the F-TEID allocated to the ith level user plane node, and the F-TEID is used for causing the ith level user plane node to receive, through peer to peer, the MB S data transmitted by the father user plane node of the ith level user plane node.

In an embodiment of the present disclosure, if the ith level control plane node cannot learn whether the ith level user plane node does not support receiving data transmitted through multicast or if the ith level control plane node learns that the ith level user plane node does not support receiving data transmitted through multicast but the ith level control plane node does not make a decision, the ith level user plane node may indicate, by using the user plane MBS session establishment response, that the ith level user plane node supports receiving the MBS data of the father user plane node of the ith level user plane node through peer to peer rather than through multicast, and the user plane MBS session establishment response includes the F-TEID allocated to the ith level user plane node.

Still refer to FIG. 12. Step S1230. Transmit an MBS session start request to a son control plane node of the ith level control plane node, so that the son control plane node allocates son user plane nodes to the ith level user plane node, the MBS session start request including identification information of the ith level user plane node and a first MBS IP multicast transmission address and a first C-TEID that are allocated by the ith level user plane node, and the first MBS IP multicast transmission address being used for instructing the son user plane node of the ith level user plane node to join a multicast transmission group corresponding to the first MBS IP multicast transmission address to receive MBS data transmitted by the ith level user plane node through multicast.

In an embodiment of the present disclosure, the user plane MBS session establishment request transmitted by the ith level control plane node to ith level user plane node includes indication information used for instructing the ith level user plane node to allocate new MBS IP multicast distribution information; and the user plane node MBS session establishment response returned by the ith level user plane node includes a first MBS IP multicast transmission address and a first C-TEID that are allocated by the ith level user plane node.

In an embodiment of the present disclosure, after transmitting the MBS session start request to the son control plane node of the ith level control plane node, the ith level control plane node may further receive an MBS session start response fed back by the son control plane node of the ith level control plane node. The MBS session start response includes indication information. Content included in the indication information may have the following scenarios.

Scenario 1: In an embodiment of the present disclosure, the indication information includes the identification information of the ith level user plane node, first F-TEID list information, and first field information used for indicating that multicast transmission is started. The first field information indicates that a son user plane node that supports receiving, through multicast, the MBS data transmitted by the ith level user plane node exists in the son user plane nodes allocated by the son control plane node of the ith control user plane node to the ith level user plane node. The first F-TEID list information includes F-TEIDs respectively allocated to all son user plane nodes that support receiving, through peer to peer rather than through multicast, the MBS data transmitted by the ith level user plane node. The F-TEID is used for causing the son user plane node to receive, through peer to peer, the MBS data transmitted by the ith level user plane node. In certain embodiment(s), the first field information may be Multicast Enable.

Scenario 2: In an embodiment of the present disclosure, the indication information includes the identification information of the ith level user plane node and does not include the first F-TEID list information and the first field information. The indication information is used for indicating that all the son user plane nodes allocated by the son control plane node of the ith level control plane node to the ith level user plane node support receiving, through multicast, the MBS data transmitted by the ith level user plane node.

Scenario 3: In an embodiment of the present disclosure, the indication information includes the identification information of the ith level user plane node and the first F-TEID list information and does not include the first field information. The indication information is used for indicating that all the son user plane nodes allocated by the son control plane node of the ith level control plane node to the ith level user plane node support receiving, through peer to peer rather than through multicast, the MBS data transmitted by the ith level user plane node.

Scenario 4: In an embodiment of the present disclosure, the indication information includes the identification information of the ith level user plane node and field information indicating that multicast transmission is stopped and does not include first F-TEID list information. The indication information is used for indicating that the son control plane node does not allocate the son user plane nodes to the ith level user plane node. In certain embodiment(s), the field information indicating that multicast transmission is stopped may be that a value of multicast enable is set to disable.

In an embodiment of the present disclosure, when or in response to determining that the ith level control plane node selects at least two ith level user plane nodes, the MBS session start response includes an indication information list, and the indication information list includes the indication information respectively corresponding to all the ith level user plane nodes.

In an embodiment of the present disclosure, the MBS session start response fed back by the son control plane node of the ith level control plane node may further include a failed identification information list, and the failed identification information list is used for indicating a target ith level user plane node to which son user plane nodes are not allocated.

In an embodiment of the present disclosure, if the ith level control plane node determines, according to the MBS session start response fed back by the son control plane node of the ith level control plane node, that a target ith level user plane node to which son user plane nodes are not allocated exists, the ith level control plane node may transmit a user plane MBS session deletion request to the target ith level user plane node. The technical solution of this embodiment is that a broken branch in the user plane MBS session transmission tree is deleted.

In an embodiment of the present disclosure, after transmitting the user plane MBS session deletion request to the target ith level user plane node to which the son user plane nodes are not allocated, the ith level control plane node may further receive a user plane MBS session deletion response fed back by the target ith level user plane node, the user plane MBS session deletion response being transmitted by the target ith level user plane node after receiving the user plane MBS session deletion request, and when or in response to determining that the target ith level user plane node has joined a multicast transmission group corresponding to a father user plane node of the target ith level user plane node, the target ith level user plane node exiting the multicast transmission group corresponding to the father user plane node of the target ith level user plane node after receiving the user plane MBS session deletion request.

In an embodiment of the present disclosure, if the ith level control plane node includes at least two son control plane nodes, after receiving MBS session start responses respectively fed back by all the son control plane nodes of the ith level control plane node, the ith level control plane node is to determine whether a target ith level user plane node to which son user plane nodes are not allocated exists, to prevent an error from occurring in the determining of whether the target ith level user plane node to which the son user plane nodes are not allocated exists according to the received MBS session start responses fed back by some son control plane nodes.

In an embodiment of the present disclosure, after receiving the MBS session start response fed back by the son control plane node of the ith level control plane node, the ith level control plane node may determine, according to the MBS session start response, that the ith level user plane node respectively transmits the MBS data to the son user plane nodes of the ith level user plane node in which manner.

In certain embodiment(s), if the indication information in the MBS session start response includes the first F-TEID list information, the ith level control plane node may transmit a user plane MBS session modification request to the ith level user plane node according to the identification information of the ith level user plane node included in the indication information, to instruct the ith level user plane node to respectively transmit, through peer to peer, the MBS data to son user plane nodes corresponding to the F-TEIDs included in the first F-TEID list information. When or in response to determining that the indication information further includes the first field information, the user plane MBS session modification request is further used for instructing the ith level user plane node to also transmit the MBS data to the son user plane nodes of the ith level user plane node through multicast transmission. When or in response to determining that the indication information does not include the first field information, the user plane MBS session modification request is further used for instructing the ith level user plane node to transmit the MBS data to the son user plane nodes of the ith level user plane node without using multicast transmission.

If the indication information in the MBS session start response does not include the first F-TEID list information and the first field information, it indicates that all the son user plane nodes of the ith level user plane node support multicast transmission. Therefore, the ith level user plane node may transmit the MBS data to the son user plane nodes of the ith level user plane node through multicast transmission.

In an embodiment of the present disclosure, when or in response to determining that at least two ith level user plane nodes corresponding to the ith level control plane node are selected, the user plane MBS session modification request may be transmitted to an ith level user plane node to which the user plane MBS session modification request is to be transmitted, according to indication information corresponding to each of the ith level user plane nodes included in the MBS session start response. In certain embodiment(s), if it is determined, according to the MBS session start response fed back by the son control plane node of the ith level control plane node, that some of son user plane nodes of an ith level user plane node support receiving MBS data of the ith level user plane node through peer to peer rather than through multicast, it indicates that the ith level user plane node is an ith level user plane node to which a user plane MBS session modification request is to be transmitted.

In an embodiment of the present disclosure, if the ith level control plane node is not the first level control plane node in the MBS session transmission tree, after receiving the MBS session start response fed back by the son control plane node of the ith level control plane node, the ith level control plane node is to feed back an MBS session start response to a father control plane node of the ith level control plane node according to the MBS session start response fed back by the son control plane node. The MBS session start response fed back to the father control plane node of the ith level control plane node includes identification information of the father user plane node of the ith level user plane node. In certain embodiment(s), if the ith level control plane node includes at least two son control plane nodes, after receiving MBS session start responses respectively fed back by all the son control plane nodes of the ith level control plane node, the ith level control plane node is to feed back the MBS session start response to the father control plane node of the ith level control plane node.

Similar to the MBS session start response fed back by the son control plane node of the ith level control plane node, in an embodiment of the present disclosure, the MBS session start response fed back by the ith level control plane node to the father control plane node of the ith level control plane node may include second F-TEID list information and second field information used for indicating that multicast transmission is started. The second field information indicates that a user plane node that supports receiving the MBS data of the father user plane node of the ith level user plane node through multicast exists in the ith level user plane node, and the second F-TEID list information includes F-TEIDs of user plane nodes that support receiving the MBS data of the father user plane node of the ith level user plane node through peer to peer rather than through multicast in the ith level user plane node.

In another embodiment of the present disclosure, when or in response to determining that the MBS session start response fed back by the ith level control plane node to the father control plane node of the ith level control plane node does not include the second F-TEID list information and the second field information, the MBS session start response fed back to the father control plane node of the ith level control plane node is used for indicating that the ith level user plane node supports receiving the MBS data of the father user plane node of the ith level user plane node through multicast.

In another embodiment of the present disclosure, when or in response to determining that the MBS session start response fed back by the ith level control plane node to the father control plane node of the ith level control plane node includes the second F-TEID list information and does not include the second field information, the second MBS session start response fed back to the father control plane node of the ith level control plane node is used for indicating that the ith level user plane node supports receiving the MBS data of the father user plane node of the ith level user plane node through peer to peer rather than through multicast.

In another embodiment of the present disclosure, when or in response to determining that the MBS session start response fed back by the ith level control plane node to the father control plane node of the ith level control plane node does not include the second F-TEID list information and includes field information indicating that multicast transmission is stopped, the MBS session start response fed back to the father control plane node of the ith level control plane node is used for indicating that the ith level user plane node is not allocated.

In an embodiment of the present disclosure, if the ith level control plane node selects at least two ith level user plane nodes, the MBS session start request transmitted by the ith level control plane node to the son control plane node of the ith level control plane node includes identification information of each ith level user plane node and a first MBS IP multicast transmission address and a first C-TEID that are allocated by each ith level user plane node. Generally, first MBS IP multicast transmission addresses allocated by different ith level user plane nodes are different.

In an embodiment of the present disclosure, if the ith level control plane node selects at least two ith level user plane nodes, son user plane nodes respectively allocated by a son control plane node of the ith level control plane node to the at least two ith level user plane nodes are different, and each son user plane node allocated to the ith level user plane nodes is not allocated as a son node of another user plane node. That is, in this embodiment of the present disclosure, in the user plane MBS session transmission tree, each user plane node can have only one father user plane node, but can have multiple son user plane nodes.

In an embodiment of the present disclosure, the son control plane node of the ith level control plane node and the son user plane node of the ith level user plane node in the embodiments may be base stations. If the control plane is also separated from the user plane in the base station, the son control plane node of the ith level control plane node may be a centralized unit (CU) of the base station, and the son user plane node of the ith level user plane node may be a distributed unit (DU) of the base station.

In certain embodiment(s), the process of transmitting the MBS session start request to the son control plane node of the ith level control plane node by the ith level control plane node may be: the ith level control plane node (for example, SMF or MB-SMF) transmits an information transfer message to an AMF, the information transfer message including an access network identifier and a first MBS session container, the first MBS session container being used for instructing the AMF to transmit the MBS session start request to a base station corresponding to the access network identifier or a centralized unit of the base station. After transmitting the information transfer message to the AMF, the ith level control plane node may receive an information notification message transmitted by the AMF, the information notification message including a second MBS session container, the second MBS session container including an MBS session start response fed back by the base station or the centralized unit of the base station.

The AMF is an AMF capable of connecting the base station or the centralized unit of the base station to the ith level control plane node (for example, SMF or MB-SMF).

In an embodiment of the present disclosure, the base station or the centralized unit of the base station allocates user plane information of the base station or at least one distributed unit of the base station to the ith level user plane node as the son user plane node of the ith level user plane node according to registered user equipment information of an MBS multicast service (for the MBS multicast service) or a service area of an MBS broadcast service (for the MBS broadcast service). The user equipment information includes at least one of a location of a user equipment and a quantity of user equipments.

In FIG. 12, the communication method for a multicast broadcast service provided in this embodiment of the present disclosure is described from the perspective of the ith level control plane node. The communication method for a multicast broadcast service provided in this embodiment of the present disclosure is further described below from the perspective of the ith level user plane node with reference to FIG. 13 and FIG. 14.

Figure 13:
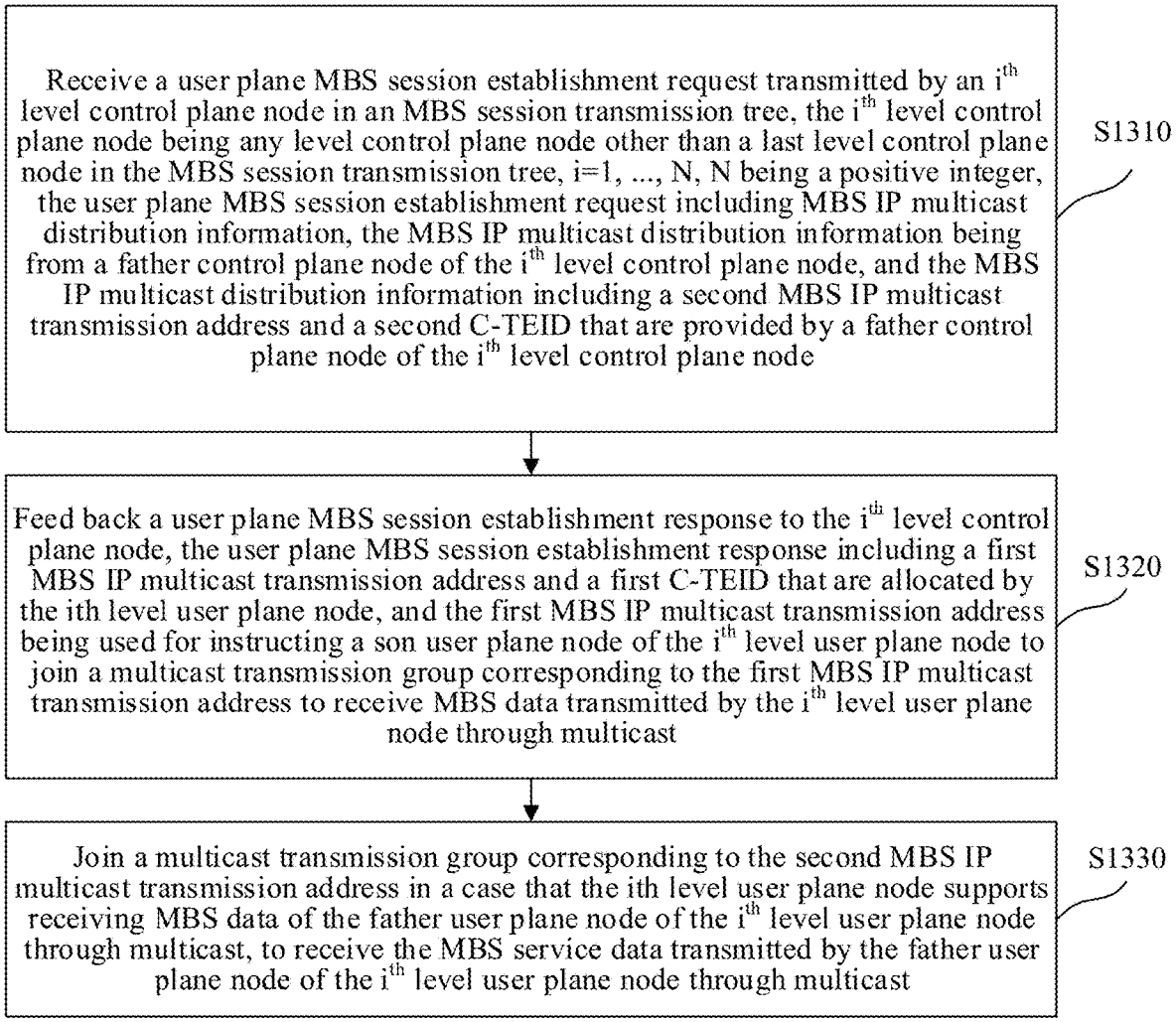
FIG. 13 is a schematic flowchart of a communication method for a multicast broadcast service according to certain embodiment(s) of the present disclosure.

FIG. 13 is a flowchart of a communication method for a multicast broadcast service according to an embodiment of the present disclosure. The communication method for a multicast broadcast service may be performed by an ith level user plane node such as the UPF in FIG. 10 or the MB-UPF in FIG. 11. The communication method for a multicast broadcast service includes at least step S1310 to step S1330. Descriptions are as follows.

Step S1310. Receive a user plane MBS session establishment request transmitted by an ith level control plane node in an MBS session transmission tree, the ith level control plane node being any level control plane node other than a last level control plane node in the MBS session transmission tree, i=1, . . . , N, N being a positive integer, the user plane MBS session establishment request including MBS IP multicast distribution information, the MBS IP multicast distribution information being from a father control plane node of the ith level control plane node, and the MBS IP multicast distribution information including a second MBS IP multicast transmission address and a second C-TEID that are provided by the father control plane node of the ith level control plane node.

Step S1320. Feed back a user plane MBS session establishment response to the ith level control plane node, the user plane MBS session establishment response including a first MBS IP multicast transmission address and a first C-TEID that are allocated by the ith level user plane node, and the first MBS IP multicast transmission address being used for instructing a son user plane node of the ith level user plane node to join a multicast transmission group corresponding to the first MBS IP multicast transmission address to receive MBS data transmitted by the ith level user plane node through multicast.

In an embodiment of the present disclosure, the son user plane node of the ith level user plane node is allocated by the son control plane node of the ith level control plane node, and different son user plane nodes are allocated for different ith level user plane nodes. For details, reference is made to the technical solution of the embodiments.

Step S1330. Join a multicast transmission group corresponding to the second MBS IP multicast transmission address when or in response to determining that the ith level user plane node supports receiving MBS data of the father user plane node of the ith level user plane node through multicast, to receive the MBS service data transmitted by the father user plane node of the ith level user plane node through multicast.

In an embodiment of the present disclosure, if the ith level user plane node supports receiving, through peer to peer rather than through multicast, the MBS data transmitted by the father user plane node of the ith level user plane node, an F-TEID m for receiving, through peer to peer, the MBS data transmitted by the father user plane node of the ith level user plane node is allocated, and then the F-TEID is fed back to the ith level control plane node by using the user plane MBS session establishment response.

Figure 14:
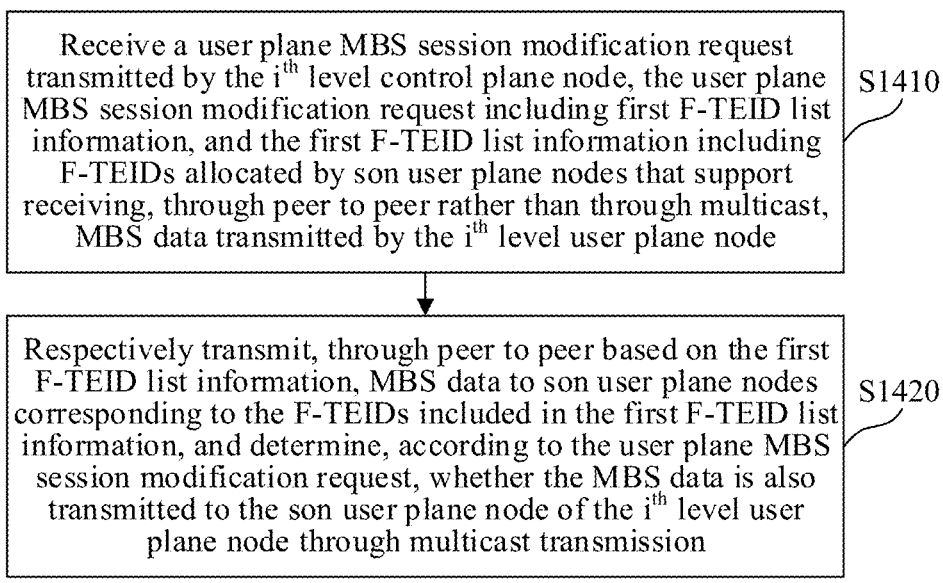
FIG. 14 is a schematic flowchart of a communication method for a multicast broadcast service according to certain embodiment(s) of the present disclosure.

In an embodiment of the present disclosure, after the ith level user plane node feeds back the user plane MBS session establishment response to the ith level control plane node, as shown in FIG. 14, the method may further include the following steps:

Step S1410. Receive a user plane MBS session modification request transmitted by the ith level control plane node, the user plane MBS session modification request including first F-TEID list information, and the first F-TEID list information including F-TEIDs respectively allocated by son user plane nodes that support receiving, through peer to peer rather than through multicast, MBS data transmitted by the ith level user plane node.

In an embodiment of the present disclosure, if the son user plane node of the ith level user plane node supports receiving, through peer to peer rather than multicast, the MBS data transmitted by the ith level user plane node, when son user plane node of the ith level user plane node establishes a user plane MBS session with a son control plane node of the ith level control plane node, the son user plane node that supports receiving, through peer to peer rather than multicast, the MBS data transmitted by the ith level user plane node is allocated with an F-TEID, and then the F-TEID is fed back to the son control plane node of the ith level control plane node by using the user plane MBS session establishment response.

Step S1420. Respectively transmit, through peer to peer based on the first F-TEID list information, MBS data to son user plane nodes corresponding to the F-TEIDs included in the first F-TEID list information, and determine, according to the user plane MBS session modification request, whether the MBS data is also transmitted to the son user plane node of the ith level user plane node through multicast transmission.

In an embodiment of the present disclosure, if the user plane MBS session modification request includes first field information used for indicating that multicast transmission is started, the user plane MBS session modification request is further used for indicating that the ith level user plane node transmits the MBS data to the son user plane node of the ith level user plane node through multicast transmission simultaneously. When or in response to determining that the user plane MBS session modification request does not include the first field information, the user plane MBS session modification request is further used for instructing the ith level user plane node to transmit the MBS data to the son user plane nodes of the ith level user plane node without using multicast transmission. For specific details, reference is made to the technical solution of the embodiments. Details are not described again.

In some embodiments of the present disclosure, based on the solution, if the ith level user plane node receives the user plane MBS session deletion request transmitted by the ith level control plane node, the first user plane node transmits the user plane MBS session deletion response to the ith level control plane node. If the ith level user plane node has joined the multicast transmission group corresponding to the second MBS IP multicast transmission address, the ith level user plane node exits the multicast transmission group corresponding to the second MBS IP multicast transmission address after receiving the user plane MBS session deletion request. The technical solution of this embodiment is that a broken branch in the user plane MBS session transmission tree is deleted.

In an embodiment of the present disclosure, if the ith level user plane node receives a user plane MBS session establishment request transmitted by another control plane node after feeding back the user plane MBS session establishment response to the ith level control plane node, the ith level user plane node feeds back a rejection message to the another control plane node, to indicate to the another control plane node that the user plane node (i.e., the ith level user plane node) has been selected. That is, one user plane node can be selected by only one control plane node as a son node of another user plane node but cannot be separately selected by a plurality of control plane nodes.

In an embodiment of the present disclosure, if the ith level user plane node receives user plane MBS session establishment requests transmitted by a plurality of control plane nodes, the ith level user plane node selects one control plane node from the plurality of control plane nodes, feeds back a user plane MBS session establishment response to the one control plane node, and feeds back rejection messages to other control plane nodes in the plurality of control plane nodes, to indicate to the other control plane nodes that the user plane node has been selected. In certain embodiment(s), one user plane node can be selected by only one control plane node as a son node of another user plane node. Therefore, if user plane MBS session establishment requests transmitted by a plurality of control plane nodes are received, only one of the plurality of control plane nodes can be selected to feed back a user plane MBS session establishment response.

The technical solutions of the embodiments of the present disclosure have been described above from the perspectives of the ith level control plane node and the ith level user plane node respectively. The implementation details of the technical solutions of the embodiments of the present disclosure will be described in detail below from the perspective of interaction between entities.

In an embodiment of the present disclosure, an MBS session transmission tree of 5G is to ensure that there can be only one father user plane node of each user plane, but because the user plane is controlled by a control plane, there is not only one father control plane node of the control plane. In certain embodiment(s), son control plane nodes may respectively provide one or more different son user plane nodes to different father control plane nodes, that is, even though a same father control plane node corresponds to different father user plane nodes, son user plane node of the father user plane node are independent of each other.

If a plurality of son user plane nodes are allocated to one father control plane node, some son user plane nodes of the plurality of son user plane nodes support receiving data transmitted through multicast, and some other son user plane nodes do not support receiving the data transmitted through multicast but support receiving the MBS data through peer to peer. Therefore, the son user plane nodes that do not support receiving the data transmitted through multicast may allocate IP address+TEID (which is represented by F-TEID), to transmit the MBS data to the son user plane node through peer to peer.

Figure 15:
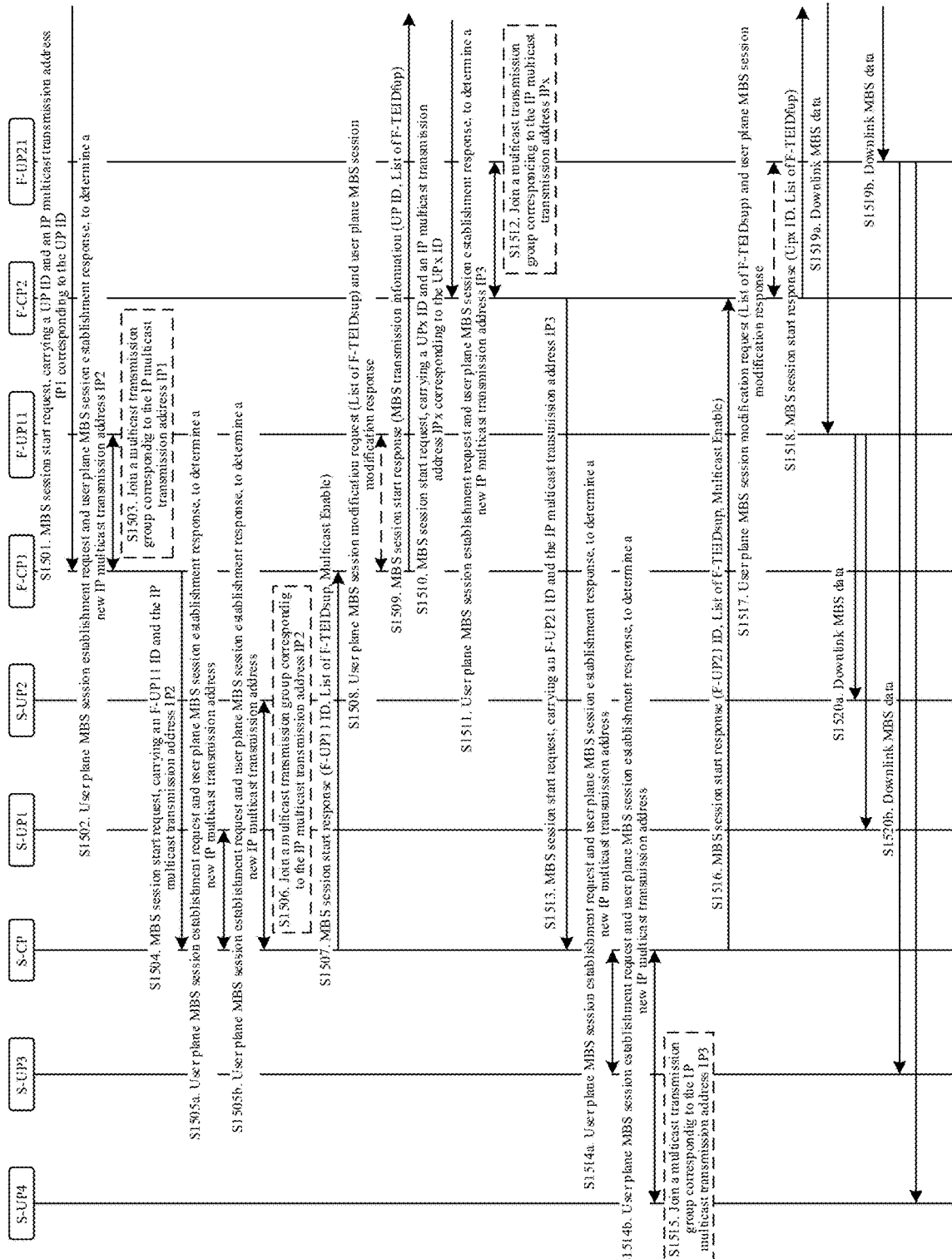
FIG. 15 is a schematic flowchart of an MBS communication method in which a control plane is separated from a user plane according to certain embodiment(s) of the present disclosure.

In certain embodiment(s), FIG. 15 shows an MBS communication method in which a control plane is separated from a user plane according to an embodiment of the present disclosure. In the following content, F-CP represents a father-control plane, S-CP represents a son-control plane, F-UP represents a father-user plane, and S-UP represents a son-user plane.

Referring to FIG. 15, the method includes the following steps.

Step S1501. An F-CP1 receives an MBS session start request (that is, Nfcp_MBSSessionStart Request) transmitted by a father control plane node of the F-CP1, the MBS session start request including a temporary mobile group identity (TMGI), an MBS session duration, MBS QoS flow identifiers (QFIs), a QoS profile, a UP ID (the UP ID is an identifier of a user plane node having a same level as the father control plane node of the F-CP1), an MBS IP multicast distribution (MBS IP multicast distribution information), an MBS time to data transfer, and an MBS service area.

The TMGI represents a multicast or broadcast temporary group identity. The MBS session duration represents a time length of a current MBS session. The MBS time to data transfer represents a time when MBS data starts to be transmitted. The QoS profile includes a 5G QoS identifier (5QI), a maximum flow bit rate (MFBR), a guaranteed flow bit rate (GFBR), an allocation and retention priority (ARP), and the like. The MBS IP multicast distribution includes an IP multicast transmission address (the IP multicast transmission address is an IP multicast transmission address and a C-TEID that are allocated by a user plane node (that is, the user plane node identified by the UP ID) having a same level as the father control plane node of the F-CP1, and for ease of distinguishing, the IP multicast transmission address is denoted as IP1) (for simplification, father control plane nodes of the F-CP1 and an F-CP2 are not drawn in FIG. 15, and father user plane nodes of an F-UP11 and an F-UP21 are not drawn). The MBS service area is a service area when the MBS is a broadcast service.

Step S1502. The F-CP1 determines, according to information about a son control plane node of the F-CP1, that one or more F-UPFs are selected from a plurality of F-UPFs as user plane nodes having same levels as the F-CP1. In this embodiment, it is assumed that one user plane node (which is denoted as F-UP11) having a same level as the F-CP1 is selected, the F-CP1 transmits a user plane MBS session establishment request (that is, N4 MBSSessionEstablishment Request) to the F-UP11, and the F-UP11 feeds back a user plane MBS session establishment response (that is, N4 MBSSessionEstablishment Response) to the F-CP1.

In an embodiment of the present disclosure, for an MBS multicast service, the information about the son control plane node of the F-CP1 is formed by MBS UE contexts. For an MBS broadcast service, the information about the son control plane node of the F-CP1 is provided by the father control plane node of the F-CP1 or configured by a network according to the service area. The information about the son control plane node of the F-CP1 includes a quantity of son-control plane nodes of the F-CP1 and position information thereof.

In an embodiment of the present disclosure, the user plane MBS session establishment request transmitted by the F-CP1 to the selected F-UP11 may include a packet detection rule (PDR), a QoS enforcement rule (QER), a forwarding action rule (FAR), an MBS IP multicast distribution, an indication of allocate new MBS IP multicast distribution information for downlink node, and an indication of requesting to allocate an F-TEID. The user plane MBS session establishment response fed back by the F-UP11 includes the allocate MBS IP multicast distribution for downlink node and the F-TEID.

The PDR in the user plane MBS session establishment request includes one or more MBS IP multicast addresses+ UDP ports to indicate one or more different MBS QoS flows. The QER includes the MFBR and the GFBR that correspond to the PDR and a downlink (DL) flow level marking. The MBS IP multicast distribution is an MBS IP multicast distribution corresponding to the TMGI and is from the MBS session start request transmitted by the father control plane node of the F-CP1 and received by the F-CP1, and the MBS IP multicast transmission address included in the MBS IP multicast distribution is IP1.

The indication of allocate new MBS IP multicast distribution for downlink node in the user plane MBS session establishment request is used for indicating that a son user plane node exists in the F-UP11. Therefore, the F-UP11 is to allocate a new MBS IP multicast distribution. The allocate MBS IP multicast distribution for downlink node in the user plane MBS session establishment response includes the new MBS IP multicast distribution allocated by the F-UP11, and the new MBS IP multicast distribution includes a new IP multicast transmission address (for ease of distinguishing, the new IP multicast transmission address is denoted as IP2) and a C-TEID.

The MBS IP multicast distribution is allocated by each father user plane node to all son user plane nodes of the each father user plane node. Different father user plane nodes allocate different MBS IP multicast distributions.

In addition, according to a network configuration, if the F-UP11 does not support receiving MBS data transmitted through multicast but supports receiving the MBS data through peer to peer, the user plane MBS session establishment request transmitted by the F-CP1 includes the indication of requesting to allocate an F-TEID, for requesting the F-UP11 to allocate an F-TEID for receiving, through peer to peer, MBS data transmitted by a father user plane node of the F-UP11. After the F-UP11 allocates the F-TEID, the user plane MBS session establishment response carries the allocated F-TEID.

If the user plane MBS session establishment request does not include the indication of requesting to allocate an F-TEID, that is, the F-CP1 does not make a decision, but the user plane node F-UP11 does not support receiving data transmitted through multicast, the F-UP11 also is to allocate an F-TEID, and the user plane MBS session establishment response carries the allocated F-TEID.

Step S1503. Apply to join a multicast transmission group corresponding to an IP multicast transmission address IP1 when or in response to determining that the F-UP11 supports receiving data transmitted through multicast to receive MBS data transmitted by a father user plane node of the F-UP11.

Step S1504. The F-CP1 transmits the MBS session start request (that is, Nscp_MBSSessionStart Request) to each son control plane node according to the information about the son control plane node of the F-CP1, that is, step S1504 to step S1508 are performed separately for each son control plane node. In this embodiment, a description is made by using an example in which the MBS session start request is transmitted to one son control plane node S-CP.

The MBS session start request transmitted by the F-CP1 to the son control plane node S-CP of the F-CP1 includes the following parameters: TMGI, MBS Session Duration, MBS QFIs, QoS Profile, F-UP11 ID, MBS IP Multicast Distribution, MBS Time to Data Transfer, and MBS Service Area. The MBS IP multicast distribution in the MBS session start request transmitted by the F-CP1 is allocated in step S1502, and an IP multicast transmission address included in the MBS IP multicast distribution is IP2.

After the S-CP receives the MBS session start request transmitted by the F-CP1, similar to step S1502, the S-CP selects one or more S-UPs of the F-UP11 from a plurality of S-UPs according to information about a son control plane node of the S-CP. In this embodiment, it is assumed that an S-UP1 and an S-UP2 are selected. Then, step S1505a and step S1505b are respectively executed.

Step S1505a. The S-CP transmits a user plane MBS session establishment request to the selected S-UP1, and the S-UP1 feeds back a user plane MBS session establishment response to the S-CP.

In an embodiment of the present disclosure, the user plane MBS session establishment request transmitted by the S-CP may also include a PDR, a QER, an FAR, an MBS IP multicast distribution, an F-UP11 ID, an indication of allocate new MBS IP multicast distribution for downlink node, an indication of requesting to allocate an F-TEID, and the like. The user plane MBS session establishment response fed back by the S-UP1 includes the allocate MBS IP multicast distribution for downlink node and the F-TEID.

The MBS IP multicast distribution in the user plane MBS session establishment request transmitted by the S-CP is from the MBS session start request received in step S1504, and an IP multicast transmission address included in the MBS IP multicast distribution is IP2. The indication of allocate new MBS IP multicast distribution for downlink node in the user plane MBS session establishment request transmitted by the S-CP to the S-UP1 is used for instructing the S-UP1 to allocate a new MBS IP multicast distribution for transmitting the MBS data to a son user plane node of the S-UP1 through multicast transmission. For a specific allocation process of the S-UP1, reference is made to the description in step S1502. In certain embodiment(s), if the S-UP1 does not support multicast transmission, an F-TEID may be allocated by the S-UP1.

Step S1505b. The S-CP transmits a user plane MBS session establishment request to the selected S-UP2, and the S-UP2 feeds back a user plane MBS session establishment response to the S-CP. A specific process is similar to step S1505a. Details are not described again.

Step S1506. The S-UP1 and the S-UP2 respectively join a multicast transmission group corresponding to an IP multicast transmission address (that is, an IP2) allocated by the F-UP11 when or in response to determining that the S-UP1 and the S-UP2 support receiving the data transmitted through multicast, to receive the MBS data transmitted by the F-UP11.

Step S1507. The S-CP transmits an MBS session start response (that is, Nscp_MBSSessionStart Response) to the F-CP1, the MBS session start response including an F-UP11 ID.

If there is an S-UP that does not support receiving the data transmitted through multicast in the S-UP1 and the S-UP2, the MBS session start response transmitted by the S-CP to the F-CP1 includes a list of F-TEID (because the list of F-TEID is for the son user plane node, the list of F-TEID is denoted as a list of F-TEIDsup for ease of distinguishing), which corresponds to the F-UP11. The list of F-TEIDsup includes an F-TEID allocated to the S-UP that supports receiving MBS data in the through peer to peer rather than in the multicast transmission manner in the S-UP1 and the S-UP2. If some S-UPs in the S-UP1 and the S-UP2 support the multicast transmission, it is desirable to include multicast enable in the MBS session start response to indicate that F-UP11 is to use both multicast transmission and peer-to-peer transmission technologies to transmit MBS data to the son user plane node of F-UP11.

In certain embodiment(s), if the MBS session start response transmitted by the S-CP to the F-CP1 does not include the list of F-TEIDsup, it indicates that all son user plane nodes selected by the S-CP support receiving the data transmitted through multicast. Therefore, the MBS session start response is not to carry the identifier of multicast enable.

In certain embodiment(s), if the MBS session start response transmitted by the S-CP to the F-CP1 includes the list of F-TEIDsup, but does not include the identifier of multicast enable, it indicates that all son user plane nodes selected by the S-CP do not support receiving of data transmitted in the multicast manner, but support receiving of the MBS data transmitted in the through peer to peer.

In certain embodiment(s), if the MBS session start response transmitted by the S-CP to the F-CP1 does not include the list of F-TEIDsup, and multicast enable is set to disable, it indicates that the son control plane node S-CP does not allocate a corresponding son user plane node to the F-UP11 (one reason is that son user plane nodes to be selected have been allocated to father user plane nodes, In certain embodiment(s), the son user plane nodes cannot be selected). In certain embodiment(s), the son control plane node S-CP may also return a failure code by using the MBS session start response for an indication.

If only one son user plane node of the sub user plane nodes selected by the S-CP does not support receiving of data transmitted in the multicast manner, the MBS session start response transmitted by the S-CP to the F-CP1 may not include the list of F-TEIDsup, but includes only the F-TEID allocated to the son user plane node.

Step S1508. If the MBS session start response in step S1507 includes an F-UP11 ID and an F-TEID parameter (for example, an F-TEID allocated to an S-UP or a list of F-TEIDsup corresponding to some S-UPs), the F-CP1 transmits a user plane MBS session modification request (that is, N4 MBSSessionModification Request) to the F-UP11, and the F-UP11 feeds back a user plane MBS session modification response to the F-CP1. The user plane MBS session modification request includes the list of F-TEIDsup corresponding to the S-UPs that support receiving of the MBS data in the through peer to peer rather than in the multicast transmission manner, to instruct the F-UP11 to respectively transmit, in the through peer to peer, the MBS service data to the S-UPs that support receiving of the MBS data in the through peer to peer rather than in the multicast transmission manner. If the MBS session start response in step S1507 does not include an indication of multicast enable, it indicates that the F-UP11 no longer uses the multicast transmission manner. If the MBS session start response in step S1507 includes the indication of multicast enable, it indicates that the F-UP11 uses both the multicast transmission manner and peer-to-peer transmission manner.

If the MBS session start response in step S1507 includes only one F-TEID, and the F-UP11 does not learn a specific quantity of son user plane nodes of the F-UP11, the F-UP11 may transmit MBS data to an S-UP corresponding to the F-TEID only through peer to peer. The F-UP11 may simultaneously transmit the MBS data to other S-UPs by using the multicast transmission address (that is, the IP2) according to the user plane MBS session modification request in step S1508.

If the MBS session start response in step S1507 does not include the F-TEID, and multicast enable is not set to disable, it indicates that the F-UP11 continues to use the multicast transmission manner. In certain embodiment(s), step S1508 is not to be executed.

Step S1509. After step S1504 to step S1508 are performed for each son control plane node, the F-CP1 transmits an MBS session start response (that is, Nfcp_MBSSessionStart Response) to the father control plane node of the F-CP1 according to MBS session start responses fed back by all the son control plane nodes.

Similar to step S1507, the MBS session start response replied by the F-CP1 to the father control plane node of the F-CP1 includes an UP ID (the UP ID is an identifier of a user plane node having a same level as the father control plane node of the F-CP1), and may also include a list of F-TEID (which is denoted as a list of F-TEIDfup for ease of distinguishing). Because the F-CP1 selects only a same-level user plane node F-UP11, if the MBS session start response replied by the F-CP1 to the father control plane node of the F-CP1 includes the list of F-TEIDfup, the list of F-TEIDfup includes only an F-TEID allocated by the F-UP11.

Because the F-CP1 selects only the same-level user plane node F-UP11 in this embodiment, if the MBS session start response replied by the F-CP1 to the father control plane node of the F-CP1 does not include the F-TEID allocated by the F-UP11, in certain embodiment(s), it indicates that the F-UP11 supports receiving the data transmitted through multicast. In certain embodiment(s), the MBS session start response replied by the F-CP1 to the father control plane node of the F-CP1 is not to include multicast enable. If the MBS session start response replied by the F-CP1 to the father control plane node of the F-CP1 includes the F-TEID allocated by the F-UP11, it indicates that the F-UP11 does not support receiving the data transmitted through multicast. In certain embodiment(s), because the F-CP1 has only one same-level user plane node F-UP11, the MBS session start response replied by the F-CP1 to the father control plane node of the F-CP1 is not to include multicast enable.

Step S1501 to step S1509 are a processing process after the MBS session start request transmitted by the father control plane node of the F-C 1 is received by the F-CP1. In the processing process, the F-CP1 selects a same-level user plane node F-UP11, and the son control plane node S-CP of the F-CP1 selects two son user plane nodes S-UP1 and S-UP2 that have same levels as the S-CP.

Continuing to refer to FIG. 15, the method further includes the following steps.

Step S1510. An F-CP2 receives an MBS session start request transmitted by a father control plane node of the F-CP2, the MBS session start request including a TMGI, an MBS session duration, MBS QFIs, a QoS profile, a UPx ID, an MBS IP multicast distribution, an MBS time to data transfer, and an MBS service area. For specific meanings of the parameters, reference is made to the descriptions in step S1501. For ease of distinguishing, an IP multicast transmission address included in the MBS IP multicast distribution in the MBS session start request received by the F-CP2 may be denoted as IPx.

Step S1511. The F-CP2 determines, according to information about a son control plane node of the F-CP2, that one or more F-UPFs are selected from a plurality of F-UPFs as user plane nodes having same levels as the F-CP2. In this embodiment, it is assumed that only one user plane node F-UP21 having a same level as the F-CP2 is selected, then the F-CP2 transmits a user plane MBS session establishment request to the F-UP21, and the F-UP21 feeds back a user plane MBS session establishment response to the F-CP2.

For a description, reference is made to the related content in step S1502. Similar to step S1502, the F-CP2 interacts with the F-UP21 by using the user plane MBS session establishment request and the user plane MBS session establishment response, and the F-UP21 allocates a new IP multicast transmission address (which is denoted as IP3 for ease of distinguishing).

In addition, if the F-UP21 does not support receiving data transmitted through multicast, the F-UP21 allocates an F-TEID used for receiving MBS data through peer to peer, and carries the allocated F-TEID in the user plane MBS session establishment response.

Step S1512. An F-UP21 applies to join a multicast transmission group corresponding to an IP multicast transmission address IPx when or in response to determining that the F-UP21 supports receiving data transmitted through multicast, to receive MBS data transmitted by a father user plane node of the F-UP21.

Step S1513. The F-CP2 transmits the MBS session start request to each son control plane node according to the information about the son control plane node of the F-CP2, that is, step S1513 to step S1517 are performed separately for each son control plane node. In this embodiment, a description is made by using an example in which the MBS session start request is transmitted to one son control plane node S-CP.

In certain embodiment(s), the MBS session start request transmitted by the F-CP2 to the son control plane node S-CP of the F-CP2 also includes an MBS IP multicast distribution. The MBS IP multicast distribution is allocated in step S1511, and a corresponding user plane node identifier is an F-UP21 ID, and an IP multicast transmission address included in the MBS IP multicast distribution is IP3.

There is no sequential relationship between step S1513 and step S1504, which may be steps performed in parallel by the F-CP2 and the F-CP1.

After the S-CP receives the MBS session start request transmitted by the F-CP2, similar to the step, the S-CP selects one or more S-UPs for the F-UP21 from a plurality of S-UPs according to information about a son control plane node of the S-CP. In this embodiment, it is assumed that an 5-UP3 and an S-UP4 are selected, and then step S1514a and step S1514b are performed respectively.

The S-UPs selected by the S-CP for the F-UP21 are different from the S-UPs selected by the S-CP for the F-UP11. In other words, in this embodiment of the present disclosure, there may be a plurality of father control plane nodes for one son control plane node in a control plane. For example, a son control plane node S-CP has two father control plane nodes F-CP1 and F-CP2, but one son user plane node is not allowed to have a plurality of father user plane nodes. In this way, when one son user plane node already has one father user plane node, the son user plane node cannot participate in selection of a son user plane node. Therefore, the S-CP can select only the S-UP3 and the S-UP4 for the F-UP21, and the S-UP1 and the S-UP2 have been selected as son user plane nodes of the F-UP11. Therefore, the S-CP cannot select the S-UP1 and the S-UP2 as son user plane nodes of the F-UP21.

Step S1514a. The S-CP transmits a user plane MBS session establishment request to the selected S-UP3, and the S-UP3 feeds back a user plane MBS session establishment response to the S-CP. Step S1514b. The S-CP transmits a user plane MBS session establishment request to the selected S-UP4, and the S-UP4 feeds back a user plane MBS session establishment response to the S-CP. A specific process is similar to step S1505a. Details are not described again.

Step S1515. The S-UP3 and the S-UP4 respectively join a multicast transmission group corresponding to an IP multicast transmission address (that is, IP3) allocated by the F-UP21 when or in response to determining that the S-UP3 and the S-UP4 support receiving the data transmitted through multicast, to receive the MBS data transmitted by the F-UP21.

Step S1516. The S-CP transmits an MBS session start response to the F-CP2, the MBS Session start response including an F-UP21 ID. A description of the step is similar to step S1507, and details are not described herein again.

Step S1517. The F-CP2 transmits a user plane MBS session modification request to the F-UP21, and the F-UP21 feeds back a user plane MBS session modification response to the F-CP2. A description of the step is similar to step S1508, and details are not described herein again.

Step S1518. After step S1513 to step S1517 are performed for each son control plane node, the F-CP2 transmits an MBS session start response to the father control plane node of the F-CP2 according to MBS session start responses fed back by all the son control plane nodes. A description of the step is similar to step S1509, and details are not described herein again.

Step S1510 to step S1518 are a processing process after the MBS session start request transmitted by the father control plane node of the F-CP2 is received by the F-CP2. In the processing process, the F-CP2 selects a same-level user plane node F-UP21, and the son control plane node S-CP of the F-CP2 selects two son user plane nodes S-UP3 and S-UP4 that have same levels as the S-CP.

It can be learned from step S1501 to step S1518 that in the embodiments of the present disclosure, the son control plane node S-CP has a plurality of father control plane nodes F-CP1 and F-CP2, and the son user plane node S-UP controlled by the S-CP has only one father user plane node.

In addition, the message in step S1501 and the message in step S1510 may be transmitted in parallel, and therefore, steps S1501 to S1509 and steps S1510 to S1518 may be performed in parallel. In this way, in a user plane MBS session establishment process, two control plane nodes may transmit user plane MBS session establishment requests to one user plane node simultaneously, or after being selected by one control plane node, one user plane node receives a user plane MBS session establishment request transmitted by an other control plane node. If one user plane node simultaneously receives user plane MBS session establishment requests transmitted by two control plane nodes (which may be more control plane nodes, herein a description is made by using an example of two control plane nodes), the user plane node may normally respond to the user plane MBS session establishment request transmitted by one of the control plane nodes in a user plane MBS session establishment response, and reject the other control plane node in an other user plane MBS session establishment response, to indicate that the user plane node has been selected. If one user plane node already has a father user plane node by using one control plane node and when receiving a user plane MBS session establishment request transmitted by an other control plane node, the user plane node rejects the other control plane node in an other user plane MBS session establishment response, to indicate that the user plane node has been selected.

After this MBS session transmission tree is established, the following steps may be performed.

Step S1519a. The F-UP11 receives downlink MBS data transmitted by the father user plane node of the F-UP11. Subsequently, the received downlink MBS data is transmitted to the S-UP1 and the S-UP2 in step S1520a.

For each user plane node having a father user plane node, MBS data is to be received in a multicast transmission manner or a peer-to-peer transmission manner determined in the steps. For example, for the S-UP1 and the S-UP2, if it is determined that only the multicast transmission manner is adopted, the S-UP1 and the S-UP2 receive, in the multicast transmission manner, the MBS data transmitted by the F-UP11. If it is determined that only the peer-to-peer transmission manner is adopted, the S-UP1 and the S-UP2 respectively receive, in the peer-to-peer transmission manner, the MBS data transmitted by the F-UP11.

For each user plane node having son user plane nodes, MBS data is to be transmitted to each son user plane node in a multicast transmission manner or a peer-to-peer transmission manner in the steps. For example, for the F-UP11, if it is determined that only the multicast transmission manner is adopted, the F-UP11 transmits the MBS data to all son user plane nodes (that is, the S-UP1 and the S-UP2 in this embodiment) of the F-UP11 in the multicast transmission manner. If it is determined that only the peer-to-peer transmission manner is adopted, the F-UP11 transmits the MBS data to each son user plane node (that is, the S-UP1 and the S-UP2 in this embodiment) of the F-UP11 in the peer-to-peer transmission manner.

Step S1519b. The F-UP21 receives downlink MBS data transmitted by the father user plane node of the F-UP21. Subsequently, the received downlink MBS data is transmitted to the S-UP3 and the S-UP4 in step S1520b. Each user plane node transmits the MBS data in the multicast transmission manner or the peer-to-peer transmission manner determined in the steps, and each user plane node receives the MBS data in the multicast transmission manner or the peer-to-peer transmission manner determined in the steps.

In the embodiment shown in FIG. 15, the MBS session start request transmitted by the father control plane node to the son control plane node includes information about only one father user plane node. In another embodiment of the present disclosure, that the MBS session start request transmitted by the father control plane node to the son control plane node may include information about a plurality of father user plane nodes is described with reference to FIG. 16.

Figure 16:
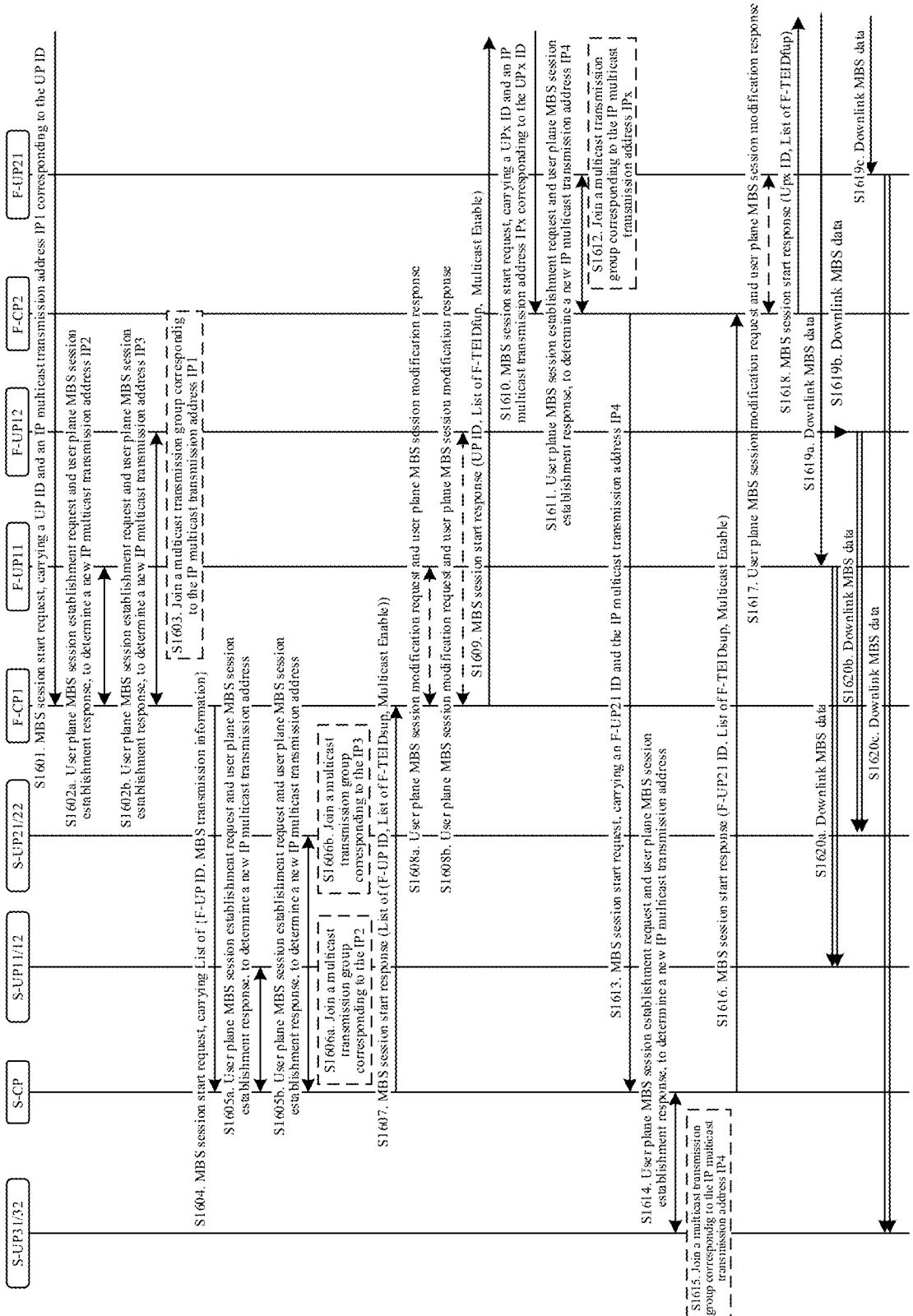
FIG. 16 is a schematic flowchart of an MBS communication method in which a control plane is separated from a user plane according to certain embodiment(s) of the present disclosure.

In certain embodiment(s), FIG. 16 shows an MBS communication method in which a control plane is separated from a user plane according to an embodiment of the present disclosure. In certain embodiment(s), in the following content, F-CP represents a father-control plane, S-CP represents a son-control plane, F-UP represents a father-user plane, and S-UP represents a son-user plane.

Referring to FIG. 16, the method includes the following steps.

Step S1601. An F-CP1 receives an MBS session start request transmitted by a father control plane node of the F-CP1. A specific process is similar to step S1501. Details are not described again. An IP multicast transmission address included in an MBS IP multicast distribution in the MBS session start request is denoted as IP1.

After receiving the MBS session start request transmitted by the father control plane node of the F-CP1, the F-CP1 may determine, according to information about a son control plane node of the F-CP1, that one or more F-UPFs are selected from a plurality of F-UPFs as user plane nodes having same levels as the F-CP1. In this embodiment, it is assumed that two user plane nodes are selected, which are denoted as an F-UP11 and an F-UP12. Then, step S1602a and step S1602b are respectively executed.

Step S1602a. The F-CP1 transmits a user plane MBS session establishment request to an F-UP11, and the F-UP11 feeds back a user plane MBS session establishment response to the F-CP1. The process is similar to the process of step S1502 in the embodiment, and details are not described again. An IP multicast transmission address allocated by the F-UP11 in step S1602a is denoted as IP2.

Step S1602b. The F-CP1 transmits a user plane MBS session establishment request to an F-UP12, and the F-UP12 feeds back a user plane MBS session establishment response to the F-CP1. The process is similar to the process of step S1502 in the embodiment, and details are not described again. An IP multicast transmission address allocated by the F-UP12 in step S1602b is denoted as IP3.

Step S1603. The F-UP11 and the F-UP12 apply to join a multicast transmission group corresponding to an IP multicast transmission address IP1 when or in response to determining that the F-UP11 and the F-UP12 support receiving data transmitted through multicast, to receive MBS data transmitted by father user plane nodes of the F-UP11 and the F-UP12.

Step S1604. The F-CP1 transmits the MBS session start request to each son control plane node according to the information about the son control plane node of the F-CP1, that is, step S1604 to step S1608 are performed separately for each son control plane node. In this embodiment, a description is made by using an example in which the MBS session start request is transmitted to one son control plane node S-CP.

The MBS session start request transmitted by the F-CP1 to the son control plane node S-CP of the F-CP1 includes the following parameters: TMGI, MBS Session Duration, MBS QFIs, QoS Profile, MBS Time to Data Transfer, List of {F-UP ID, MBS transmission information}, and MBS Service Area. The MBS transmission information is an MBS IP multicast distribution (which includes an IP multicast transmission address and a C-TEID). In this embodiment, because the F-CP1 selects two user plane nodes F-UP11 and F-UP12 that have same levels as the F-CP1, the list of {F-UP ID, MBS transmission information} includes an F-UP11 ID, an MBS IP multicast distribution corresponding to the F-UP11 ID, an F-UP12 ID, and an MBS IP multicast distribution corresponding to the F-UP12 ID. The MBS IP multicast distribution corresponding to the F-UP11 ID is allocated by the F-UP11, and the IP multicast transmission address included in the MBS IP multicast distribution is IP2. The MBS IP multicast distribution corresponding to the F-UP12 ID is allocated by the F-UP12, and the IP multicast transmission address included in the MBS IP multicast distribution is IP3.

The IP multicast transmission address IP3 allocated by the F-UP12 cannot be the same as the IP multicast transmission address IP2 allocated by the F-UP11, but the allocated C-TEIDs may be the same.

After receiving the MBS session start request transmitted by the F-CP1, similar to step S1502, the S-CP selects one or more S-UPs for the F-UP11 from a plurality of S-UPs according to information about a son control plane node of the S-CP, and selects one or more S-UPs for the F-UP12. In this embodiment, it is assumed that an S-UP11 and an S-UP 12 are selected for the F-UP11, and an S-UP21 and an S-UP22 are selected for the F-UP12, that is, different son user plane nodes are selected for the F-UP11 and the F-UP12. Then, step S1605a and step S1605b are respectively executed.

Step S1605a. The S-CP respectively transmits user plane MBS session establishment requests to the selected S-UP11 and S-UP12, the user plane MBS session establishment request including the IP multicast transmission address IP2 allocated by the F-UP11, and the S-UP11 and the S-UP12 respectively feed back user plane MBS session establishment responses to the S-CP (for saving layout, the S-UP11 and the S-UP12 are drawn together in FIG. 16). A specific process is similar to step S1505a. Details are not described again.

Step S1605b. The S-CP respectively transmits user plane MBS session establishment requests to the selected S-UP21 and S-UP22, the user plane MBS session establishment request including the IP multicast transmission address IP3 allocated by the F-UP12, and the S-UP21 and the S-UP22 respectively feed back user plane MBS session establishment responses to the S-CP (for saving layout, the S-UP21 and the S-UP22 are drawn together in FIG. 16). A specific process is similar to step S1505a. Details are not described again.

Step S1606a. The S-UP11 and the S-UP12 respectively join a multicast transmission group corresponding to the IP multicast transmission address (that is, the IP2) allocated by the F-UP11 when or in response to determining that the S-UP11 and the S-UP12 support receiving the data transmitted through multicast, to receive the MBS data transmitted by the F-UP11.

Step S1606b. The S-UP21 and the S-UP22 respectively join a multicast transmission group corresponding to the IP multicast transmission address (that is, the IP3) allocated by the F-UP12 when or in response to determining that the S-UP21 and the S-UP22 support receiving the data transmitted through multicast manner, to receive the MBS data transmitted by the F-UP12.

Step S1607. The S-CP transmits an MBS session start response to the F-CP1. If an S-UP does not support receiving the data transmitted through multicast, the MBS session start response includes an F-TEID allocated by the S-UP, and the F-TEID corresponds to the F-UP, to form a List of {F-UP ID, List of F-TEIDsup, Multicast Enable}. In this embodiment, the list of {F-UP ID, list of F-TEIDsup, multicast enable} includes the list of F-TEIDsup and the multicast enable for the F-UP11 and the list of F-TEIDsup and the multicast enable for the F-UP12.

Similar to step S1507, because some S-UPs support receiving the data transmitted through multicast, and some other S-UPs do not support receiving the data transmitted through multicast, the list of F-TEIDsup corresponds to only the S-UPs that support receiving MBS data through peer to peer rather than through multicast transmission. Therefore, when all S-UPs of one F-UP support receiving the data transmitted through multicast, there is no list of F-TEIDsup corresponding to the F-UP. For another description, reference is made to the related content of step S1507.

In addition, when the S-CP determines not to allocate any son user plane node to an/some F-UP IDs, multicast enable corresponding to this/these F-UP IDs may be set to Disable. In certain embodiment(s), a failed list {F-UP} may alternatively be used in the MBS session start response to indicate a father user plane node to which a son user plane node is not allocated.

Step S1608a. The F-CP1 transmits a user plane MBS session modification request to the F-UP11 according to the list of {F-UP ID, list of F-TEIDsup, multicast enable} included in the MBS session start response, and the F-UP11 feeds back a user plane MBS session modification response to the F-CP1. A description of the step is similar to step S1508, and details are not described herein again.

Step S1608b. The F-CP1 transmits a user plane MBS session modification request to the F-UP12 according to the list of {F-UP ID, list of F-TEIDsup, multicast enable} included in the MBS session start response, and the F-UP12 feeds back a user plane MBS session modification response to the F-CP1. A description of the step is similar to step S1508, and details are not described herein again.

Step S1609. After step S1604 to step S1608 are performed for each son control plane node, the F-CP1 transmits an MBS session start response to the father control plane node of the F-CP1 according to MBS session start responses fed back by all the son control plane nodes.

Because the F-CP1 selects two user plane nodes F-UP11 and F-UP12 that have same levels as the F-CP1, if F-UPs that do not support receiving the data transmitted through multicast exists in the F-UP11 and the F-UP12, the MBS session start response replied by the F-CP1 to the father control plane node of the F-CP1 includes a list of F-TEID (because the list of F-TEID is for the father user plane node, the list of F-TEID is denoted as a list of F-TEIDfup for ease of distinguishing), and the list of F-TEIDfup corresponds to UP IDs of the father user plane nodes of the F-UP11 and the F-UP12. The list of F-TEIDfup includes F-TEIDs allocated by the F-UPs that support receiving MBS data through peer to peer rather than through multicast transmission in the F-UP11 and the F-UP12. If some F-UPs in the F-UP11 and the F-UP12 support receiving the data transmitted through multicast, the MBS session start response is to include multicast enable to indicate that the father user plane nodes of the F-UP11 and the F-UP12 transmit the MBS data to the F-UP11 and the F-UP12 by using multicast transmission and peer-to-peer transmission technologies.

In certain embodiment(s), if the MBS session start response replied by the F-CP1 to the father control plane node of the F-CP1 does not include the list of F-TEIDsup, it indicates that all user plane nodes that have same levels as the F-CP1 and are selected by the F-CP1 support receiving the data transmitted through multicast. Therefore, the MBS session start response is not to carry an identifier of multicast enable.

In certain embodiment(s), if the MBS session start response replied by the F-CP1 to the father control plane node of the F-CP1 includes the list of F-TEIDsup, but does not include the identifier of multicast enable, it indicates that all the user plane nodes that have the same levels as the F-CP1 and are selected by the F-CP1 do not support receiving the data transmitted through multicast, but support receiving the MBS data transmitted through peer to peer.

In certain embodiment(s), if the MBS session start response replied by the F-CP1 to the father control plane node of the F-CP1 does not include the list of F-TEIDfup, and multicast enable is set to disable, it indicates that the F-CP1 does not select user plane nodes that have same levels as the F-CP1. In certain embodiment(s), the F-CP1 may also return a failure code by using the MBS session start response for an indication.

If only one user plane node of the user plane nodes that have the same levels as the F-CP1 and are selected by the F-CP1 does not support receiving the data transmitted through multicast, the MBS session start response may alternatively not include the list of F-TEIDfup, but include only an F-TEID allocated by the user plane node that supports receiving the MBS data through peer to peer rather than through multicast transmission.

Step S1601 to step S1609 are a processing process after the MBS session start request transmitted by the father control plane node of the F-CP1 is received by the F-CP1. In the processing process, the F-CP1 selects two user plane nodes F-UP11 and F-UP12 that have the same levels as the F-CP1, and a son control plane node S-CP of the F-CP1 selects two son user plane nodes S-UP11 and S-UP12 that have the same levels as the S-CP for the F-UP11, and selects two son user plane nodes S-UP21 and S-UP22 that have the same levels as the S-CP for the F-UP12.

Continuing to refer to FIG. 16, the method further includes the following steps.

Step S1610. An F-CP2 receives an MBS session start request transmitted by a father control plane node of the F-CP2, the MBS session start request including a TMGI, an MBS session duration, MBS QFIs, a QoS profile, a UPx ID, an MBS IP multicast distribution, an MBS time to data transfer, and an MBS service area. For specific meanings of the parameters, reference is made to the descriptions in step S1501. For ease of distinguishing, an IP multicast transmission address included in the MBS IP multicast distribution in the MBS session start request received by the F-CP2 may be denoted as IPx.

Step S1611. The F-CP2 determines, according to information about a son control plane node of the F-CP2, that one or more F-UPFs are selected from a plurality of F-UPFs as user plane nodes having same levels as the F-CP2. In this embodiment, it is assumed that only one user plane node F-UP21 having a same level as the F-CP2 is selected, then the F-CP2 transmits a user plane MBS session establishment request to the F-UP21, and the F-UP21 feeds back a user plane MBS session establishment response to the F-CP2.

For a description, reference is made to the related content in step S1502. Similar to step S1502, the F-CP2 interacts with the F-UP21 by using the user plane MBS session establishment request and the user plane MBS session establishment response, and the F-UP21 allocates a new IP multicast transmission address (which is denoted as IP4 for ease of distinguishing).

In addition, if the F-UP21 does not support receiving data transmitted through multicast, the F-UP21 allocates an F-TEID for receiving the MBS data through peer to peer, and carries the allocated F-TEID in the user plane MBS session establishment response.

Step S1612. The F-UP21 applies to join a multicast transmission group corresponding to an IP multicast transmission address IPx when or in response to determining that the F-UP21 supports receiving data transmitted through multicast manner, to receive MBS data transmitted by a father user plane node of the F-UP21.

Step S1613. The F-CP2 transmits the MBS session start request to each son control plane node according to the information about the son control plane node of the F-CP2, that is, step S1613 to step S1617 are performed separately for each son control plane node. In this embodiment, a description is made by using an example in which the MBS session start request is transmitted to one son control plane node S-CP.

In certain embodiment(s), the MBS session start request transmitted by the F-CP2 to the son control plane node S-CP of the F-CP2 also includes an MBS IP multicast distribution. The MBS IP multicast distribution is allocated in step S1611, and a corresponding user plane node identifier is an F-UP21 ID, and an IP multicast transmission address included in the MBS IP multicast distribution is IP4.

There is no sequential relationship between step S1613 and step S1604, which may be steps performed in parallel by the F-CP2 and the F-CP1.

After the S-CP receives the MBS session start request transmitted by the F-CP2, similar to the step, the S-CP selects one or more S-Ups for the F-UP21 from a plurality of S-UPs according to information about a son control plane node of the S-CP. In this embodiment, it is assumed that an S-UP31 and an S-UP32 are selected, and then step S1614 is performed.

The S-UPs selected by the S-CP for the F-UP21 are different from the S-UPs selected by the S-CP for the F-UP11 and the F-UP12. In other words, in this embodiment of the present disclosure, there may be a plurality of father control plane nodes for one son control plane node in a control plane. For example, a son control plane node S-CP has two father control plane nodes F-CP1 and F-CP2, but one son user plane node is not allowed to have a plurality of father user plane nodes. In this way, when one son user plane node already has one father user plane node, the son user plane node cannot participate in selection of a son user plane node.

Step S1614. The S-CP respectively transmits user plane MBS session establishment requests to the selected S-UP31 and S-UP32, and the S-UP31 and the S-UP32 respectively feed back user plane MBS session establishment responses to the S-CP. A specific process is similar to step S1505a. Details are not described again.

Step S1615. The S-UP31 and the S-UP32 respectively join a multicast transmission group corresponding to the IP multicast transmission address (that is, the IP4) allocated by the F-UP21 when or in response to determining that the S-UP31 and the S-UP32 support receiving the data transmitted through multicast, to receive MB S data transmitted by the F-UP21.

Step S1616. The S-CP transmits an MBS session start response to the F-CP2, the MBS Session start response including an F-UP21 ID. A description of the step is similar to step S1507, and details are not described herein again.

Step S1617. The F-CP2 transmits a user plane MBS session modification request to the F-UP21, and the F-UP21 feeds back a user plane MBS session modification response to the F-CP2. A description of the step is similar to step S1508, and details are not described herein again.

Step S1618. After step S1613 to step S1617 are performed for each son control plane node, the F-CP2 transmits an MBS session start response to the father control plane node of the F-CP2 according to MBS session start responses fed back by all the son control plane nodes. A description of the step is similar to step S1509, and details are not described herein again.

Step S1610 to step S1618 are a processing process after the MBS session start request transmitted by the father control plane node of the F-CP2 is received by the F-CP2. In the processing process, the F-CP2 selects a user plane node F-UP21 having a same level as the F-CP2, and the son control plane node S-CP of the F-CP2 selects two son user plane nodes S-UP31 and S-UP32 that have same levels as the S-CP.

It can be learned from step S1601 to step S1618 that in the embodiments of the present disclosure, the son control plane node S-CP has a plurality of father control plane nodes F-CP1 and F-CP2, and the son user plane node S-UP controlled by the S-CP has only one father user plane node.

In addition, the message in step S1601 and the message in step S1610 may be transmitted in parallel, and therefore, steps S1601 to S1609 and steps S1610 to S1618 may be performed in parallel. In this way, in a user plane MBS session establishment process, two control plane nodes may transmit user plane MBS session establishment requests to one user plane node simultaneously, or after being selected by one control plane node, one user plane node receives a user plane MBS session establishment request transmitted by an other control plane node. If one user plane node simultaneously receives user plane MBS session establishment requests transmitted by two control plane nodes (which may be more control plane nodes, herein a description is made by using an example of two control plane nodes), the user plane node may normally respond to the user plane MBS session establishment request transmitted by one of the control plane nodes in a user plane MBS session establishment response, and reject the other control plane node in an other user plane MBS session establishment response, to indicate that the user plane node has been selected. If one user plane node already has a father user plane node by using one control plane node and when receiving a user plane MBS session establishment request transmitted by an other control plane node, the user plane node rejects the other control plane node in an other user plane MBS session establishment response, to indicate that the user plane node has been selected.

After this MBS session transmission tree is established, the following steps may be performed.

Step S1619a. The F-UP11 receives downlink MBS data transmitted by the father user plane node of the F-UP11. Subsequently, the received downlink MBS data is transmitted to the S-UP11 and the S-UP12 in step S1620a. Each user plane node transmits the MBS data in the multicast transmission manner or the peer-to-peer transmission manner determined in the steps, and each user plane node receives the MBS data in the multicast transmission manner or the peer-to-peer transmission manner determined in the steps.

Step S1619b. The F-UP12 receives downlink MBS data transmitted by the father user plane node of the F-UP12. Subsequently, the received downlink MBS data is transmitted to the S-UP21 and the S-UP22 in step S1620b. Each user plane node transmits the MBS data in the multicast transmission manner or the peer-to-peer transmission manner determined in the steps, and each user plane node receives the MBS data in the multicast transmission manner or the peer-to-peer transmission manner determined in the steps.

Step S1619c. The F-UP21 receives downlink MBS data transmitted by the father user plane node of the F-UP21. Subsequently, the received downlink MBS data is transmitted to the S-UP31 and the S-UP32 in step S1620c. Each user plane node transmits the MBS data in the multicast transmission manner or the peer-to-peer transmission manner determined in the steps, and each user plane node receives the MBS data in the multicast transmission manner or the peer-to-peer transmission manner determined in the steps.

Figure 17:
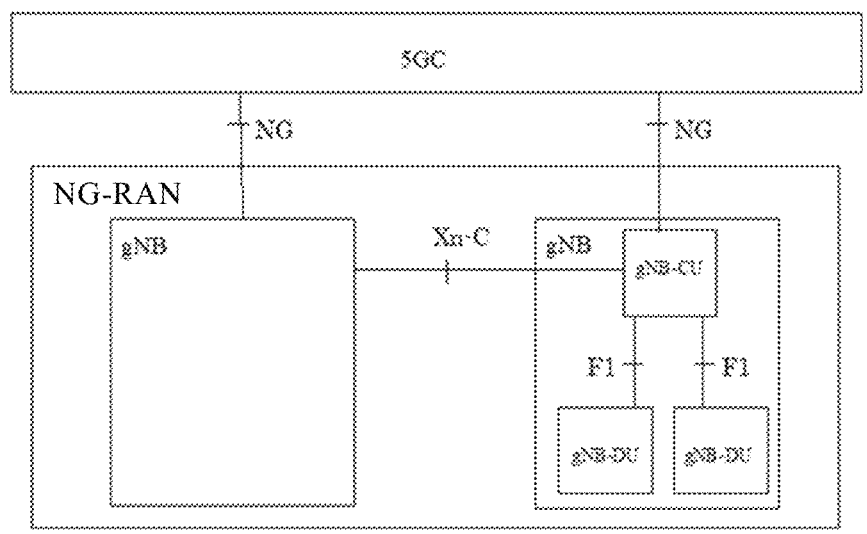
FIG. 17 is a schematic diagram of a connection relationship between a gNB and a 5GC in an NG-RAN.

In the embodiment shown in FIG. 16, the MBS session start request transmitted by the father control plane node to the son control plane node includes information about a plurality of father user plane nodes. In certain embodiment(s), in a 5G system, a control plane and a user plane are separated in a new radio (NR) base station (gNB), that is, a gNB-centralized unit (CU) may be used as a son control plane node, and a gNB-distributed unit (DU) may be used as a son user plane node. In addition, a control plane of one gNB may control user planes of one or more gNBs. In certain embodiment(s), as shown in FIG. 17, a gNB in a next-generation radio access network (NG-RAN) is connected to a 5G core network (5GC) through an NG interface. A control plane and a user plane may be separated in the gNB in the NG-RAN. An interface between a base station control plane (that is, a gNB-CU) and a base station user plane (that is, a gNB-DU) may be an F1 interface, and an interface between gNBs may be an Xn-C interface.

Figure 18:
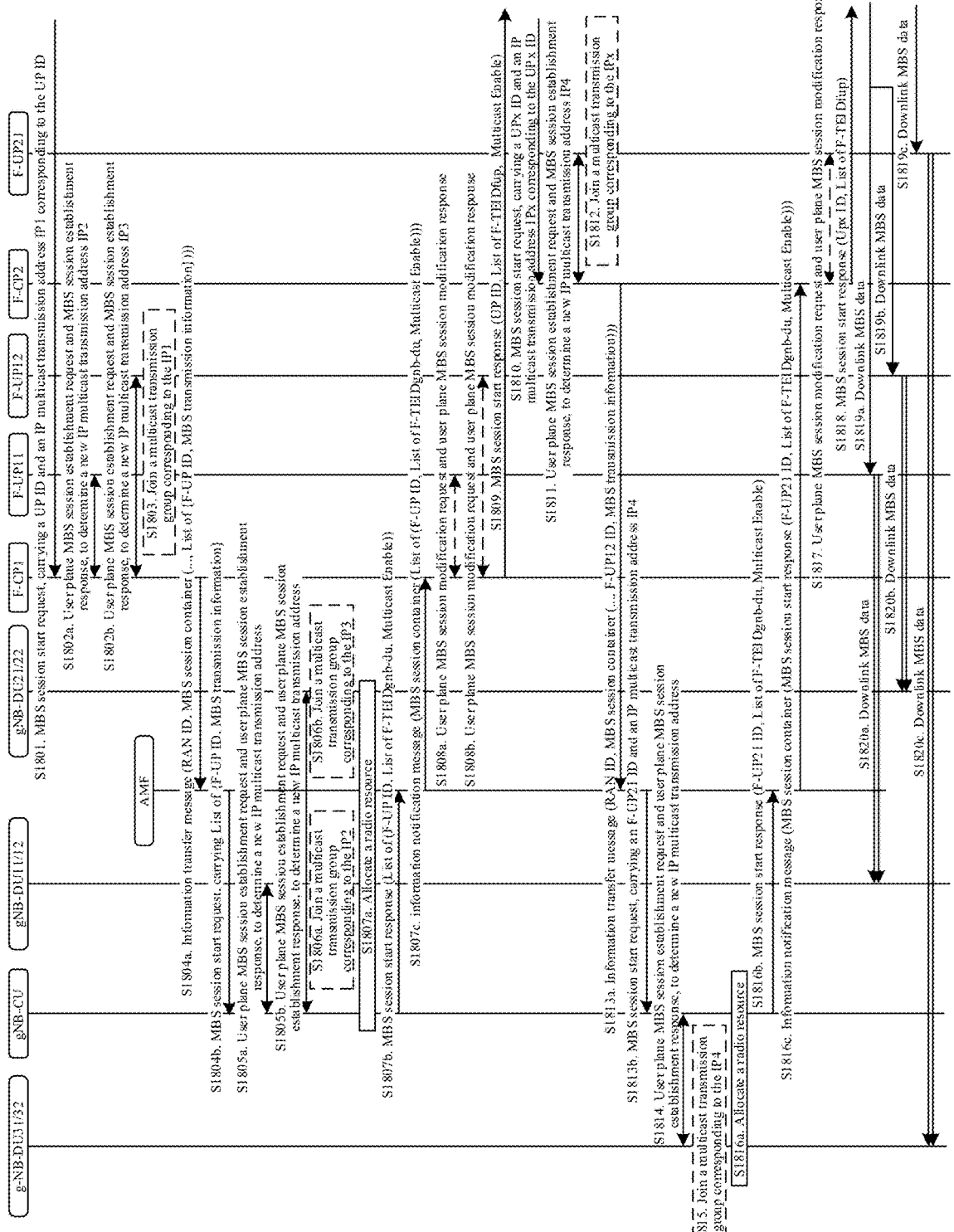
FIG. 18 is a schematic flowchart of an MBS communication method in which a control plane is separated from a user plane according to certain embodiment(s) of the present disclosure.

In an embodiment of the present disclosure, after the gNB-CU and the gNB-DU are applied to the embodiment shown in FIG. 16, the embodiment shown in FIG. 18 may be obtained. Because a network node SMF or MB-SMF cannot directly communicate with an NR gNB, the AMF is introduced for interaction.

Referring to FIG. 18, the method may include the following steps.

Step S1801. An F-CP1 receives an MBS session start request transmitted by a father control plane node of the F-CP1. A specific process is similar to step S1501. Details are not described again. An IP multicast transmission address included in an MBS IP multicast distribution in the MBS session start request is denoted as IP1.

After receiving the MBS session start request transmitted by the father control plane node of the F-CP1, the F-CP1 may determine, according to information (for example, a position and a quantity) about a gNB corresponding to the F-CP1), that one or more F-UPFs are selected from a plurality of F-UPFs as user plane nodes having same levels as the F-CP1. In this embodiment, it is assumed that two user plane nodes are selected, which are denoted as an F-UP11 and an F-UP12. Then, step S1802a and step S1802b are respectively executed.

Step S1802a. The F-CP1 transmits a user plane MBS session establishment request to an F-UP11, and the F-UP11 feeds back a user plane MBS session establishment response to the F-CP1. The process is similar to the process of step S1502 in the embodiment, and details are not described again. An IP multicast transmission address allocated by the F-UP11 in step S1802a is denoted as IP2.

Step S1802b. The F-CP1 transmits a user plane MBS session establishment request to an F-UP12, and the F-UP12 feeds back a user plane MBS session establishment response to the F-CP1. The process is similar to the process of step S1502 in the embodiment, and details are not described again. An IP multicast transmission address allocated by the F-UP12 in step S1802b is denoted as IP3.

Step S1803. The F-UP11 and the F-UP12 apply to join a multicast transmission group corresponding to an IP multicast transmission address IP1 when or in response to determining that the F-UP11 and the F-UP12 support receiving data transmitted through multicast, to receive MBS data transmitted by father user plane nodes of the F-UP11 and the F-UP12.

Step S1804a. The F-CP1 transmits an information transfer message (that is, Namf_Communication_NonUeN2MessageTransfer) to an AMF.

The information transfer message transmitted by the F-CP1 to the AMF includes the following parameters: RAN ID and N2 MBS session container. The N2 MBS session container includes (an N2 MBS session start request (TMGI, MBS QFIs, QoS profile, list of {F-UP ID, MBS transmission information})). The MBS transmission information is an MBS IP multicast distribution (which include an IP multicast transmission address and a C-TEID). In this embodiment, because the F-CP1 selects two user plane nodes F-UP11 and F-UP12 that have same levels as the F-CP1, the list of {F-UP ID, MBS transmission information} includes an F-UP11 ID, an MBS IP multicast distribution corresponding to the F-UP11 ID, an F-UP12 ID, and an MBS IP multicast distribution corresponding to the F-UP12 ID. The MBS IP multicast distribution corresponding to the F-UP11 ID is allocated by the F-UP11, and the IP multicast transmission address included in the MBS IP multicast distribution is IP2. The MBS IP multicast distribution corresponding to the F-UP12 ID is allocated by the F-UP12, and the IP multicast transmission address included in the MBS IP multicast distribution is IP3.

The IP multicast transmission address IP3 allocated by the F-UP12 cannot be the same as the IP multicast transmission address IP2 allocated by the F-UP11, but the allocated C-TEIDs may be the same.

The MBS session container included in the information transfer message transmitted by the F-CP1 to the AMF indicates that the AMF transmits related content of the N2 MBS session start request (TMGI, MBS QFIs, QoS profile, list of {F-UP ID, MBS transmission information} to a gNB identified by the RAN ID. When a plurality of RAN IDs are recorded in an MBS session context in the F-CP1, subsequent step S1804b to step S1808b are performed for a gNB identified by each RAN ID.

Step S1804b. The AMF transmits an MBS session start request to a corresponding gNB-CU according to a RAN ID included in the information transfer message in step S1804a, the MBS session start request including the parameters in step S1804a, that is, including the TMGI, the MBS QFIs, the QoS profile, and the list of {F-UP MBS transmission information}.

After the gNB-CU receives the MBS session start request transmitted by the AMF, the gNB-CU respectively selects one or more gNB-DUs for the F-UP11 and the F-UP12 from a plurality of gNB-DUs according to a quantity and positions of registered MBS multicast service UEs (for an MBS multicast service) or an MBS broadcast service area (for an MBS broadcast service). In this embodiment, it is assumed that a gNB-DU11 and a gNB-DU12 are selected for the F-UP11, and a gNB-DU21 and a gNB-DU22 are selected for the F-UP12, that is, different gNB-DUs are selected for the F-UP11 and the F-UP12. Then, step S1805a and step S1805b are respectively executed.

Step S1805a. The gNB-CU respectively transmits user plane MBS session establishment requests (that is, F1 MBS Session Establishment Request) to the selected gNB-DU11 and gNB-DU12, the user plane MBS session establishment request including the IP multicast transmission address IP2 allocated by the F-UP11, and the gNB-DU11 and the gNB-DU12 respectively feed back user plane MBS session establishment responses to the gNB-CU (for saving layout, the gNB-DU11 and the gNB-DU12 are drawn together in FIG. 18). A specific process is similar to the interaction process between the S-CP and the S-UP in step S1505a, and details are not described herein again.

Step S1805b. The gNB-CU respectively transmits user plane MBS session establishment requests (that is, F1 MBS Session Establishment Request) to the selected gNB-DU21 and gNB-DU22, the user plane MBS session establishment request including the IP multicast transmission address IP3 allocated by the F-UP12, and the gNB-DU21 and the gNB-DU22 respectively feed back user plane MBS session establishment responses to the gNB-CU (for saving layout, the gNB-DU21 and the gNB-DU22 are drawn together in FIG. 18). A specific process is similar to the interaction process between the S-CP and the S-UP in step S1505a, and details are not described herein again.

Step S1806a. The gNB-DU11 and the gNB-DU12 respectively join a multicast transmission group corresponding to the IP multicast transmission address (that is, the IP2) allocated by the F-UP11 when or in response to determining that the gNB-DU11 and the gNB-DU12 support receiving the data transmitted through multicast, to receive MBS data transmitted by the F-UP11.

Step S1806b. The gNB-DU21 and the gNB-DU22 respectively join a multicast transmission group corresponding to the IP multicast transmission address (that is, the IP3) allocated by the F-UP12 when or in response to determining that the gNB-DU21 and the gNB-DU22 support receiving the data transmitted through multicast, to receive MBS data transmitted by the F-UP12.

Similar to the embodiments, if the gNB-DU does not support receiving the data transmitted through multicast, but supports receiving MBS data through peer to peer according to a network configuration, a corresponding F-TEID is to be allocated. The F-TEID is allocated by the gNB-CU, or is allocated by the gNB-DU.

Step S1807a. The gNB allocates a radio air interface resource according to the QFIs and the QoS profile included in the information transfer message received in step S1804a.

Step S1807b. The gNB-CU transmits an MBS session start response to the AMF. If a gNB-DU does not support receiving the data transmitted through multicast, the MBS session start response includes an F-TEID (which is denoted as F-TEIDgnb-du for ease of distinguishing) allocated by the gNB-DU, and the F-TEID corresponds to the F-UP, to form a list of {F-UP ID, list of F-TEIDgnb-du, multicast enable}. In this embodiment, the list of {F-UP ID, list of F-TEIDgnb-du, multicast enable} includes the list of F-TEIDgnb-du and the multicast enable for the F-UP11 and the list of F-TEIDgnb-du and the multicast enable for the F-UP12.

Similar to step S1507, because some gNB-DUs support receiving the data transmitted through multicast, and some other gNB-DUs do not support receiving the data transmitted through multicast, the list of F-TEIDgnb-du corresponds to only the gNB-DUs that support receiving MBS data through peer to peer rather than through multicast transmission. Therefore, when all gNB-DUs of one F-UP support receiving the data transmitted through multicast, there is no list of F-TEIDgnb-du corresponding to the F-UP. For another description, reference is made to the related content of step S1507.

In addition, when the gNB-CU determines not to allocate any son user plane node to an/some F-UP IDs, multicast enable corresponding to this/these F-UP IDs may be set to disable. In certain embodiment(s), a failed list {F-UP} may alternatively be used in the MBS session start response to indicate a father user plane node to which a gNB-DU is not allocated.

Step S1807c. The AMF transmits an information notification message Namf_Communication_NonUeN2InfoNotify to the F-CP1 according to the MBS session start response received in step S1807b. The information notification message includes an N2 MBS session container (an N2 MBS session start response (a list of (F-UP ID, list of F-TEIDgnb-du, multicast enable))).

Step S1808a. The F-CP1 transmits a user plane MBS session modification request to the F-UP11 according to the list of {F-UP ID, list of F-TEIDgnb-du, multicast enable} included in the received information notification message, and the F-UP11 feeds back a user plane MBS session modification response to the F-CP1. A description of the step is similar to step S1508, and details are not described herein again.

Step S1808b. The F-CP1 transmits a user plane MBS session modification request to the F-UP12 according to the list of {F-UP ID, list of F-TEIDgnb-du, multicast enable} included in the received information notification message, and the F-UP12 feeds back a user plane MBS session modification response to the F-CP1. A description of the step is similar to step S1508, and details are not described herein again.

Step S1809. After step S1804a to step S1808b are performed for the gNB identified by each RAN ID, the F-CP1 transmits an MBS session start response to the father control plane node of the F-CP1 according to the MBS session start response fed back by the gNB-CU.

Similar to step S1609, the MBS session start response replied by the F-CP1 to the father control plane node of the F-CP1 includes a UP ID of a user plane node having a same level as the father control plane node of the F-CP1 and may further include a list of F-TEIDfup and multicast enable.

Step S1801 to step S1809 are a processing process after the MBS session start request transmitted by the father control plane node of the F-CP1 is received by the F-CP1. In the processing process, the F-CP1 selects two user plane nodes F-UP11 and F-UP12 that have same levels as the F-CP1, and a gNB-CU corresponding to the F-CP1 selects two son user plane nodes gNB-DU11 and gNB-DU12 that have same levels as the gNB-CU for the F-UP11, and selects two son user plane nodes gNB-DU21 and gNB-DU22 that have same levels as the gNB-CU for the F-UP12.

Continuing to refer to FIG. 18, the method further includes the following steps.

Step S1810. An F-CP2 receives an MBS session start request transmitted by a father control plane node of the F-CP2. A specific process is similar to step S1501. Details are not described again. An IP multicast transmission address included in an MBS IP multicast distribution in the MBS session start request is denoted as IPx.

Step S1811. After receiving the MBS session start request transmitted by the father control plane node of the F-CP2, the F-CP2 may determine, according to information (for example, a position and a quantity) about a gNB corresponding to the F-CP2, that one or more F-UPFs are selected from a plurality of F-UPFs as user plane nodes that have same levels as the F-CP2. In this embodiment, it is assumed that only one user plane node F-UP21 is selected, then the F-CP2 transmits a user plane MBS session establishment request to the F-UP21, and the F-UP21 feeds back a user plane MBS session establishment response to the F-CP2.

For a description, reference is made to the related content in step S1502. Similar to step S1502, the F-CP2 interacts with the F-UP21 by using the user plane MBS session establishment request and the user plane MBS session establishment response, and the F-UP21 allocates a new IP multicast transmission address (which is denoted as IP4 for ease of distinguishing).

In addition, if the F-UP21 does not support receiving data transmitted through multicast, the F-UP21 allocates an F-TEID for receiving the MBS data through peer to peer, and carries the allocated F-TEID in the user plane MBS session establishment response.

Step S1812. The F-UP21 applies to join a multicast transmission group corresponding to an IP multicast transmission address IPx when or in response to determining that the F-UP21 supports receiving data transmitted through multicast manner, to receive MBS data transmitted by a father user plane node of the F-UP21.

Step S1813a. The F-CP2 transmits an information transfer message (that is, Namf_Communication_NonUeN2MessageTransfer) to an AMF. A description of the information transfer message is similar to step S1804a, and details are not described again. Because the F-CP 2 selects the user plane node F-UP21 that has a same level as the F-CP2, the information transfer message includes an F-UP21 ID and an MBS IP multicast distribution corresponding to the F-UP21 ID, and an IP multicast transmission address included in the MBS IP multicast distribution is IP4. When a plurality of RAN IDs are recorded in an MBS session context in the F-CP2, subsequent step S1813b to step S1817 are performed for a gNB identified by each RAN ID.

There is no sequential relationship between step S1813a and step S1804a, which may be steps performed in parallel by the F-CP2 and the F-CP1.

Step S1813b. The AMF transmits an MBS session start request to a corresponding gNB-CU according to a RAN ID included in the information transfer message in step S1813a, the MBS session start request including the parameters in step S1813a.

After the gNB-CU receives the MBS session start request transmitted by the AMF, the gNB-CU respectively selects one or more gNB-DUs for the F-UP21 from a plurality of gNB-DUs according to a quantity and positions of registered MBS multicast service UEs (for an MBS multicast service) or an MBS broadcast service area (for an MBS broadcast service). In this embodiment, it is assumed that a gNB-DU31 and a gNB-DU32 are selected for the F-UP21, that is, gNB-DUs selected for the F-UP21 are different from the gNB-DUs selected for the F-UP11 and the F-UP12.

Step S1814. The gNB-CU respectively transmits user plane MBS session establishment requests (that is, F1 MBS Session Establishment Request) to the selected gNB-DU31 and gNB-DU32, the user plane MBS session establishment request including the IP multicast transmission address IP4 allocated by the F-UP21, and the gNB-DU31 and the gNB-DU32 respectively feed back user plane MBS session establishment responses to the gNB-CU (for saving layout, the gNB-DU31 and the gNB-DU32 are drawn together in FIG. 18). A specific process is similar to step S1505a. Details are not described again.

Step S1815. The gNB-DU31 and the gNB-DU32 respectively join a multicast transmission group corresponding to the IP multicast transmission address (that is, the IP4) allocated by the F-UP21 when or in response to determining that the gNB-DU31 and the gNB-DU32 support receiving the data transmitted through multicast, to receive MBS data transmitted by the F-UP21.

Similar to the embodiments, if the gNB-DU does not support receiving the data transmitted through multicast, but supports receiving MBS data through peer to peer according to a network configuration, a corresponding F-TEID is to be allocated. The F-TEID is allocated by the gNB-CU, or is allocated by the gNB-DU.

Step S1816a. The gNB allocates a radio air interface resource according to the QFIs and the QoS profile included in the information transfer message received in step S1813a.

Step S1816b. The gNB-CU transmits an MBS session start response to the AMF. If a gNB-DU does not support receiving the data transmitted through multicast, the MBS session start response includes an F-TEIDgnb-du allocated by the gNB-DU, and the F-TEIDgnb-du corresponds to the F-UP21. For another description, reference may be made to the related content in step S1507.

Step S1816c. The AMF transmits an information notification message Namf_Communication_NonUeN2InfoNotify to the F-CP2 according to the MBS session start response received in step S1816b. The information notification message includes (an N2 MBS session container (an N2 MBS session start response (a list of (F-UP21 ID, list of F-TEIDgnb-du, multicast enable))).

Step S1817. The F-CP2 transmits a user plane MBS session modification request to the F-UP21 according to the F-UP21 ID and the list of F-TEIDgnb-du included in the received information notification message, and the F-UP21 feeds back a user plane MBS session modification response to the F-CP2. A description of the step is similar to step S1508, and details are not described herein again.

Step S1818. After step S1813b to step S1817 are performed for the gNB identified by each RAN ID, the F-CP2 transmits an MBS session start response to the father control plane node of the F-CP2 according to the MBS session start response fed back by the gNB-CU.

Similar to step S1509, the MBS session start response replied by the F-CP2 to the father control plane node of the F-CP2 includes a UPx ID of a user plane node having a same level as the father control plane node of the F-CP2 and may further include a list of F-TEIDfup.

Step S1810 to step S1818 are a processing process after the MBS session start request transmitted by the father control plane node of the F-CP2 is received by the F-CP2. In the processing process, the F-CP2 selects a user plane node F-UP21 having a same level as the F-CP2, and a gNB-DU corresponding to the F-CP2 selects two son user plane nodes gNB-DU31 and gNB-DU32 that have same levels as the gNB-CU.

It can be learned from step S1801 to step S1818 that in the embodiments of the present disclosure, the gNB-CU has a plurality of father control plane nodes F-CP1 and F-CP2, and the gNB-DU controlled by the gNB-CU has only one father user plane node.

In addition, the message in step S1801 and the message in step S1810 may be transmitted in parallel, and therefore, steps S1801 to S1809 and steps S1810 to S1818 may be performed in parallel. In this way, in a user plane MBS session establishment process, two control plane nodes may transmit user plane MBS session establishment requests to one user plane node simultaneously, or after being selected by one control plane node, one user plane node receives a user plane MBS session establishment request transmitted by an other control plane node. If one user plane node simultaneously receives user plane MBS session establishment requests transmitted by two control plane nodes (which may be more control plane nodes, herein a description is made by using an example of two control plane nodes), the user plane node may normally respond to the user plane MBS session establishment request transmitted by one of the control plane nodes in a user plane MBS session establishment response, and reject the other control plane node in an other user plane MBS session establishment response, to indicate that the user plane node has been selected. If one user plane node already has a father user plane node by using one control plane node and when receiving a user plane MBS session establishment request transmitted by an other control plane node, the user plane node rejects the other control plane node in an other user plane MBS session establishment response, to indicate that the user plane node has been selected.

After this MBS session transmission tree is established, the following steps may be performed.

Step S1819a. The F-UP11 receives downlink MBS data transmitted by the father user plane node of the F-UP11. Subsequently, the downlink MBS data received in step S1820a is transmitted to the gNB-DU11 and the gNB-DU12. Each user plane node transmits the MBS data in the multicast transmission manner or the peer-to-peer transmission manner determined in the steps, and each user plane node receives the MBS data in the multicast transmission manner or the peer-to-peer transmission manner determined in the steps.

Step S1819b. The F-UP12 receives downlink MBS data transmitted by the father user plane node of the F-UP12. Subsequently, the downlink MBS data received in step S1820b is transmitted to the gNB-DU21 and the gNB-DU22. Each user plane node transmits the MBS data in the multicast transmission manner or the peer-to-peer transmission manner determined in the steps, and each user plane node receives the MBS data in the multicast transmission manner or the peer-to-peer transmission manner determined in the steps.

Step S1819c. The F-UP21 receives downlink MBS data transmitted by the father user plane node of the F-UP21. Subsequently, the downlink MB S data received in step S1820c is transmitted to the gNB-DU31 and the gNB-DU32. Each user plane node transmits the MBS data in the multicast transmission manner or the peer-to-peer transmission manner determined in the steps, and each user plane node receives the MBS data in the multicast transmission manner or the peer-to-peer transmission manner determined in the steps.

Figure 19:
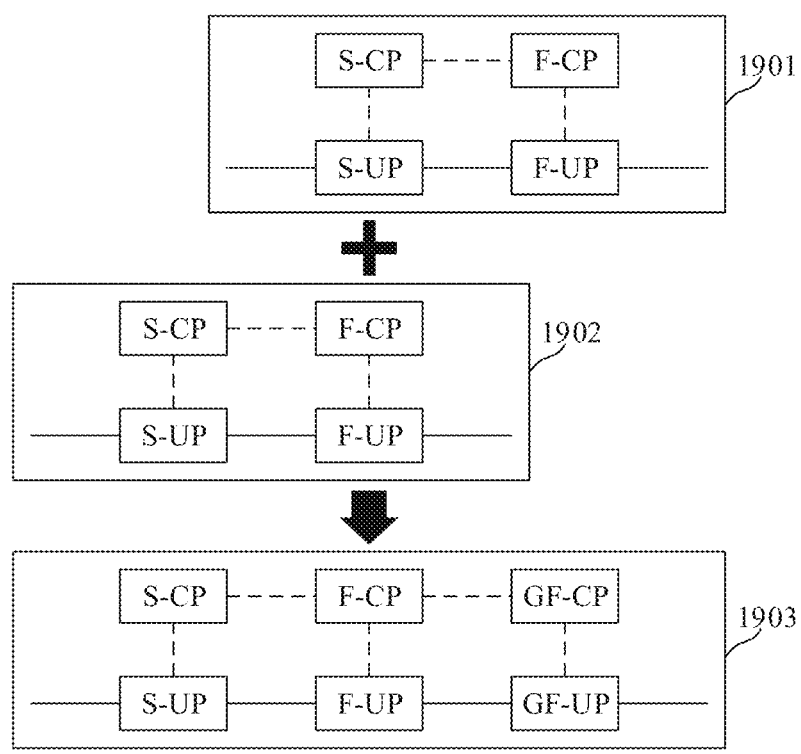
FIG. 19 is a schematic diagram of a cascading manner of a technical solution according to certain embodiment(s) of the present disclosure.

The technical solution of the embodiment shown in FIG. 18 is a process of establishing a control plane transmission tree and a user plane transmission tree after the NR base station is introduced into the MBS session transmission tree. In the embodiments shown in FIG. 15, FIG. 16, and FIG. 18, only the interaction process between two level nodes in the MBS session transmission tree is introduced, and for an MBS session transmission tree containing three or more level nodes, an interaction process between any two level nodes may be implemented with reference to the embodiment shown in FIG. 15, FIG. 16, or FIG. 18. For example, as shown in FIG. 19, two level nodes shown in 1901 and 1902 may be the two level nodes shown in FIG. 15 or FIG. 16. After a son control plane node S-CP and a son user plane node S-UP in 1901 are respectively superimposed onto a father control plane node F-CP and a father user plane node F-UP in 1902 to form a same entity, as shown in 1903 in FIG. 19, a three-level MBS session transmission tree may be implemented. A GF-CP is a father control plane node of the F-CP, and GF-UP is a father user plane node of the F-UP. In this manner, any level of MBS session transmission tree may be implemented.

For the embodiment shown in FIG. 18, because the base station can only serve as a last level of a network side, the embodiment shown in FIG. 18 may also be combined with the embodiments shown in FIG. 15 and FIG. 16 to implement the any level of MBS session transmission tree including the base station.

FIG. 15, FIG. 16, and FIG. 18 show establishment processes of an MBS session transmission tree according to an embodiment of the present disclosure. A broken branch may also occur in a user plane transmission tree in the establishment process of the MBS session transmission tree. Therefore, an operation of deleting a broken branch also is to be performed.

Figure 20:
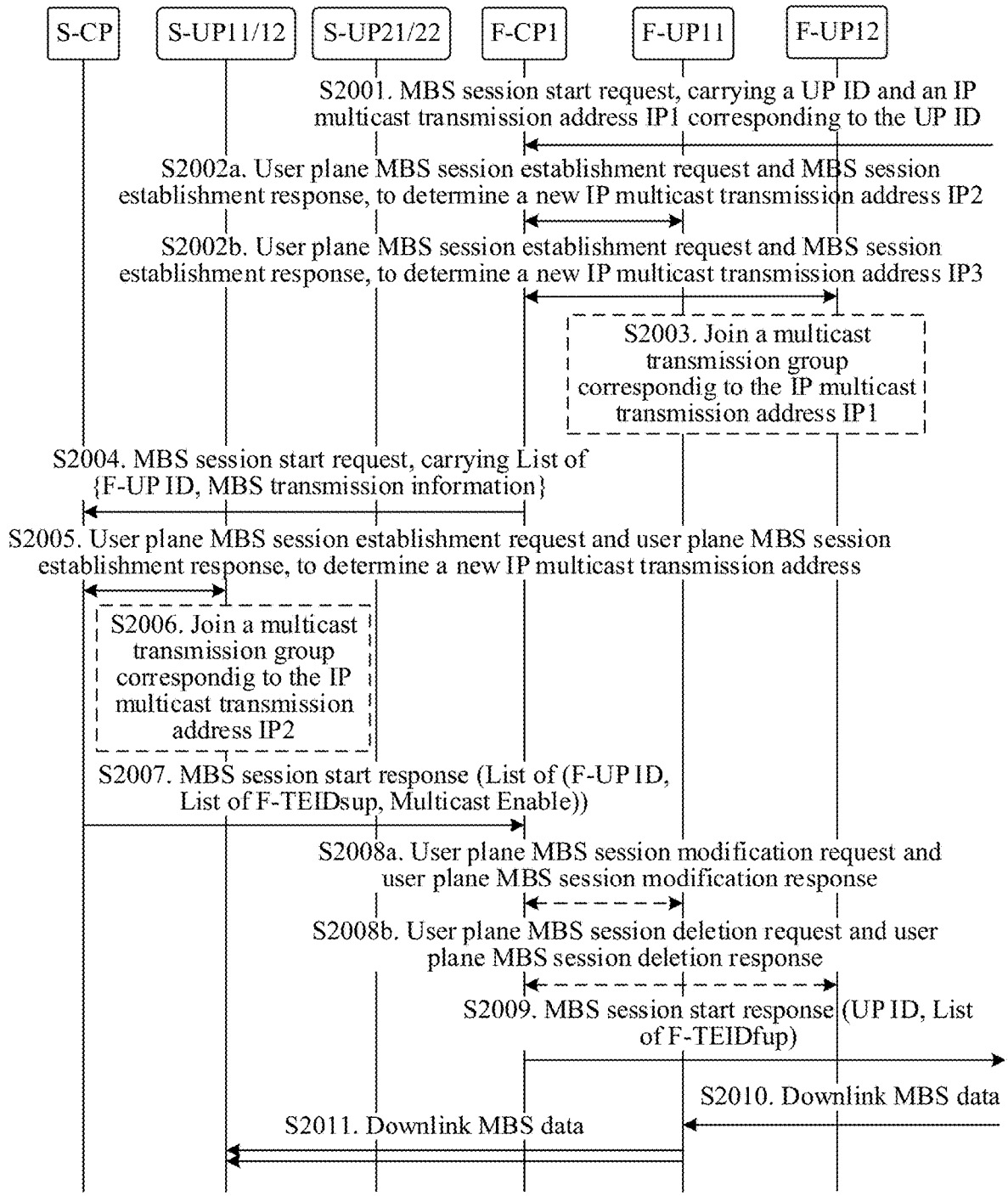
FIG. 20 is a schematic flowchart of an MBS communication method in which a control plane is separated from a user plane according to certain embodiment(s) of the present disclosure.

As shown in FIG. 20, the following steps may be included.

Step S2001. An F-CP1 receives an MBS session start request transmitted by a father control plane node of the F-CP1. A specific process is similar to step S1501. Details are not described again. An IP multicast transmission address included in an MBS IP multicast distribution in the MBS session start request is denoted as IP1.

After receiving the MBS session start request transmitted by the father control plane node of the F-CP1, the F-CP1 may determine, according to information about a son control plane node of the F-CP1, that one or more F-UPFs are selected from a plurality of F-UPFs as user plane nodes having same levels as the F-CP1. In this embodiment, it is assumed that two user plane nodes F-UP11 and F-UP12 are selected. Then, step S1602a and step S1602b are respectively executed.

Step S2002a. The F-CP1 transmits a user plane MBS session establishment request to an F-UP11, and the F-UP11 feeds back a user plane MBS session establishment response to the F-CP1. The process is similar to the process of step S1502 in the embodiment, and details are not described again. An IP multicast transmission address allocated by the F-UP11 in step S2002a is denoted as IP2.

Step S2002b. The F-CP1 transmits a user plane MBS session establishment request to an F-UP12, and the F-UP12 feeds back a user plane MBS session establishment response to the F-CP1. The process is similar to the process of step S1502 in the embodiment, and details are not described again. An IP multicast transmission address allocated by the F-UP12 in step S2002b is denoted as IP3.

Step S2003. The F-UP11 and the F-UP12 apply to join a multicast transmission group corresponding to an IP multicast transmission address IP1 when or in response to determining that the F-UP11 and the F-UP12 support receiving data transmitted through multicast, to receive MBS data transmitted by father user plane nodes of the F-UP11 and the F-UP12.

Step S2004. The F-CP1 transmits the MBS session start request to each son control plane node according to the information about the son control plane node of the F-CP1, that is, step S2004 to step S2008 are performed separately for each son control plane node. In this embodiment, a description is made by using an example in which the MBS session start request is transmitted to one son control plane node S-CP.

The MBS session start request transmitted by the F-CP1 to the son control plane node S-CP of the F-CP1 includes the following parameters: TMGI, MBS Session Duration, MBS QFIs, QoS Profile, MBS Time to Data Transfer, List of {F-UP ID, MBS transmission information}, and MBS Service Area. The MBS transmission information is an MBS IP multicast distribution (which includes an IP multicast transmission address and a C-TEID). In this embodiment, because the F-CP1 selects two user plane nodes F-UP11 and F-UP12 that have same levels as the F-CP1, the list of {F-UP ID, MBS transmission information} includes an F-UP11 ID, an MBS IP multicast distribution corresponding to the F-UP11 ID, an F-UP12 ID, and an MBS IP multicast distribution corresponding to the F-UP12 ID. The MBS IP multicast distribution corresponding to the F-UP11 ID is allocated by the F-UP11, and the IP multicast transmission address included in the MBS IP multicast distribution is IP2. The MBS IP multicast distribution corresponding to the F-UP12 ID is allocated by the F-UP12, and the IP multicast transmission address included in the MBS IP multicast distribution is IP3.

The IP multicast transmission address IP3 allocated by the F-UP12 cannot be the same as the IP multicast transmission address IP2 allocated by the F-UP11, but the allocated C-TEIDs may be the same.

After receiving the MBS session start request transmitted by the F-CP1, similar to step S1502, the S-CP selects one or more S-UPs for the F-UP11 from a plurality of S-UPs according to information about a son control plane node of the S-CP, and selects one or more S-UPs for the F-UP12. In this embodiment, it is assumed that an S-UP11 and an S-UP12 are selected for the F-UP11, but no son user plane node is selected for the F-UP12. Then, step S2005 is performed.

Step S2005. The S-CP respectively transmits user plane MBS session establishment requests to the selected S-UP11 and S-UP12, the user plane MBS session establishment request including the IP multicast transmission address IP2 allocated by the F-UP11, and the S-UP11 and the S-UP12 respectively feed back user plane MBS session establishment responses to the S-CP (for saving layout, the S-UP11 and the S-UP12 are drawn together in FIG. 20). A specific process is similar to step S1505a. Details are not described again.

Step S2006. The S-UP11 and the S-UP12 respectively join a multicast transmission group corresponding to the IP multicast transmission address (that is, the IP2) allocated by the F-UP11 when or in response to determining that the S-UP11 and the S-UP12 support receiving the data transmitted through multicast, to receive MBS data transmitted by the F-UP11.

Step S2007. The S-CP transmits an MBS session start response to the F-CP1. If an S-UP does not support receiving the data transmitted through multicast, the MBS session start response includes an F-TEID allocated by the S-UP, and the F-TEID corresponds to the F-UP, to form a List of {F-UP ID, List of F-TEIDsup, Multicast Enable}. In this embodiment, the list of {F-UP ID, list of F-TEIDsup, multicast enable} includes the list of F-TEIDsup and the multicast enable for the F-UP11 and the multicast enable (a value is disable) for the F-UP12. Because the F-UP12 does not allocate F-TEID, and corresponding multicast enable is set to disable, it indicates that no son user plane node is selected for the F-UP12.

Similar to step S1507, because some S-UPs support receiving the data transmitted through multicast, and some other S-UPs do not support receiving the data transmitted through multicast, the list of F-TEIDsup corresponds to only the S-UPs that support receiving the MBS data through peer to peer rather than through multicast transmission. Therefore, when all S-UPs of one F-UP support receiving the data transmitted through multicast, there is no list of F-TEIDsup corresponding to the F-UP. For another description, reference is made to the related content of step S1507.

In addition, when the S-CP determines not to allocate any son user plane node to an/some F-UP IDs, in addition to setting multicast enable parameters corresponding to this/ these F-UP IDs to Disable, a failed list {F-UP} may further be used in the MBS session start response to indicate a father user plane node to which a son user plane node is not allocated.

Step S2008a. The F-CP1 transmits a user plane MBS session modification request to the F-UP11 according to the list of {F-UP ID, list of F-TEIDsup, multicast enable} included in the MBS session start response, and the F-UP11 feeds back a user plane MBS session modification response to the F-CP1. A description of the step is similar to step S1508, and details are not described herein again.

If the F-CP1 determines that all the son control plane nodes of the F-CP1 do not allocate son user plane nodes to the F-UP11, the F-CP1 transmits a user plane MBS session deletion request to the F-UP11, the F-UP11 transmits an IGMP leave data packet after receiving the user plane MBS session deletion request, and deletes an MBS session from a multicast transmission group indicated by the multicast transmission address IP1 allocated by the father user plane node of the F-UP11, and the F-UP 11 replies a user plane MBS session deletion response to the F-CP1 (this process is not identified in the figure).

Step S2008b. After receiving MBS session start responses replied by all the son control plane nodes of the F-CP1, the F-CP1 determines that all the son control plane nodes of the F-CP1 do not allocate son user plane nodes to the F-UP12 and transmits a user plane MBS session deletion request (that is, N4 MBSSessionDelete Request) to the F-UP12, after receiving the user plane MBS session deletion request, the F-UP12 transmits an IGMP leave data packet and deletes an MBS session from the multicast transmission group indicated by the multicast transmission address (that is, IP1) allocated by the father user plane node of the F-UP12, and the F-UP12 replies a user plane MBS session deletion response to the F-CP1.

Step S2004 to step S2008 are separately performed for each son control plane node of the F-CP1. The operation of deleting the MBS session in step S2008b cannot be started only because an MBS session start response replied by one son control plane node of the F-CP1 in step S2007 indicates that no son user plane node is allocated to the F-UP12. After receiving replies of all the son control plane nodes, the F-CP1 determines that a son user plane node is not allocated to which user plane node, to decide whether an MBS session with the user plane node is to be deleted.

Step S2009. After step S2004 to step S2008 are performed for each son control plane node, the F-CP1 transmits an MBS session start response to the father control plane node of the F-CP1 according to MBS session start responses fed back by all the son control plane nodes.

Similar to step S1509, the MBS session start response replied by the F-CP1 to the father control plane node of the F-CP1 includes an UP ID of a user plane node having a same level as the father control plane node of the F-CP1, and may also include a list of F-TEID (which is denoted as a list of F-TEIDfup for ease of distinguishing). Because the F-CP1 selects two user plane nodes F-UP11 and F-UP12 that have same levels as the F-CP1, but the S-CP does not allocate a son user plane node to the F-UP12, if the MBS session start response replied by the F-CP1 to the father control plane node of the F-CP1 includes the list of F-TEIDfup, the list of F-TEIDfup also includes an F-TEID allocated by the F-UP11.

If the MBS session start response replied by the F-CP1 to the father control plane node of the F-CP1 may not include the F-TEID allocated by the F-UP11, it indicates that the F-UP11 supports receiving the data transmitted through multicast. In certain embodiment(s), the MBS session start response replied by the F-CP1 to the father control plane node of the F-CP1 is not to include the multicast enable. If the MBS session start response replied by the F-CP1 to the father control plane node of the F-CP1 includes the F-TEID allocated by the F-UP11, it indicates that the F-UP 11 does not support receiving the data transmitted through multicast but supports receiving the MBS data transmitted through peer to peer. In certain embodiment(s), because the F-CP1 has only one same-level user plane node F-UP11, the MBS session start response replied by the F-CP1 to the father control plane node of the F-CP1 is not to include the multicast enable.

After this MBS session transmission tree is established, the following steps may be performed.

Step S2010. The F-UP11 receives downlink MBS data transmitted by the father user plane node of the F-UP11. Subsequently, the received downlink MBS data is transmitted to the S-UP11 and the S-UP12 in step S2011. Each user plane node transmits the MBS data in the multicast transmission manner or the peer-to-peer transmission manner determined in the steps, and each user plane node receives the MBS data in the multicast transmission manner or the peer-to-peer transmission manner determined in the steps.

In the embodiment shown in FIG. 20, although the F-CP1 selects two user plane nodes F-UP11 and F-UP12 that have same levels as the F-CP1, a son control plane node S-CP of the F-CP1 does not allocate a son user plane node to the F-UP12, that is, a broken branch occurs in the user plane transmission tree. Therefore, the broken branch is to be deleted.

In the technical solution of the embodiments of the present disclosure, F-CP represents a father control plane node, F-UP represents a father user plane node, S-CP represents a son control plane node, and S-UP represents a son user plane node. In the system architecture shown in FIG. 10, the SMF may be replaced by the F-CP, and the UPF may be replaced by the F-UP. In certain embodiment(s), the S-CP and the S-UP are combined to replace the access network node.

In the system architecture shown in FIG. 11, the MBSF may be replaced by the F-CP, and the MBSU may be replaced by the F-UP. In certain embodiment(s), the MB-SMF may be replaced by the S-CP, and the MB-UPF may be replaced by the S-UP. Alternatively, the MB-SMF may be replaced by the F-CP, and the MB-UPF may be replaced by the F-UP. In certain embodiment(s), the S-CP and the S-UP are combined to replace the NG-RAN.

FIG. 10 and FIG. 11 show two 5G MBS architectural diagrams. In the architectural diagrams, enhancement processing may be performed. For example, for the architecture shown in FIG. 10, there may be a plurality of UPFs and a plurality of SMFs. For the architecture shown in FIG. 11, there may be a plurality of MB-SMFs and a plurality of MB-UPFs respectively.

The user plane MBS session establishment process is implemented in the technical solution of the embodiments of the present disclosure, the occurrence of a transmission ring in the user plane MBS session may be avoided, and a problem of a broken branch in the user plane MBS session transmission tree may be avoided. In addition, a problem that when the control plane is separated from the user plane in the user plane MBS session establishment process, a same father control plane provides a plurality of father user plane nodes simultaneously may be resolved.

The following describes apparatus embodiments of the present disclosure, and the apparatus embodiments may be used for performing the communication method for a multicast broadcast service in the embodiment of the present disclosure. For details that are not disclosed in the apparatus embodiments of the present disclosure, reference may be made to the above embodiments of the communication method for a multicast broadcast service in the present disclosure.

Figure 21:
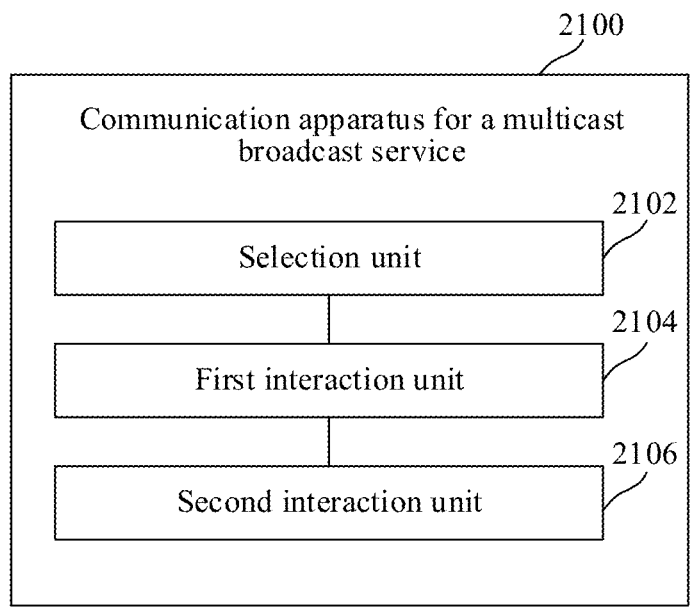
FIG. 21 is a schematic block diagram of a communication apparatus for a multicast broadcast service according to certain embodiment(s) of the present disclosure.

FIG. 21 is a block diagram of a communication apparatus for a multicast broadcast service according to an embodiment of the present disclosure. The communication apparatus may be disposed in an ith level control plane node.

Referring to FIG. 21, a communication apparatus 2100 for a multicast broadcast service according to an embodiment of the present disclosure includes: a selection unit 2102, a first interaction unit 2104, and a second interaction unit 2106.

The selection unit 2102 is configured to select an ith level user plane node corresponding to an ith level control plane node, the ith level control plane node being any level control plane node other than a last level control plane node in an MBS session transmission tree, i=1, . . . , N, N being a positive integer. The first interaction unit 2104 is configured to transmit a user plane MBS session establishment request to an ith level user plane node, and receive a user plane MBS session establishment response fed back by the ith level user plane node. The second interaction unit 2106 is configured to transmit an MBS session start request to a son control plane node of the ith level control plane node, so that the son control plane node allocates son user plane nodes to the ith level user plane node, the MBS session start request including identification information of the ith level user plane node and a first MBS IP multicast transmission address and a first C-TEID that are allocated by the ith level user plane node, and the first MBS IP multicast transmission address being used for instructing the son user plane node to join a multicast transmission group corresponding to the first MBS IP multicast transmission address to receive MBS data transmitted by the ith level user plane node through multicast.

In some embodiments of the present disclosure, based on the solution, when or in response to determining that the ith level control plane node is not a first level control plane node in the MBS session transmission tree and the ith level user plane node supports receiving MBS data of a father user plane node of the ith level user plane node through multicast, the user plane MBS session establishment request includes MBS IP multicast distribution information, the MBS IP multicast distribution information includes a second MBS IP multicast transmission address and a second C-TEID that are allocated by the parent user plane node of the ith level user plane node, and the second MBS IP multicast transmission address is used for instructing the ith level user plane node to join a multicast transmission group corresponding to the second MBS IP multicast transmission address to receive the MBS data transmitted by the father user plane node of the ith level user plane node through multicast.

In some embodiments of the present disclosure, based on the solution, when or in response to determining that the ith level user plane node supports receiving the MBS data of the father user plane node of the ith level user plane node through peer to peer rather than through multicast, the user plane MBS session establishment request includes indication information for requesting to allocate an F-TEID to the ith level user plane node, the user plane MBS session establishment response includes the F-TEID allocated to the ith level user plane node, and the F-TEID is used for causing the ith level user plane node to receive, through peer to peer, the MBS data transmitted by the father user plane node of the ith level user plane node; or the user plane MBS session establishment response indicates that the ith level user plane node supports receiving the MBS data of the father user plane node of the ith level user plane node through peer to peer rather than through multicast and includes an F-TEID allocated to the ith level user plane node.

In some embodiments of the present disclosure, based on the solution, the first interaction unit 2104 is further configured to: before transmitting the user plane MBS session establishment request to the ith level user plane node, receive a MBS session start request transmitted by a father control plane node of the ith level control plane node, and obtaining the MBS IP multicast distribution information from the MBS session start request transmitted by the father control plane node.

In some embodiments of the present disclosure, based on the solution, the user plane MBS session establishment request includes indication information used for instructing the ith level user plane node to allocate new MBS IP multicast distribution information; and the user plane node MBS session establishment response includes a first MBS IP multicast transmission address and a first C-TEID that are allocated by the ith level user plane node.

In some embodiments of the present disclosure, based on the solution, the second interaction unit 2106 is further configured to: after transmitting the MBS session start request to the son control plane node of the ith level control plane node, receive an MBS session start response fed back by the son control plane node of the ith level control plane node, the MBS session start response including indication information, the indication information including the identification information of the ith level user plane node, first F-TEID list information, and first field information used for indicating that multicast transmission is started, the first field information indicating that a son user plane node that supports receiving, through multicast, the MBS data transmitted by the ith level user plane node exists in the son user plane nodes allocated by the son control plane node to the ith level user plane node, and the first F-TEID list information including F-TEIDs allocated to son user plane nodes that support receiving, through peer to peer rather than through multicast, the MBS data transmitted by the ith level user plane node; or when or in response to determining that the indication information includes the identification information of the ith level user plane node and does not include first F-TEID list information and first field information, the indication information being used for indicating that all the son user plane nodes allocated by the son control plane node to the ith level user plane node support receiving, through multicast, the MBS data transmitted by the ith level user plane node; or when or in response to determining that the indication information includes the identification information of the ith level user plane node and first F-TEID list information and does not include first field information, the indication information is used for indicating that all the son user plane nodes allocated by the son control plane node to the ith level user plane node support receiving, through peer to peer rather than through multicast, the MBS data transmitted by the ith level user plane node; or when or in response to determining that the indication information includes the identification information of the ith level user plane node and field information indicating that multicast transmission is stopped and does not include first F-TEID list information, the indication information is used for indicating that the son control plane node does not allocate the son user plane nodes to the ith level user plane node.

In some embodiments of the present disclosure, based on the solution, when or in response to determining that at least two ith level user plane nodes corresponding to the ith level control plane node are selected, the MBS session start response includes an indication information list, and the indication information list includes the indication information respectively corresponding to all the ith level user plane nodes.

In some embodiments of the present disclosure, based on the solution, the MBS session start response further includes a failed identification information list, and the failed identification information list is used for indicating a target ith level user plane node to which son user plane nodes are not allocated.

In some embodiments of the present disclosure, based on the solution, the first interaction unit 2104 is further configured to: when or in response to determining that a target ith level user plane node to which son user plane nodes are not allocated exists is determined according to the MBS session start response, transmit a user plane MBS session deletion request to the target ith level user plane node.

In some embodiments of the present disclosure, based on the solution, the first interaction unit 2104 is further configured to: receive a user plane MBS session deletion response fed back by the target ith level user plane node, the user plane MBS session deletion response being transmitted by the target ith level user plane node after receiving the user plane MBS session deletion request, and when or in response to determining that the target ith level user plane node has joined a multicast transmission group corresponding to a father user plane node of the target ith level user plane node, the target ith level user plane node exiting the multicast transmission group corresponding to the father user plane node of the target ith level user plane node after receiving the user plane MB S session deletion request.

In some embodiments of the present disclosure, based on the solution, when or in response to determining that the ith level control plane node has at least two son control plane nodes, the first interaction unit 2104 is further configured to: determine, according to MBS session start responses respectively fed back by all the son control plane nodes of the ith level control plane node and received by the second interaction unit 2106, whether the target ith level user plane node to which the son user plane nodes are not allocated exists.

In some embodiments of the present disclosure, based on the solution, the first interaction unit 2104 is further configured to: after the second interaction unit 2106 receives the MBS session start response fed back by the son control plane nodes of the ith level control plane node, transmit, when or in response to determining that the indication information includes the first F-TEID list information, a user plane MBS session modification request to the ith level user plane node according to the identification information of the ith level user plane node included in the indication information, to instruct the ith level user plane node to respectively transmit, through peer to peer, the MBS data to son user plane nodes corresponding to the F-TEIDs included in the first F-TEID list information, when or in response to determining that the indication information further includes the first field information, the user plane MBS session modification request being further used for instructing the ith level user plane node to transmit the MBS data to the son user plane node of the ith level user plane node through multicast transmission simultaneously; and when or in response to determining that the indication information does not include the first field information, the user plane MBS session modification request being further used for instructing the ith level user plane node to transmit the MBS data to the son user plane node of the ith level user plane node without using multicast transmission.

In some embodiments of the present disclosure, based on the solution, the first interaction unit 2104 is further configured to: when or in response to determining that at least two ith level user plane nodes corresponding to the ith level control plane node are selected, transmit, according to indication information corresponding to each of the ith level user plane nodes included in the MBS session start response, the user plane MBS session modification request to an ith level user plane node to which the user plane MBS session modification request is to be transmitted.

In some embodiments of the present disclosure, based on the solution, when or in response to determining that the ith level control plane node is not a first level control plane node in the MBS session transmission tree, after the receiving an MBS session start response fed back by a son control plane node of the ith level control plane node, the second interaction unit 2106 is further configured to: feed back an MBS session start response to a father control plane node of the ith level control plane node according to the MBS session start response fed back by the son control plane node, the MBS session start response fed back to the father control plane node of the ith level control plane node including identification information of a father user plane node of the ith level user plane node.

In some embodiments of the present disclosure, based on the solution, when or in response to determining that the ith level control plane node includes at least two son control plane nodes, after MBS session start responses respectively fed back by all the son control plane nodes of the ith level control plane node are received, the MBS session start response is fed back to the father control plane node of the ith level control plane node.

In some embodiments of the present disclosure, based on the solution, the MBS session start response fed back to the father control plane node of the ith level control plane node further includes second F-TEID list information and second field information used for indicating that multicast transmission is started, the second field information indicates that a user plane node that supports receiving MBS data of the father user plane node of the ith level user plane node through multicast exists in the ith level user plane node, and the second F-TEID list information includes F-TEIDs allocated to user plane nodes that support receiving the MBS data of the father user plane node of the ith level user plane node through peer to peer rather than through multicast in the ith level user plane node; or when or in response to determining that the MBS session start response fed back to the father control plane node of the ith level control plane node does not include second F-TEID list information and second field information, the MBS session start response fed back to the father control plane node of the ith level control plane node is used for indicating that the ith level user plane node supports receiving the MBS data of the father user plane node of the ith level user plane node through multicast; or when or in response to determining that the MBS session start response fed back to the father control plane node of the ith level control plane node further includes second F-TEID list information and does not include second field information, the MBS session start response fed back to the father control plane node of the ith level control plane node is used for indicating that the ith level user plane node supports receiving the MBS data of the father user plane node of the ith level user plane node through peer to peer rather than through multicast; or when or in response to determining that the MBS session start response fed back to the father control plane node of the ith level control plane node does not include second F-TEID list information and includes field information indicating that multicast transmission is stopped, the MBS session start response fed back to the father control plane node of the ith level control plane node is used for indicating that the ith level user plane node is not allocated.

In some embodiments of the present disclosure, based on the solution, when or in response to determining that at least two ith level user plane nodes corresponding to the ith level control plane node are selected, the first interaction unit 2104 is configured to: respectively transmit the user plane MBS session establishment request to each ith level user plane node corresponding to the ith level control plane node; and receive the user plane MBS session establishment response respectively fed back by each ith level user plane node corresponding to the ith level control plane node.

In some embodiments of the present disclosure, based on the solution, when or in response to determining that at least two ith level user plane nodes corresponding to the ith level control plane node are selected, the MBS session start request transmitted to the son control plane node of the ith level control plane node includes identification information of each ith level user plane node and a first MBS IP multicast transmission address and a first C-TEID that are allocated by each ith level user plane node; and first MBS IP multicast transmission addresses allocated by different ith level user plane nodes are different.

In some embodiments of the present disclosure, based on the solution, when or in response to determining that at least two ith level user plane nodes corresponding to the ith level control plane node are selected, son user plane nodes respectively allocated by the son control plane node to the at least two ith level user plane nodes are different, and each son user plane node allocated to the ith level user plane nodes is not allocated as a son node of another user plane node.

In some embodiments of the present disclosure, based on the solution, the selection unit 2102 is configured to: when or in response to determining that the ith level control plane node is not a first level control plane node in the MBS session transmission tree, select the ith level user plane node according to information about a son control plane node of the ith level control plane node, the information about the son control plane node including at least one of a location and a quantity; and when or in response to determining that the ith level control plane node is a first level control plane node in the MBS session transmission tree, select a first level user plane node according to a network configuration.

In some embodiments of the present disclosure, based on the solution, control plane nodes in the MBS session transmission tree other than the first level control plane node have at least one father control plane node.

In some embodiments of the present disclosure, based on the solution, when or in response to determining that the son control plane node of the ith level control plane node is a base station or a centralized unit of a base station and the son user plane node of the ith level user plane node is a base station or a distributed unit of a base station, the second interaction unit 2106 is configured to: transmit an information transfer message to an AMF, the information transfer message including an access network identifier and a first MBS session container, the first MBS session container being used for instructing the AMF to transmit the MBS session start request to a base station corresponding to the access network identifier or a centralized unit of the base station.

In some embodiments of the present disclosure, based on the solution, the base station or the centralized unit of the base station allocates user plane information of the base station or at least one distributed unit of the base station to the ith level user plane node as the son user plane node of the ith level user plane node according to registered user equipment information of an MBS multicast service or a service area of an MBS broadcast service, the user equipment information including at least one of a location and a quantity.

In some embodiments of the present disclosure, based on the solution, the second interaction unit 2106 is further configured to: after transmitting the information transfer message to the AMF, receive an information notification message transmitted by the AMF, the information notification message including a second MBS session container, the second MBS session container including an MBS session start response fed back by the base station or the centralized unit of the base station.

In some embodiments of the present disclosure, based on the solution, the AMF is an AMF capable of connecting the base station or the centralized unit of the base station to the ith level control plane node.

Figure 22:
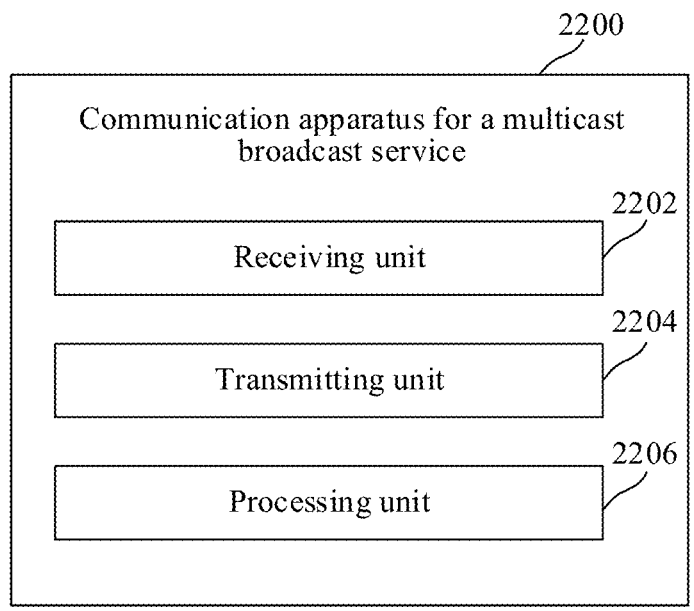
FIG. 22 is a schematic block diagram of a communication apparatus for a multicast broadcast service according to certain embodiment(s) of the present disclosure.

FIG. 22 is a block diagram of a communication apparatus for a multicast broadcast service according to an embodiment of the present disclosure. The communication apparatus may be disposed in an ith level user plane node.

Referring to FIG. 22, a communication apparatus 2200 for a multicast broadcast service according to an embodiment of the present disclosure includes: a receiving unit 2202, a transmitting unit 2204, and a processing unit 2206.

The receiving unit 2202 is configured to receive a user plane MBS session establishment request transmitted by an ith level control plane node in an MBS session transmission tree, the ith level control plane node being any level control plane node other than a last level control plane node in the MBS session transmission tree, i=1, ..., N, N being a positive integer, the user plane MBS session establishment request including MBS IP multicast distribution information, the MBS IP multicast distribution information being from a father control plane node of the ith level control plane node, and the MBS IP multicast distribution information including a second MBS IP multicast transmission address and a second C-TEID that are provided by the father control plane node of the ith level control plane node. The transmitting unit 2204 is configured to feed back a user plane MBS session establishment response to the ith level control plane node, the user plane MBS session establishment response including a first MBS IP multicast transmission address and a first C-TEID that are allocated by the ith level user plane node, and the first MBS IP multicast transmission address being used for instructing a son user plane node of the ith level user plane node to join a multicast transmission group corresponding to the first MBS IP multicast transmission address to receive MBS data transmitted by the ith level user plane node through multicast. The processing unit 2206 is configured to join a multicast transmission group corresponding to the second MBS IP multicast transmission address when or in response to determining that the ith level user plane node supports receiving MBS data of the father user plane node of the ith level user plane node through multicast, to receive the MBS service data transmitted by the father user plane node of the ith level user plane node through multicast.

In some embodiments of the present disclosure, based on the solution, the processing unit 2206 is further configured to: allocate, when or in response to determining that the ith level user plane node supports receiving, through peer to peer rather than through multicast, the MBS data transmitted by the father user plane node of the ith level user plane node, an F-TEID for receiving, through peer to peer, the MBS data transmitted by the father user plane node of the ith level user plane node.

In some embodiments of the present disclosure, based on the solution, the receiving unit 2202 is further configured to: after the transmitting unit feeds back the user plane MBS session establishment response to the ith level control plane node, receive a user plane MBS session modification request transmitted by the ith level control plane node, the user plane MBS session modification request including first F-TEID list information, and the first F-TEID list information including F-TEIDs of son user plane nodes that support receiving, through peer to peer rather than through multicast, MBS data transmitted by the ith level user plane node. The communication apparatus for a multicast broadcast service further includes: a transmission unit, configured to respectively transmit, through peer to peer based on the first F-TEID list information, MBS data to son user plane nodes corresponding to the F-TEIDs included in the first F-TEID list information, and determine, according to the user plane MBS session modification request, whether the MBS data is also transmitted to the son user plane node of the ith level user plane node through multicast transmission.

In some embodiments of the present disclosure, based on the solution, the processing unit 2206 is further configured to: transmit a user plane MBS session deletion response to the ith level control plane node when or in response to determining that a user plane MBS session deletion request transmitted by the ith level control plane node is received, when or in response to determining that the ith level control plane node has joined the multicast transmission group corresponding to the second MBS IP multicast transmission address, exit the multicast transmission group corresponding to the second MBS IP multicast transmission address after receiving the user plane MBS session deletion request.

In some embodiments of the present disclosure, based on the solution, the processing unit 2206 is further configured to: after the transmitting unit transmits the user plane MBS session establishment response to the ith level control plane node, when or in response to determining that a user plane MBS session establishment request transmitted by another control plane node is received, feed back a rejection message to the another control plane node, to indicate to the another control plane node that the user plane node has been selected.

In some embodiments of the present disclosure, based on the solution, the transmitting unit 2204 is further configured to: when or in response to determining that user plane MBS session establishment requests transmitted by a plurality of control plane nodes are received, select one control plane node from the plurality of control plane nodes, feed back a user plane MBS session establishment response to the one control plane node, and feed back a rejection message to other control plane nodes in the plurality of control plane nodes, to indicate to the other control plane nodes that the user plane node has been selected.

Figure 23:
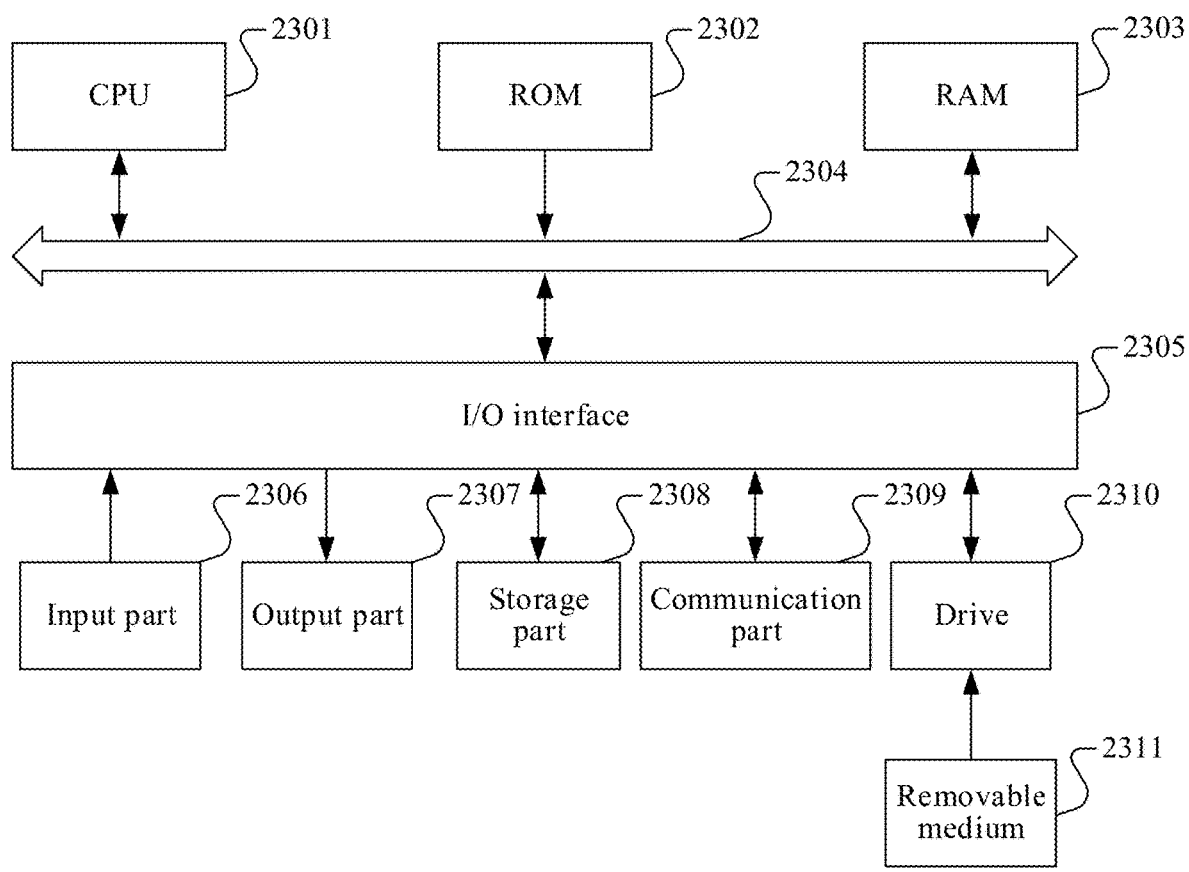
FIG. 23 is a schematic structural diagram of a computer system adapted to implement an electronic device according to certain embodiment(s) of the present disclosure.

FIG. 23 is a schematic structural diagram of a computer system adapted to implement an electronic device according to an embodiment of the present disclosure.

The computer system 2300 of the electronic device shown in FIG. 23 is merely an example, and does not constitute any limitation on functions and use ranges of the embodiments of the present disclosure.

As shown in FIG. 23, the computer system 2300 includes a central processing unit (CPU) 2301, which may perform various suitable actions and processing based on a program stored in a read-only memory (ROM) 2302 or a program loaded from a storage part 2308 into a random access memory (RAM) 2303, for example, perform the method described in the embodiments. The RAM 2303 further stores various programs and data desirable for system operations. The CPU 2301, the ROM 2302, and the RAM 2303 are connected to each other through a bus 2304. An input/output (I/O) interface 2305 is also connected to the bus 2304.

The following components are connected to the I/O interface 2305: an input part 2306 including a keyboard, a mouse, or the like; an output part 2307 including a cathode ray tube (CRT), a liquid crystal display (LCD), a speaker, or the like; a storage part 2308 including hard disk, etc.; and a communication part 2309 including a network interface card such as a local area network (LAN) card, a modem, or the like. The communication part 2309 performs communication processing by using a network such as the Internet. A driver 2310 is also connected to the I/O interface 2305 as desirable. A removable medium 2311, such as a disk, an optical disc, a magneto-optical disc, or a semiconductor memory, is installed on the drive 2310 as desirable, so that a computer program read from the removable medium is installed in the storage portion 2308 as desirable.

Particularly, according to an embodiment of the present disclosure, the processes described above by referring to the flowcharts may be implemented as computer software programs. For example, an embodiment of the present disclosure includes a computer program product. The computer program product includes a computer program stored in a computer-readable medium. The computer program includes a computer program used for performing a method shown in the flowchart. In such an embodiment, the computer program may be downloaded and installed from the network through the communication portion 2309, and/or installed from the removable medium 2311. When the computer program is executed by the CPU 2301, the various functions defined in the system of the present disclosure are executed.

The computer-readable medium shown in the embodiments of the present disclosure may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, apparatus, or device. In the present disclosure, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate system architectures, functions, and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

Related units described in the embodiments of the present disclosure may be implemented in a software manner, or may be implemented in a hardware manner, and the unit described can also be set in a processor. Names of the units do not constitute a limitation on the units in a specific scenario.

In another aspect, the present disclosure further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the embodiments.

Although a plurality of modules or units of a device configured to perform actions are discussed in the description, such division is not mandatory. Actually, according to the implementations of the present disclosure, the features and functions of two or more modules or units described above may be implemented in one module or unit. On the contrary, the features and functions of one module or unit described above may be further divided to be embodied by a plurality of modules or units.

According to the descriptions of the implementations, a person skilled in the art may readily understand that the exemplary implementations described herein may be implemented by using software, or may be implemented by combining software and hardware. Therefore, the technical solutions of the implementations of the present disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of the present disclosure.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

After considering and practicing the disclosed implementations, a person skilled in the art may easily conceive of other implementations of the present disclosure. The present disclosure is intended to cover any variations, uses, or adaptive changes of the present disclosure following the general principles of the present disclosure, and includes well-known knowledge and technical means in the art and undisclosed in the present disclosure.

The present disclosure is not limited to the precise structures described above and shown in the accompanying drawings, and various modifications and changes may be made without departing from the scope of the present disclosure. The scope of the present disclosure is subject only to the appended claims.

What is claimed is:

1. A communication method for a multicast broadcast service, the method comprising:
    selecting an $i^{th}$ level user plane node corresponding to an $i^{th}$ level control plane node, the $i^{th}$ level control plane node being any level control plane node other than a last level control plane node in a multicast broadcast service (MBS) session transmission tree, i=1, . . . , N, N being a positive integer;
    transmitting a user plane MBS session establishment request to the $i^{th}$ level user plane node, and receiving a user plane MBS session establishment response fed back by the $i^{th}$ level user plane node; and
    transmitting an MBS session start request to a son control plane node of the $i^{th}$ level control plane node, so that the son control plane node allocates son user plane nodes to the $i^{th}$ level user plane node, the MBS session start request including identification information of the $i^{th}$ level user plane node and a first MBS Internet Protocol (IP) multicast transmission address allocated by the $i^{th}$ level user plane node and a first common-tunnel endpoint identifier (C-TEID) used for transmitting MBS data through multicast, and the first MBS IP multicast transmission address being used for instructing the son user plane node to join a multicast transmission group corresponding to the first MBS IP multicast transmission address to receive MBS data transmitted by the $i^{th}$ level user plane node through multicast.

2. The communication method according to claim 1, wherein
    the user plane MBS session establishment request includes MBS IP multicast distribution information, the MBS IP multicast distribution information includes a second MBS IP multicast transmission address and a second C-TEID that are allocated by the parent user plane node of the $i^{th}$ level user plane node.

3. The communication method according to claim 2, wherein
    the user plane MBS session establishment request includes indication information for requesting to allocate a full qualified tunnel endpoint identifier (F-TEID) to the $i^{th}$ level user plane node;
    the user plane MBS session establishment response includes the F-TEID allocated to the $i^{th}$ level user plane node; or
    the user plane MBS session establishment response indicates that the $i^{th}$ level user plane node supports receiving the MBS data of the father user plane node of the $i^{th}$ level user plane node through peer to peer rather than through multicast and comprises an F-TEID allocated to the $i^{th}$ level user plane node.

4. The communication method according to claim 2, further comprising:
    receiving a MBS session start request transmitted by a father control plane node of the $i^{th}$ level control plane node, and obtaining the MBS IP multicast distribution information from the MBS session start request transmitted by the father control plane node.

5. The communication method according to claim 1, wherein the user plane MBS session establishment request includes indication information used for instructing the $i^{th}$ level user plane node to allocate new MBS IP multicast distribution information; and
    the user plane node MBS session establishment response includes a first MBS IP multicast transmission address and a first C-TEID that are allocated by the $i^{th}$ level user plane node.

6. The communication method according to claim 1, further comprising:
    receiving an MBS session start response fed back by the son control plane node of the $i^{th}$ level control plane node, the MBS session start response including indication information,
    the indication information including the identification information of the $i^{th}$ level user plane node, first F-TEID list information, and first field information used for indicating that multicast transmission is started; or
    the indication information indicating that the son user plane nodes allocated by the son control plane node to the $i^{th}$ level user plane node support receiving, through multicast, the MBS data transmitted by the $i^{th}$ level user plane node; or
    the indication information indicating that all the son user plane nodes allocated by the son control plane node to the $i^{th}$ level user plane node support receiving, through peer to peer rather than through multicast, the MBS data transmitted by the $i^{th}$ level user plane node; or
    the indication information indicating that the son control plane node does not allocate the son user plane nodes to the $i^{th}$ level user plane node.

7. The communication method according to claim 6, wherein the MBS session start response includes an indication information list, and the indication information list includes the indication information respectively corresponding to the $i^{th}$ level user plane nodes.

8. The communication method according to claim 7, wherein the MBS session start response further includes a failed identification information list, and the failed identification information list is used for indicating a target $i^{th}$ level user plane node to which son user plane nodes are not allocated.

9. The communication method according to claim 7, further comprising:

transmitting a user plane MBS session deletion request to the target $i^{th}$ level user plane node.

10. The communication method for a multicast broadcast service according to claim 9, further comprising:

receiving a user plane MBS session deletion response fed back by the target $i^{th}$ level user plane node, the user plane MBS session deletion response being transmitted by the target $i^{th}$ level user plane node after receiving the user plane MBS session deletion request.

11. The communication method according to claim 9, further comprising:

determining that the target $i^{th}$ level user plane node to which the son user plane nodes are not allocated exists.

12. The communication method according to claim 6, further comprising:

transmitting a user plane MBS session modification request to the $i^{th}$ level user plane node according to the identification information of the $i^{th}$ level user plane node, to instruct the $i^{th}$ level user plane node to transmit the MBS data to son user plane nodes corresponding to the F-TEIDs, the user plane MBS session modification request being used for instructing the $i^{th}$ level user plane node to transmit the MBS data to the son user plane node of the $i^{th}$ level user plane node through multicast transmission; and the user plane MBS session modification request being further used for instructing the $i^{th}$ level user plane node to transmit the MBS data to the son user plane node of the $i^{th}$ level user plane node without using multicast transmission.

13. The communication method according to claim 12, further comprising:

transmitting the user plane MBS session modification request to an $i^{th}$ level user plane node.

14. The communication method according to claim 6, further comprising:

feeding back an MBS session start response to a father control plane node of the $i^{th}$ level control plane node according to the MBS session start response.

15. The communication method according to claim 14, wherein the MBS session start response is fed back to the father control plane node of the $i^{th}$ level control plane node.

16. The communication method according to claim 14, wherein the MBS session start response fed back to the father control plane node of the $i^{th}$ level control plane node includes second F-TEID list information and second field information used, the second field information indicates that a user plane node that supports receiving MBS data of the father user plane node of the $i^{th}$ level user plane node through multicast exists in the $i^{th}$ level user plane node; or the MBS session start response fed back to the father control plane node of the $i^{th}$ level control plane node is used for indicating that the $i^{th}$ level user plane node supports receiving the MBS data of the father user plane node of the $i^{th}$ level user plane node through multicast; or the MBS session start response fed back to the father control plane node of the $i^{th}$ level control plane node is used for indicating that the $i^{th}$ level user plane node supports receiving the MBS data of the father user plane node of the $i^{th}$ level user plane node through peer to peer rather than through multicast; or the MBS session start response fed back to the father control plane node of the $i^{th}$ level control plane node is used for indicating that the $i^{th}$ level user plane node is not allocated.

17. The communication method according to claim 1, wherein transmitting the user plane MBS session establishment request comprises transmitting the user plane MBS session establishment request to each $i^{th}$ level user plane node corresponding to the $i^{th}$ level control plane node; and receiving the user plane MBS session establishment response comprises receiving the user plane MBS session establishment response.

18. The communication method according to claim 1, wherein the MBS session start request includes identification information of each $i^{th}$ level user plane node and a first MBS IP multicast transmission address and a first C-TEID that are allocated by each $i^{th}$ level user plane node; and first MBS IP multicast transmission addresses allocated by different $i^{th}$ level user plane nodes are different.

19. A communication apparatus for a multicast broadcast service, the apparatus comprising: a memory storing computer program instructions; and a processor coupled to the memory and configured to execute the computer program instructions and perform:

selecting an $i^{th}$ level user plane node corresponding to an $i^{th}$ level control plane node, the $i^{th}$ level control plane node being any level control plane node other than a last level control plane node in a multicast broadcast service (MBS) session transmission tree, i=1, . . . , N, N being a positive integer;

transmitting a user plane MBS session establishment request to the $i^{th}$ level user plane node, and receiving a user plane MBS session establishment response fed back by the $i^{th}$ level user plane node; and transmitting an MBS session start request to a son control plane node of the $i^{th}$ level control plane node, so that the son control plane node allocates son user plane nodes to the $i^{th}$ level user plane node, the MBS session start request including identification information of the $i^{th}$ level user plane node and a first MBS Internet Protocol (IP) multicast transmission address allocated by the $i^{th}$ level user plane node and a first common-tunnel endpoint identifier (C-TEID) used for transmitting MBS data through multicast, and the first MBS IP multicast transmission address being used for instructing the son user plane node to join a multicast transmission group corresponding to the first MBS IP multicast transmission address to receive MBS data transmitted by the $i^{th}$ level user plane node through multicast.

20. A non-transitory computer-readable storage medium storing computer program instructions executable by at least one processor to perform:

selecting an $i^{th}$ level user plane node corresponding to an $i^{th}$ level control plane node, the $i^{th}$ level control plane node being any level control plane node other than a last level control plane node in a multicast broadcast service (MBS) session transmission tree, i=1, . . . , N, N being a positive integer;

transmitting a user plane MBS session establishment request to the $i^{th}$ level user plane node, and receiving a user plane MBS session establishment response fed back by the $i^{th}$ level user plane node; and transmitting an MBS session start request to a son control plane node of the $i^{th}$ level control plane node, so that the son control plane node allocates son user plane nodes to the $i^{th}$ level user plane node, the MBS session start request including identification information of the $i^{th}$ level user plane node and a first MBS Internet Protocol (IP) multicast transmission address allocated by the $i^{th}$ level user plane node and a first common-tunnel endpoint identifier (C-TEID) used for transmitting MBS data through multicast, and the first MBS IP multicast transmission address being used for instructing the son user plane node to join a multicast transmission group corresponding to the first MBS IP multicast transmission address to receive MBS data transmitted by the $i^{th}$ level user plane node through multicast.

* * * * *